United States Patent [19]
Ito et al.

[11] Patent Number: 5,270,930
[45] Date of Patent: Dec. 14, 1993

[54] FOUR WHEEL DRIVING VEHICLE OF A FRONT/REAR WHEEL DIFFERENTIAL OPERATION LIMITING TYPE

[75] Inventors: Masayoshi Ito; Kaoru Sawase; Kenichiro Shinada, all of Okazaki; Yoshihito Ito, Chiryu; Keiji Suzuki, Okazaki; Shunzo Tanaka, Nagoya, all of Japan

[73] Assignee: Mitsubishi Jidosha Kogyo Kabushiki Kaisha, Tokyo, Japan

[21] Appl. No.: 799,112

[22] Filed: Nov. 27, 1991

[30] Foreign Application Priority Data

| Nov. 30, 1990 | [JP] | Japan | 2-337593 |
| Nov. 30, 1990 | [JP] | Japan | 2-337596 |
| Nov. 30, 1990 | [JP] | Japan | 2-337599 |

[51] Int. Cl.⁵ .................. G06F 15/50; G06G 7/10; B60K 41/04
[52] U.S. Cl. .................. 364/424.1; 364/426.03; 74/866
[58] Field of Search .......... 180/140, 247, 249, 76; 74/11, 844, 867, 866; 192/85 R, 70.14; 364/424.1, 426.03, 431

[56] References Cited

U.S. PATENT DOCUMENTS

| 4,476,746 | 10/1984 | Miki et al. | 74/867 |
| 4,503,927 | 3/1985 | Hayakawa et al. | 180/247 |
| 4,679,463 | 7/1987 | Ozaki et al. | 74/11 |
| 4,741,407 | 5/1988 | Torii et al. | 180/76 |
| 4,825,368 | 4/1989 | Itoh et al. | 364/424.1 |
| 4,866,624 | 9/1989 | Nishikawa et al. | 364/426.03 |
| 4,867,262 | 9/1989 | Takada et al. | 180/249 |
| 4,982,809 | 1/1991 | Nakamura et al. | 364/424.1 |
| 5,011,458 | 4/1991 | Kumm | 74/866 |
| 5,035,312 | 7/1991 | Asayama et al. | 192/85 R |
| 5,065,319 | 11/1991 | Iwatsuki et al. | 364/424.1 |
| 5,099,940 | 3/1992 | Imaseki et al. | 180/140 |
| 5,137,131 | 8/1992 | Enomoto | 192/70.14 |
| 5,152,191 | 10/1992 | Sato et al. | 74/844 |
| 5,168,953 | 12/1992 | Naito | 364/426.03 |

FOREIGN PATENT DOCUMENTS

| 61-247517 | 11/1986 | Japan . |
| 62-139722 | 6/1987 | Japan . |
| 62-166113 | 7/1987 | Japan . |
| 63-176728 | 7/1988 | Japan . |
| 63-312238 | 12/1988 | Japan . |
| 1-26542 | 2/1989 | Japan . |
| 2-31937 | 2/1990 | Japan . |

Primary Examiner—Thomas G. Black
Assistant Examiner—J. H. Louis-Jacques

[57] ABSTRACT

A four wheel driving vehicle includes a center differential gear wherein a differential operation limit is achieved by a wet hydraulic multiple disk clutch and is improved in running performance, turning performance, acceleration performance and so forth. An engaging force of the clutch and hence a hydraulic pressure to be supplied to the clutch are controlled in accordance with a steering angle, a vehicle speed, an advancing direction acceleration, an engine output torque, a differential operation speed difference between front and rear wheels and so forth to obtain a desired torque distribution suitable for a current running condition of the vehicle.

27 Claims, 36 Drawing Sheets

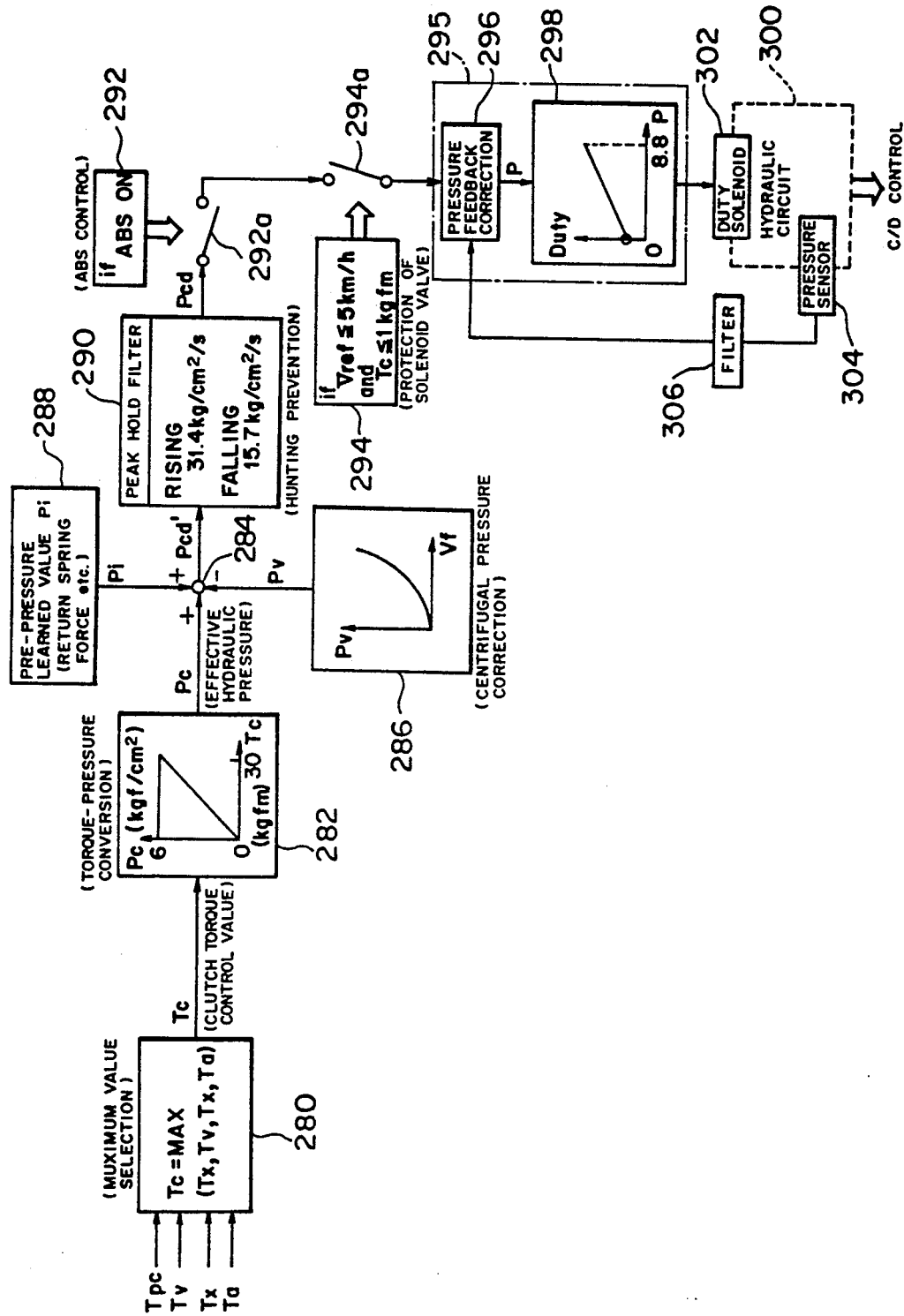

Rf: FRONT WHEEL TURNING RADIUS
Rr: REAR WHEEL TURNING RADIUS

Vf: FRONT WHEEL SPEED
Vr: REAR WHEEL SPEED
$\beta$: CAR BODY SLIP ANGLE

FOUR WHEEL DRIVING VEHICLE OF A FRONT/REAR WHEEL DIFFERENTIAL OPERATION LIMITING TYPE

BACKGROUND OF THE INVENTION

1. Field of the Invention

This invention relates to a four wheel driving vehicle of a front/rear wheel differential operation limiting type. More particularly, it relates to a four wheel driving vehicle with a front/rear wheel torque distribution controlling system of the differential limiting type which limits a differential operation condition between the front wheel side and the rear wheel side to control a torque distribution between the front wheels and the rear wheels.

2. Description of the Prior Art

Various power transmitting apparatus for an automobile are already known which control a ratio between a torque transmitted to the front wheel side and another torque transmitted to the rear wheel side in response to an operating condition of the automobile.

For example, it may be a possible construction, for example, of a so-called full time four wheel driving automobile that, in order to suitably distribute a driving force of an engine between the front wheel side and the rear wheel side, a center differential gear and a differential operation limiting mechanism such as a viscous coupling for limiting a differential operation of the center differential gear are provided, and the differential limiting mechanism is adjusted to control the ratio in torque in response to an operating condition of an automobile.

Particularly, as a controlling device to cope with a case when a spin takes place at the four wheels, various means have been proposed including means for controlling a torque distribution between the front and rear wheels in response to a lateral acceleration acting upon the vehicle body or a vehicle speed and means for distributing a torque between the front and rear wheels such that it may increase simply in primary proportion to an advancing direction acceleration acting upon the vehicle body.

However, even if the torque distribution between the front and rear wheels is controlled in response to a lateral acceleration or a vehicle body speed or otherwise controlled such that it may increase simply in primary proportion to an advancing direction acceleration as described just above, an optimum torque distribution cannot be achieved.

Also such a method has been proposed that, taking durability of a driving system into consideration, a differential operation limiting force is maintained at a predetermined value when an input torque from an engine is higher than a predetermined value. While such method assures durability of the driving system, the performance in operation is not improved.

It may also be a possible method in a full time four wheel driving automobile that a differential operation limiting clutch for limiting a differential operation of a center differential gear is provided so that the torque ratio may be controlled in response to an operating condition of the automobile by way of the differential limiting clutch.

Here, in order to assure a high responsibility of such differential operation limiting clutch as described above, normal solution would be to apply, taking into consideration an abrasion of the clutch, a dispersion of springs and so forth, a hydraulic pressure higher than an engagement starting hydraulic pressure to the clutch to maintain the clutch in a slightly engaged condition. However, while the clutch is new, it has an excessively high drag. Further, as abrasion of the clutch proceeds, a gap will form between clutch elements when control of the clutch is not necessary, which has a bad influence on fuel cost and performance of the engine.

SUMMARY OF THE INVENTION

It is an object of the present invention to provide a four wheel driving vehicle of a front/rear wheel differential operation limiting type by which the torque distribution between front and rear wheels can be limited appropriately and assurance of durability of a driving system and improvement in operating performance of the automobile can be achieved.

In order to attain the object, according to the present invention, there is provided a four wheel driving vehicle of a front/rear wheel differential operation limiting type wherein a differential operation condition between front and rear wheels is limited to control a torque distribution between the front and rear wheels, comprising front/rear wheel speed difference proportional amount calculating means for calculating a limiting controlling amount for the differential operation condition in response to a difference in speeds of rotation between the front and rear wheels; advancing direction acceleration proportional calculating means for calculating a limiting controlling amount for the differential operation condition in response to an acceleration of the vehicle in an advancing direction; driving output torque proportional amount calculating means for calculating a limiting controlling amount for the differential operation condition in response to a driving output torque; and means for selecting a maximum one of the limiting controlling amounts calculated by the front/rear wheel speed difference proportional amount calculating means, advancing direction acceleration proportional calculating means and driving output torque proportional calculating means so that the differential operation condition may be limited in accordance with the thus selected limiting controlling amount.

The four wheel driving vehicle of the front/rear wheel differential operation limiting type may further comprise a differential operation adjusting mechanism for adjusting the differential operation condition between the front and rear wheel sides; steering angle data detecting means for producing steering angle data from an angle of operation of a steering wheel of the vehicle; and controlling means for controlling the differential operation adjusting mechanism in accordance with the steering angle data. Thus, an operation of the steering wheel by the driver, in short, a steering angle then, is reflected on the torque distribution control, and consequently, smooth and rapid turning of the vehicle can be made in accordance with a will of the driver. Accordingly, a head turning property of the vehicle at an initial stage of a turning operation can be improved while a posture of the vehicle body can be stabilized in the rear half of the turning operation. Further, since the torque distribution control can be performed with a high degree of accuracy, it is easy to prevent a possible tight corner braking phenomenon.

Alternatively, the four wheel driving vehicle of the front/rear wheel differential operation limiting type may further comprise a differential operation adjusting mechanism for applying a frictional force between the front wheel side and the rear wheel side to limit the differential operation between the front and rear wheels to adjust the differential operation condition; advancing direction acceleration detecting means for detecting an acceleration of the vehicle in an advancing direction; assigned load calculating means for calculating a front wheel assigned load and a rear wheel assigned load at a magnitude of the advancing direction acceleration detected by the advancing direction acceleration detecting means; output torque calculating means for calculating a driving output torque necessary to obtain the advancing direction acceleration detected by the advancing direction acceleration detecting means; assigned load torque calculating means for calculating an assigned load torque from the assigned load calculated by the assigned load calculating means and the output torque calculated by the driving output torque calculating means; and controlling means for adjusting a differential operation limiting amount for the front and rear wheels in accordance with the driving output torque and the assigned load torque. Thus, since a differential operation limiting amount is controlled in accordance with a minimum engine output torque necessary to assure a detected advancing direction acceleration and an assigned load torque calculated from such minimum engine output torque, a portion of a torque which is required to maintain a necessary acceleration of the vehicle is distributed in a similar manner as in a directly coupled four wheel driving condition while another portion of the torque which exceeds the required portion can be distributed to the base side wheels. Consequently, an excessive under steering condition is prevented and smooth turning can be performed readily. Further, since the differential operation limit is controlled in accordance with a transmission output torque calculated from an engine output torque and so forth, when a high torque to be transmitted to a road is required, such as upon starting or upon acceleration from a low speed running condition of the vehicle, such a torque distribution can be prepared in advance so that a directly coupled four wheel driving condition may be established. Consequently, the starting performance and the accelerating performance from a low speed running condition of the vehicle are improved, and a possible slip of the wheels can be prevented to improve the starting and accelerating performances of the vehicle.

Otherwise, the four wheel driving vehicle of the front/rear wheel differential operation limiting type may further comprise a differential operation adjusting mechanism for adjusting the differential operation condition between the front wheel side and the rear wheel side; engine output detecting means for detecting an outputting condition of an engine of the vehicle; and controlling means for controlling the differential operation adjusting mechanism in accordance with the engine outputting condition when the vehicle is running at a low speed.

Or otherwise, the four wheel driving vehicle of the front/rear wheel differential operation limiting type may further comprise controlling means for adjusting an engaging force of a clutch to control the differential operation condition between the front and rear wheels; and means for detecting a differential operation speed difference between the front and rear wheels, the controlling means being constructed in such a manner as to engage the clutch completely for a predetermined period of time when a condition wherein the differential operation speed difference between the front and rear wheels is higher than a predetermined value continues for a period of time longer than a predetermined period of time. Thus, if the condition wherein the differential operation speed difference between the front and rear wheels is higher than the predetermined value continues for a period of time longer than the predetermined period of time, then the clutch of the differential operation adjusting mechanism is engaged completed for the predetermined period of time. Consequently, a possible seizure of or damage to the clutch by high differential rotation is prevented, and the durability and reliability of the system are improved.

Alternatively, the four wheel driving vehicle of the front/rear wheel differential operation limiting type may further comprise a differential operation adjusting mechanism in which the differential operation condition between the front and rear wheels is controlled by continuously adjusting an engaging force of a wet multiple disk clutch and a hydraulic pressure acting upon the clutch is adjusted by a duty solenoid valve; and controlling means for controlling the differential operation adjusting mechanism in such a manner as to stop operation of the duty solenoid valve when a controlling amount by the wet multiple disk clutch is lower than a predetermined value and the speed of the vehicle is lower than a predetermined value. Thus, since operation of the duty solenoid valve is stopped when the differential operation controlling amount by the hydraulic clutch is lower than the predetermined value and the speed of the vehicle is lower than the predetermined value, the hydraulic system and the differential operation limiting clutch can be protected while preventing a possible bad influence upon a behavior or any other control of the vehicle.

Or else, the four wheel driving vehicle of the front-/rear wheel differential operation limiting type may further comprise a differential operation adjusting mechanism for limiting the differential operation condition between the front wheel side and the rear wheel side by way of a wet multiple disk clutch; and controlling means for controlling the differential operation adjusting mechanism, the controlling means including initial engaging pressure detecting means for detecting an initial engaging pressure of the wet multiple disk clutch which is a maximum pressure at which a differential operation limit to the wet multiple disk clutch does not occur; and pre-pressure applying means for applying the initial engaging pressure detected by the initial engaging pressure detecting means as a pre-pressure to the wet multiple disk clutch. Thus, the initial engaging pressure detecting means detects an initial engaging pressure of the clutch and the pre-pressure applying means the initial engaging pressure to the clutch. Consequently, an appropriate hydraulic pressure is always applied to the clutch. Accordingly, the clutch can be maintained in a slightly engaging condition with certainty, and consequently, the control responsibility of the clutch can be improved significantly.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIGS. 1(a) to 1(c) are block diagrams of a front/rear wheel torque distribution controlling system of the differential limiting type incorporated in a four wheel driving automobile showing a preferred embodiment of the present invention;

DESCRIPTION OF THE PREFERRED EMBODIMENT

Figure 2:
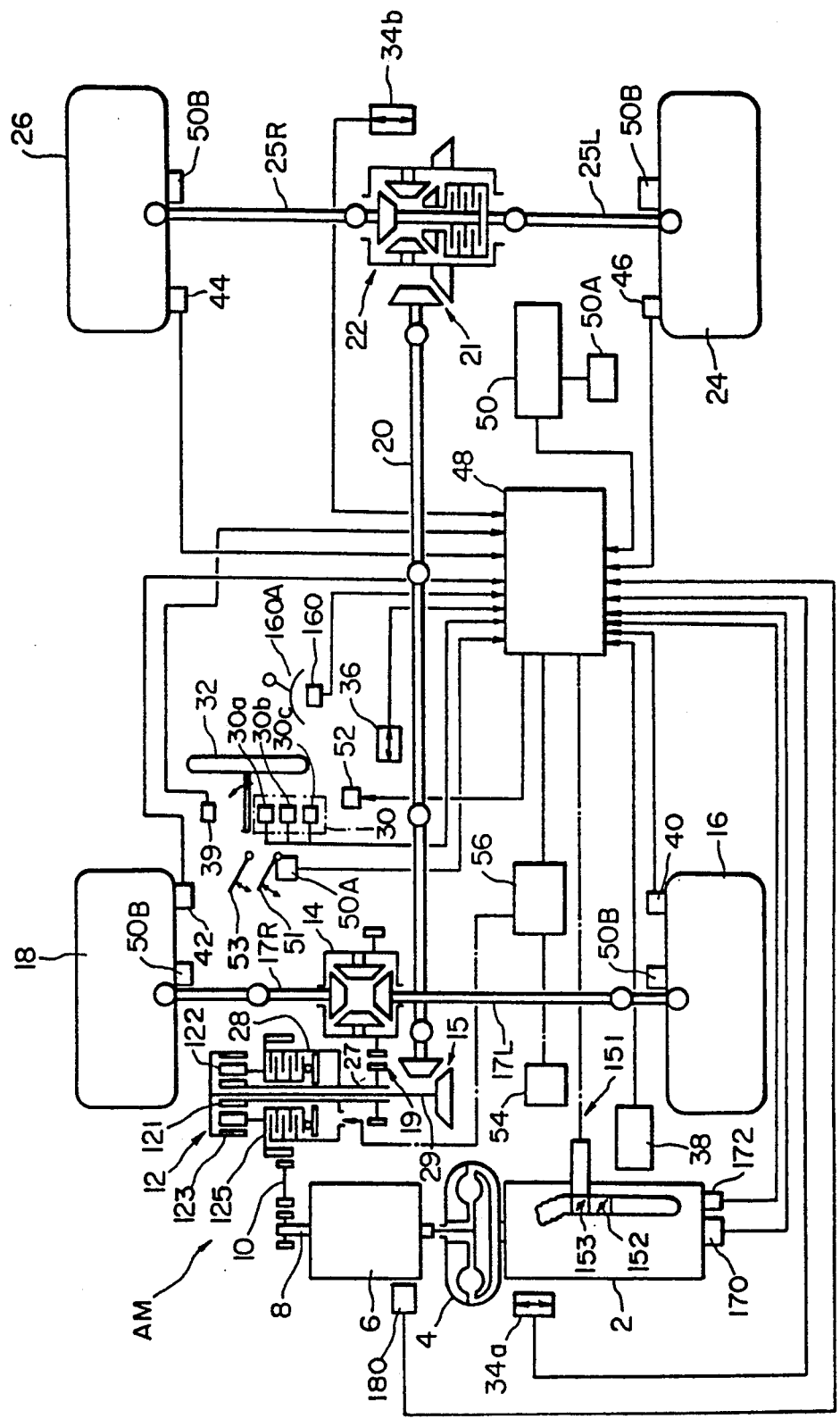
FIG. 2 is a diagrammatic representation of a driving torque transmitting system of the automobile.

Referring first to FIG. 2, a driving torque transmitting system of a four wheel driving automobile to which the present invention is applied. The driving torque transmitting system shown includes an engine 2, output power of which is transmitted to an output shaft 8 by way of a torque converter 4 and an automatic transmission 6. Output power of the output shaft 8 is transmitted by way of an intermediate gear 10 to a center differential gear 12 which serves as an operating mechanism for distributing an engine output torque in a required condition between front and rear wheels.

An output of the center differential gear 12 is transmitted on one hand to left and right front wheels 16 and 18 from axles 17L and 17R by way of a differential gear mechanism 14 for the front wheels and on the other hand to left and right rear wheels 24 and 26 from axles 25L and 25R by way of a bevel gear mechanism 15, a propeller shaft 20, another bevel gear mechanism 21 and a differential gear mechanism 22 for the rear wheels. The center differential gear 12 includes, similarly to a conventionally known center differential gear, a sun gear 121, a planetary gear 122 disposed outwardly of the sun gear 121 and a ring gear 123 disposed outwardly of the planetary gear 122. An output of the output shaft 8 of the automatic transmission 6 is inputted to a carrier 125 on which the planetary gear 122 is supported, and the sun gear 121 is operatively coupled to the front wheel differential gear mechanism 14 by way of a front wheel output shaft 27 and a reduction gear mechanism 19 while the ring gear 123 is operatively coupled to the propeller shaft 20 by way of a rear wheel output shaft 29 and the bevel gear mechanism 15.

Meanwhile, a hydraulic multiple disk clutch 28 is provided for the center differential gear 12 and serves as differential operation limiting means or differential operation adjusting means operable for constraining (or limiting) a differential operation between a front wheel side outputting section and a rear wheel side outputting section thereof to change the distribution of an output torque between the front wheels and rear wheels.

In particular, the hydraulic multiple disk clutch 28 is interposed between the sun gear 121 (or ring gear 123) and the carrier 125 and changes its frictional force in accordance with a controlling pressure acting upon a hydraulic chamber of the hydraulic multiple disk clutch 28 itself to constrain a differential operation between the sun gear 121 (or ring gear 123) and the carrier 125. It is to be noted that the hydraulic multiple disk clutch 28 may otherwise be interposed between the sun gear 121 and ring gear 123.

Accordingly, the center differential gear 12 can suitably control the hydraulic multiple disk clutch 28 to any condition from a completely free condition to a locked condition to control values of torque to be transmitted to the front wheel side and the rear wheel side within a range from a ratio of about 32:68 between the front and rear wheels to another ratio which corresponds to a ratio between ground loads of the front and rear wheels such as, for example, 60:40. The ratio of about 32:68 between the front and rear wheels in a completely free condition can be defined by setting of a ratio between numbers of teeth of a front wheel side input gear wheel and a rear wheel side input gear wheel of the planetary gear, and here, the hydraulic multiple disk clutch 28 is constructed such that the ratio may be about 32:68 when it is in a completely free condition wherein the pressure in the hydraulic chamber thereof is equal to zero. Further, while the ratio (about 32:68) in such completely free condition is varied by a load balance between the front wheel system and the rear wheel system and so forth, it normally has such a specific value as mentioned just above. On the other hand, when the pressure within the hydraulic chamber is equal to a preset pressure (about 9 kg/cm$^2$) and consequently the hydraulic multiple disk clutch 28 is in a locked condition wherein a differential operation limit is substantially equal to zero, the torque distribution between the front and rear wheels presents a ratio equal to that between ground loads of the front and rear wheels such as, for example, 60:40.

Three steering wheel angle sensors 30 including sensors 30a, 30b and 30c for detecting an angle of rotation of a steering wheel 32 from its neutral position, that is, a steering wheel angle $\theta$ and a pair of lateral acceleration sensors 34a and 34b for detecting lateral accelerations Gyf and Gyr acting upon front and rear portions of the car body of the automobile, respectively, are also provided. While two detection data Gyf and Gyr are averaged to obtain single lateral acceleration data as hereinafter described, otherwise a detection value obtained from a single lateral acceleration sensor provided in the proximity of the center of gravity of the car or vehicle body may be employed as lateral acceleration data. The driving torque transmitting system shown in FIG. 2 further includes an advancing direction acceleration sensor 36 for detecting an acceleration Gx acting in an advancing direction upon the vehicle body, a throttle position sensor 38 for detecting a throttle opening $\theta$t of the engine 2, an engine key switch 39 for the engine 2, and four wheel speed sensors 40, 42, 46 and 44 for detecting speeds of rotation of the left front wheel 16, right front wheel 18, left rear wheel 24 and right rear wheel 26, respectively. Outputs of the switches and sensors mentioned above are inputted to a controller 48.

An anti-locking brake system 50 operates in response to a brake switch 50A. In short, when the brake switch 50A is switched on upon operation of a brake pedal 51, an anti-locking brake operating signal is developed in response to such switching on of the brake switch 50A, and the anti-locking brake system 50 is rendered operative in response to the operating signal. Further, when an anti-locking brake operating signal is developed, simultaneously a signal representing such condition is inputted to the controller 48. An indicating lamp 52 is lit in response to a controlling signal from the controller 48.

Though not shown, the controller 48 includes a CPU (central processing unit), a ROM (read only memory), a RAM (random access memory), an interface and so forth necessary for such control as hereinafter described.

A pressure controlling valve system (hereinafter referred to as pressure controlling valve) 56 is interposed between a hydraulic pressure source 54 and the hydraulic chamber of the hydraulic multiple disk clutch 28 and is controlled by a controlling signal from the controller 48.

A shift lever position sensor (shift range detecting means) 160 detects a selected gear position (shift range) of a shift lever 160A for the automatic transmission 6 of the automobile. Also, information detected by the shift lever position sensor 160 is transmitted to the controller 48.

Further, an engine speed Ne detected by an engine speed sensor (engine rotational frequency sensor) 170 and a transmission speed Nt detected by a transmission speed sensor (transmission rotational frequency sensor) 180 are also transmitted to the controller 48.

It is to be noted that details of a hydraulic system for the hydraulic multiple disk clutch 28 will be hereinafter described.

The driving torque transmitting system of the automobile further includes a traction control system 151. In short, the engine 2 includes a main throttle valve 152 having an opening which is controlled in response to an amount of operation of an accelerator pedal 53, and the main throttle valve 152 constitutes an accelerator pedal system engine output adjusting apparatus together with the accelerator pedal 53, a connecting cable and so forth. An auxiliary throttle valve 153 serving as engine output controlling means which operates independently of the accelerator pedal system engine output adjusting apparatus is provided in series to the main throttle valve 152 in an intake passageway of the engine 2. The auxiliary throttle valve 153 is driven by a motor (not shown) which is controlled in accordance with results of detection by the rear wheel speed sensors 44 and 46, front wheel speed sensors 40 and 42, engine speed sensor 170, engine load sensor 172 and so forth.

A hydraulic sensor 304 (FIG. 1(c)) for detecting a hydraulic pressure applied to pistons 141 and 142 (FIG.

4) of the clutch 28 is provided at a predetermined location.

Figure 3:
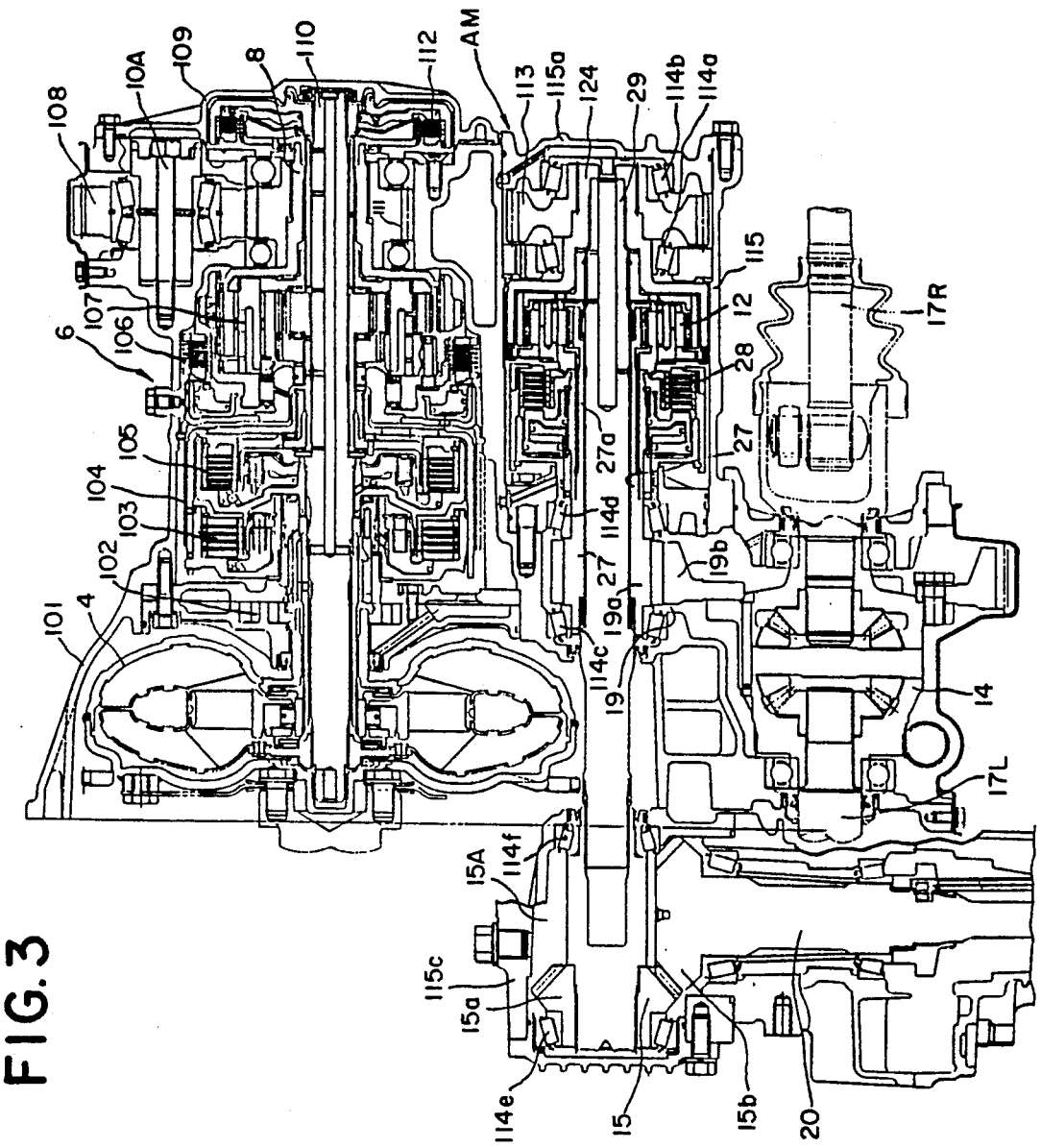
FIG. 3 is a sectional view showing part of the driving system torque transmitting system.
Figure 4:
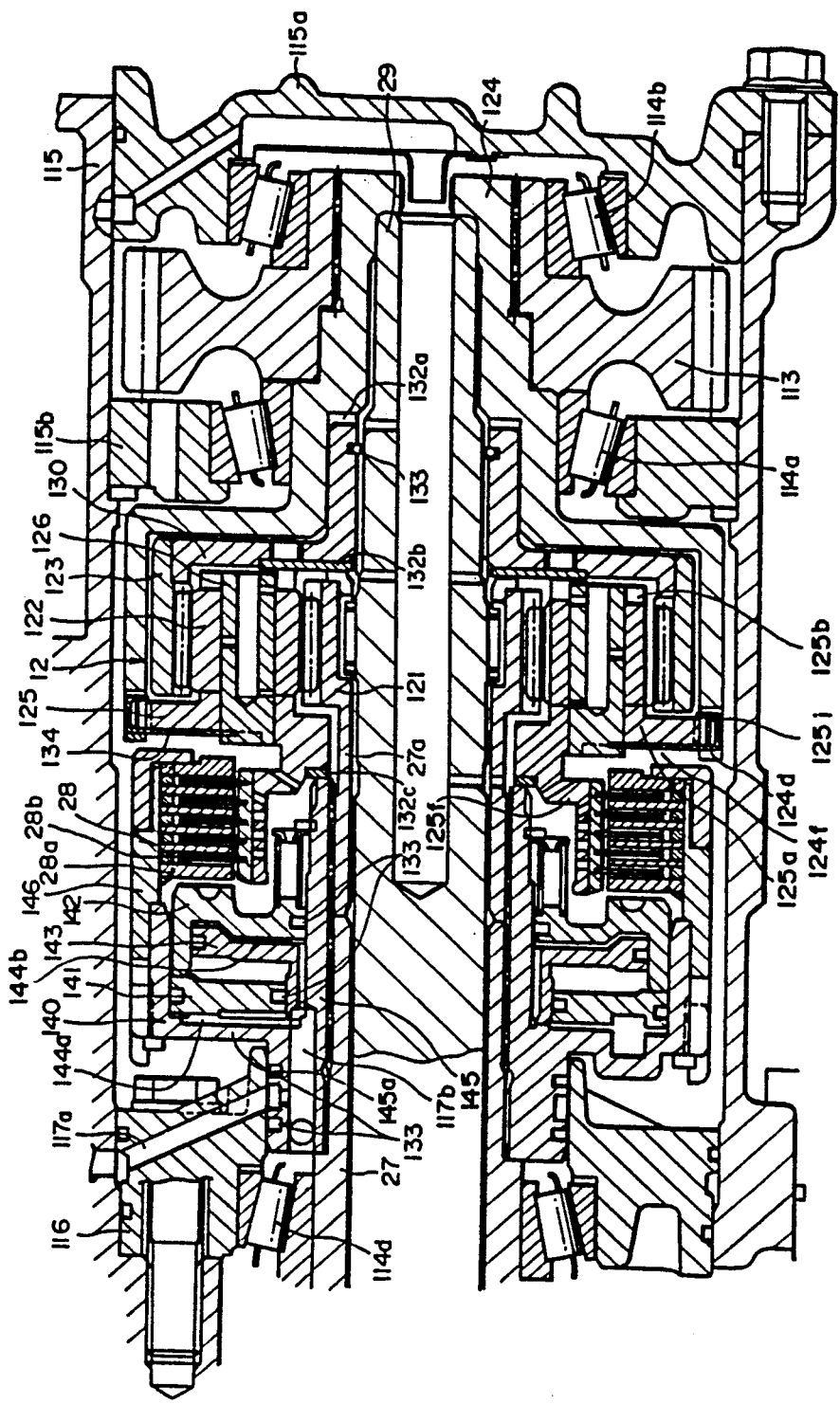
FIG. 4 is an enlarged sectional view of part of a front-/rear wheel torque distributing mechanism of the driving system torque transmission system.

Subsequently, a mechanical section AM of the front-/rear wheel torque distribution controlling system of the differential adjusting type will be described in more detail. Referring to FIGS. 3 and 4, the mechanical section AM includes an input section for receiving a driving force of the engine 2 by way of the automatic transmission 6, the center differential gear 12, the hydraulic multiple disk clutch 28, and output sections for the front wheel side and the rear wheel side.

The input section includes an input gear wheel 113 for meshing with an intermediate shaft 10A side and an input case 124 held in serration coupled to the input gear wheel 113. The input case 124 is mounted for rotation by means of a pair of bearings 114a and 114b to an end cover 115a and a retainer 115b, respectively, secured to the transmission case 115. The input case 124 has such a profile that the diameter increases toward the front (to the left in FIGS. 3 and 4) and has a large diameter portion in which the planetary gear element is accommodated and a small diameter portion formed rearwardly (rightwardly in FIG. 4) of the large diameter portion. An opening is formed at a front end of the large diameter portion of the input case 124 so that the input case 124 may be mounted from rearwardly (rightwardly in FIGS. 3 and 4) onto the output shaft 29 for the rear wheels. A plurality of grooves 124d are formed on an outer periphery of the opening portion of the large diameter portion of the input case 124.

The center differential gear 12 is of the planetary gear type employing a planetary gear mechanism and includes the sun gear 121, a plurality of the planetary pinions (planetary gears) 122 disposed outwardly of the sun gear 121 in such a manner as to surround the sun gear 121, the ring gear 123 disposed around the planetary pinions 122, and the planet carrier 125 for supporting the planetary pinions 122 thereon. The gears and pinions are each formed as a plain gear wheel.

The sun gear 121 is formed integrally with a hollow shaft member 27a, which is held in serration coupled to another hollow shaft 145 together with the front wheel output shaft 27 so that the hollow shaft member 27a and the front wheel output shaft 27 may be rotated integrally with each other by way of the hollow shaft 145. A piston accommodating portion 145a which will be hereinafter described is formed on the hollow shaft 145.

The ring gear 123 is securely mounted on a connecting member 130, which is held in serration coupled to the rear wheel output shaft 29 to couple the ring gear 123 to the rear wheel output section of the mechanical section AM. Consequently, output power of the ring gear 123 is inputted to the propeller shaft 20 by way of the connecting member 130, rear wheel output shaft 29 and bevel gear mechanism 15.

The planet carrier 125 has a plurality of projections 125i formed on an outer periphery thereof for fitting with the grooves 124d of the input case 124 to connect the planet carrier 125 to the input case 124 for integral rotation. Meanwhile, the sun gear 121 is connected to the front wheel output section while the ring gear 123 is connected to the rear wheel output section.

A stopper 134 is provided to fix pinion shafts 126.

The planetary pinions 122 are interposed between the sun gear 121 and ring gear 123 and mounted on the planet carrier 125 by way of the respective pinion shafts 126.

The planet carrier 125 is coupled for integral rotation to the input case 124 and has a base plate portion 125a in the form of a flange, a planetary pinion accommodating portion 125b formed rearwardly of the base plate portion 125a, and a tubular clutch disk supporting portion 125f formed forwardly of the base plate portion 125a.

The members 121, 122, 123 and 125 can be assembled singly in a center differential gear unit in advance, and such sub-assembly of the center differential gear unit can be mounted into the transmission case 115.

After such mounting of the center differential gear unit into the transmission case 115, the input case 124 described above is mounted onto the transmission case 115 in such a manner as to cover over the center differential gear unit.

The hydraulic multiple disk clutch 28 includes a plurality of input side disk plates 28b mounted on the clutch disk supporting portion 125f of the planet carrier 125 and a plurality of front wheel output side disk plates 28a mounted in an alternate relationship with the input side disk plates 28b on a clutch plate 146 which is rotated integrally with the sun gear 121 and front wheel output shaft 27 by way of the hollow shaft 145.

The front wheel output side disk plates 28a of the hydraulic multiple disk clutch 28 are driven by a first piston 141 and a second piston 142 and engageable with the input side disk plates 28b.

The first and second pistons 141 and 142 are accommodated for individual axial movement in the piston accommodating portion 145a formed on an outer periphery of the hollow shaft 145. A partition plate 143 is interposed between the two pistons 141 and 142 and secured to the piston accommodating section 145a so that it may not move in an axial direction.

A first oil chamber 144a is formed between the first piston 141 and the piston accommodating portion 145a of the hollow shaft 145 while a second oil chamber 144b is formed between the second piston 142 and the partition plate 143. Pressure oil is supplied suitably from a hydraulic pressure supplying system not shown into the oil chambers 144a and 144b by way of an oil passageway 117a perforated in a support member 116 secured to the transmission case 115 side and another oil passageway 117b perforated in the hollow shaft 145.

Also the members 28a, 28b, 141, 142, 143, 145 and 146 can be assembled singly in a hydraulic multiple clutch unit in advance, and the sub-assembly of the hydraulic multiple clutch unit can be mounted into the transmission case 115.

The output sections include the front wheel output section and the rear wheel output section, and the front wheel output section includes the front wheel output shaft 27 in the form of a hollow shaft and an output gear wheel 19a mounted on the front wheel output shaft 27 and held in meshing engagement with an input gear wheel 19b of the differential gear 14 for the front wheels. Meanwhile, the rear wheel output section includes the rear wheel output shaft 29 extending through the front wheel output shaft 27, a bevel gear shaft 15A coupled to an end portion of the rear wheel output shaft 29 and another bevel gear wheel 15a mounted on the bevel gear shaft 15A and held in meshing engagement with a further bevel gear wheel 15b at an end portion of the propeller shaft 20.

The output gear wheel 19a is supported on the transmission case 115 side by way of a pair of bearings 114c and 114d while the bevel gear shaft 15A and bevel gear wheel 15a are supported on a transfer case 115c side by way of another pair of bearings 114e and 114f. The reduction gear mechanism 19 is constituted from the output gear wheel 19a and the input gear wheel 19b while the bevel gear mechanism 15 is constituted from the bevel gears 15a and 15b.

It is to be noted that, in FIG. 3, reference numeral 101 denotes a converter housing, 102 an oil pump, 103 a front clutch, 104 a kick-down brake, 105 a rear clutch, 106 a low reverse brake, 107 a planetary gear set, 108 a transfer drive gear, 109 a rear cover, and 112 an end clutch.

Meanwhile, in FIG. 4, reference characters 132a, 132b and 132c denote each a plate for supporting an associated shaft in its axial direction, and reference numeral 133 denotes a circle clip.

Figure 5:
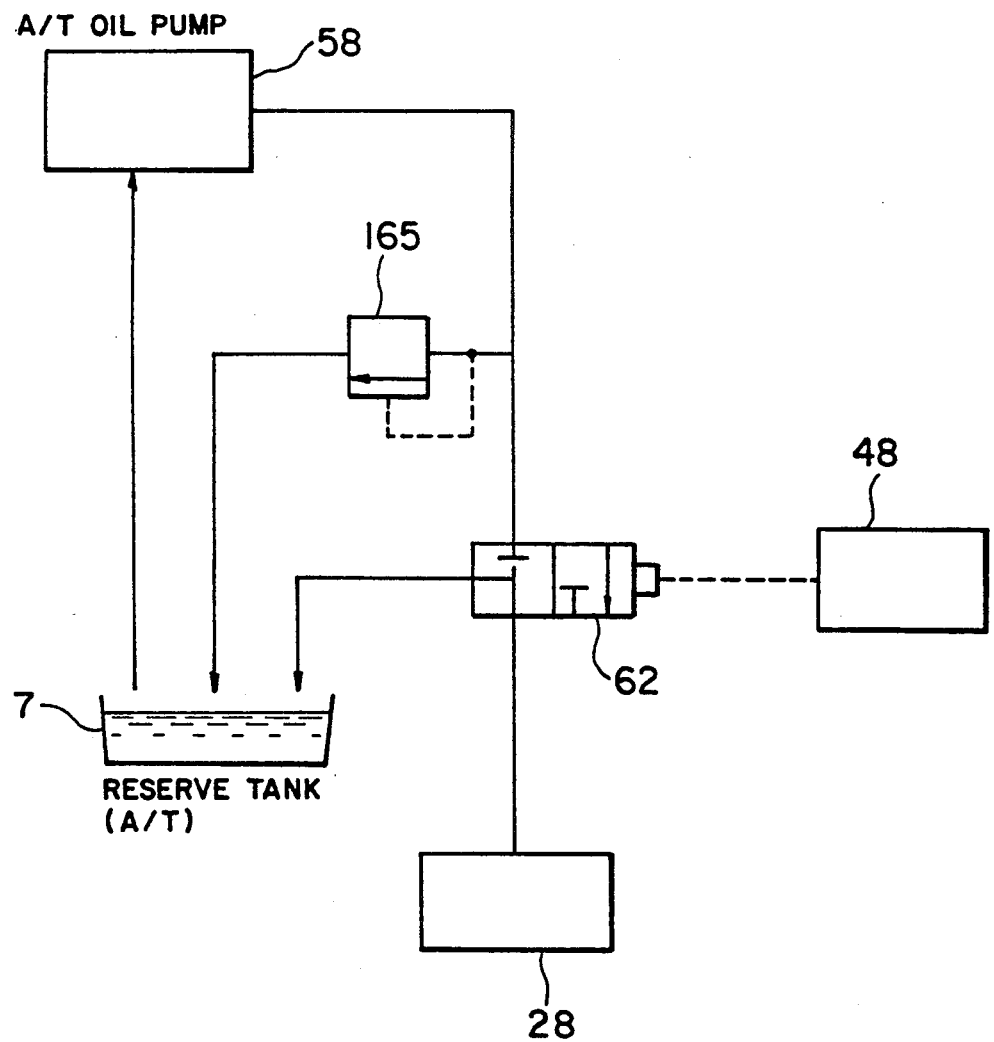
FIG. 5 is a schematic circuit diagram showing a hydraulic pressure supplying system of the driving torque transmitting system.
Figure 6:
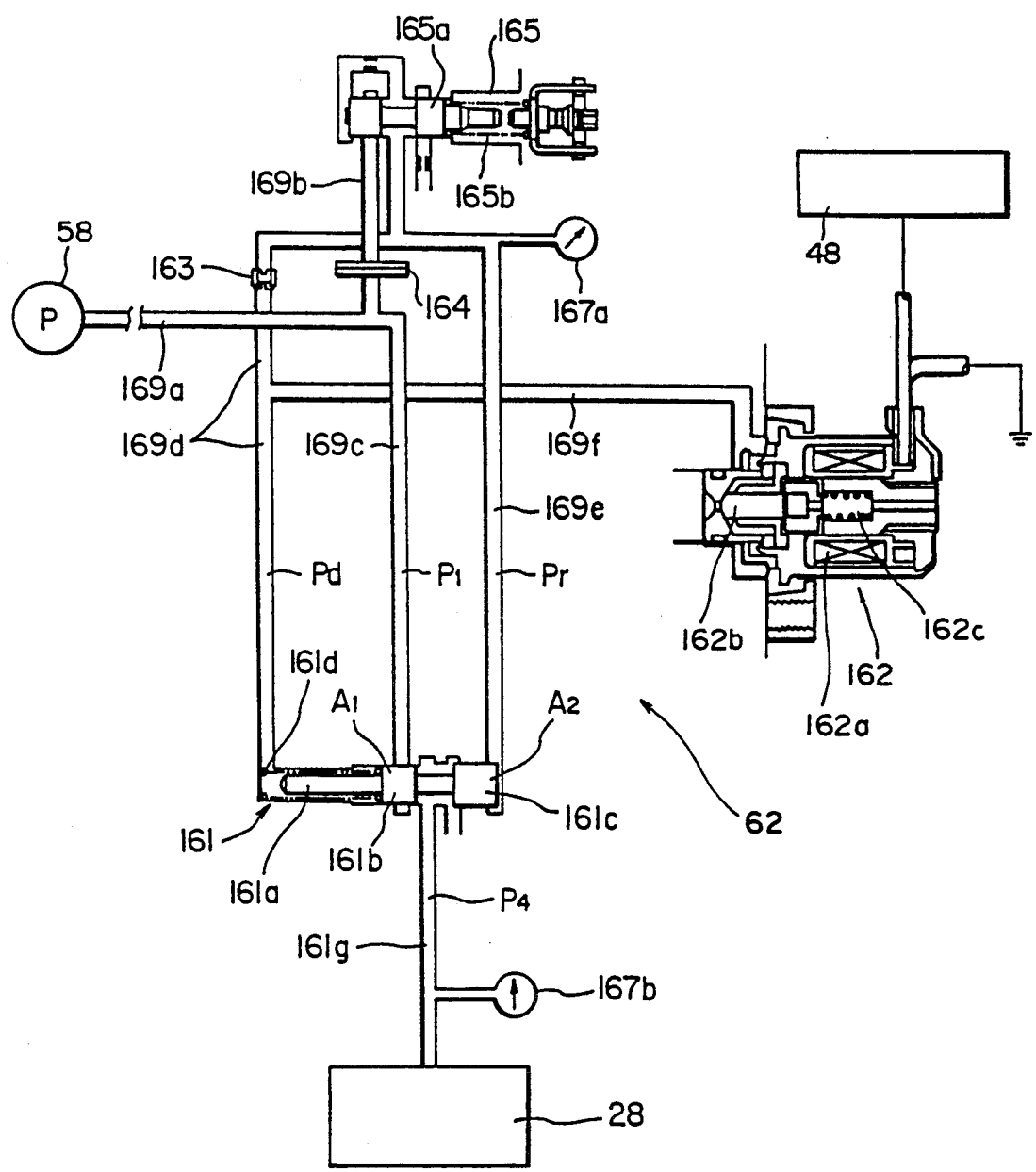
FIG. 6 is a circuit diagram showing details of the hydraulic pressure supplying system.

A hydraulic system for the hydraulic multiple disk clutch 28 is constructed in such a manner as shown in FIGS. 5 and 6. Referring first to FIG. 5, a reserve tank 7 of the automatic transmission 6 is used also as a reserve tank of the hydraulic system for the hydraulic multiple disk clutch 28, and a pump 58 for sucking oil from within the reserve tank 7 is connected at an outlet port thereof to the hydraulic chamber of the hydraulic multiple disk clutch 28 by way of a reducing valve 165 and a pressure controlling valve 62. The reducing valve 165 is opened at a preset pressure, for example, at about 9 kg/cm$^2$ to allow hydraulic oil to be discharged to the reserve tank 7 of the automatic transmission 6. The pressure controlling valve 62 has a first position at which it communicates the hydraulic chamber of the hydraulic multiple disk clutch 28 and the pump 58 with each other and another position at which it communicates the pump 58 and the reverse tank 7 with each other. The position of the pressure controlling valve 62 is controlled by a controlling signal from the controller 48.

Referring now to FIG. 6, the pressure controlling valve 62 is shown more in detail. The pressure controlling valve 62 shown includes a 4WD (four wheel driving) control valve 161 which is in the form of a spool valve and includes a pair of valve body portions 161b and 161c provided on a spool body 161a. The spool body 161a receives a duty pressure (solenoid controlled pressure) Pd and a reducing pressure Pr at the opposite ends thereof and, if the duty pressure Pd drops, the spool body 161a is moved leftwardly in FIG. 6 to put the 4WD control valve 161 into a communicating condition. However, to the contrary if the duty ratio Pd rises, then the spool body 161a is moved rightwardly in FIG. 6 to put the 4WD control valve 161 into a discommunicating condition. The spool body 161a is normally biased in a suitable direction by a spring 161d so that it may move appropriately in such a manner as described just above.

A duty solenoid valve (duty valve) 162 includes a solenoid 162a and a valve body 162b for being driven by the solenoid 162a or a return spring 162c. The valve body 162b is retracted, upon operation of the solenoid 162a, to open an oil passageway 169f, but is advanced, when the solenoid 162a does not operate, by the return spring 162c to close the oil passageway 169f. The duty valve 162 is electronically controlled by the controller (computer) 48 in response to information from the various sensors.

An orifice 163 is interposed between the reducing valve 165 and the 4WD control valve 161 while an oil filter 164 is interposed in an oil passageway 169b to the reducing valve 165.

The reducing valve 165 includes a valve body 165a which is normally biased at a predetermined pressure by a return spring 165b so that the valve body 165a may be automatically moved, when the hydraulic pressure acting thereupon becomes lower than a preset value, so that further hydraulic oil may be supplied thereto, but moved, when the hydraulic pressure becomes higher than the preset value, so that hydraulic oil may be discharged therefrom.

Accordingly, for example, if the solenoid 162a operates so that the duty valve 162 is opened, then the hydraulic pressure (duty pressure) Pd at the left end side of the 4WD control valve 161 drops and consequently the valve body portions 161b and 161c of the 4WD control valve 161 are moved leftwardly by the return spring 161d. Consequently, oil passages 169c and 161g are communicated with each other so that a line pressure $P_1$ is supplied as an operating hydraulic pressure (4WD clutch pressure) $P_4$ into the oil chambers 144a and 144b of the hydraulic multiple disk clutch 28 thereby to engage the hydraulic multiple disk clutch 28.

On the contrary, when the solenoid 162a does not operate and the duty valve 162 is in a discommunicating condition, the hydraulic pressure (duty pressure) Pd on the left end side of the 4WD control valve 161 rises so that the valve body portions 161b and 161c of them are moved rightwardly to such a position as shown in FIG. 6 to disconnect the oil passages 169c and 161g from each other while the 4WD clutch pressure $P_4$ is discharged to disconnect the hydraulic multiple disk clutch 28.

Figure 7:
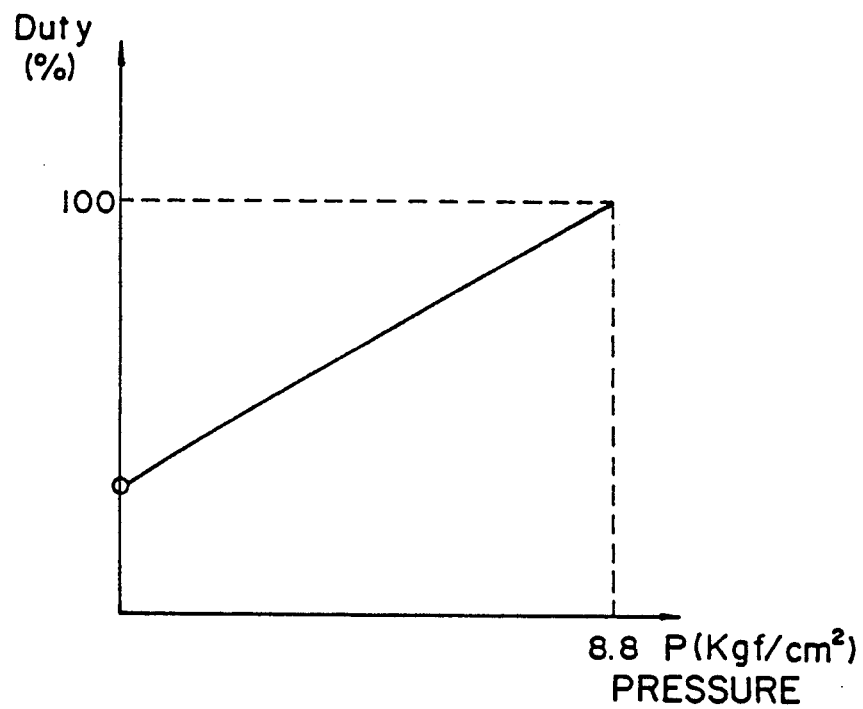
FIG. 7 is a diagram showing a hydraulic pressure setting duty characteristics of the hydraulic pressure supplying system.

The relationship between a duty which is a control index of such duty valve 162 and the 4WD clutch pressure $P_4$ (=control hydraulic pressure P) is such, for example, as shown in FIG. 7. As seen from FIG. 7, when the duty is low, the 4WD clutch pressure $P_4$ is low, and as the duty increases, the 4WD clutch pressure $P_4$ increases. It is to be noted that the reverse setting may alternatively be employed wherein the characteristic present a rightwardly decreasing linear line such that, as the duty decreases, the 4WD clutch pressure $P_4$ rises, but as the duty rises, the 4WD clutch pressure $P_4$ drops.

Subsequently, various components of the controller for executing a control to constrain a differential operation of the center differential gear 12 by the hydraulic multiple clutch 28 (such control will be hereinafter referred to as driving force distribution control or center differential gear control) will be described subsequently with reference to a block diagram of FIGS. 1(a) to 1(c).

In such control, a clutch torque of the hydraulic multiple disk clutch 28 is set in accordance with detection information from the sensors (wheel speed sensors 40, 42, 44 and 46, steering angle sensors 30a, 30b and 30c, lateral acceleration sensor 34, advancing direction acceleration sensor 36, throttle position sensor 38, engine speed sensor 170, transmission speed sensor 180, gear position sensor 160 and so forth). Then, the differential operation hydraulic pressure of the hydraulic multiple disk switch 28 is controlled in accordance with the thus set clutch torque so that an aimed clutch torque may be obtained.

It is to be noted that, among various data, data of ABS information, a vehicle speed, a steering angle, a gear position, SCI (serial communication interface) communication between a control unit for the anti-locking brake system and the engine and so forth are inputted in the form of digital data while data of an advancing direction acceleration, a lateral acceleration, an accelerator opening, a hydraulic pressure control of the multiple disk clutch, a control for the 4WD control unit, an electric current for an electromagnetic clutch of the rear differential gear and so forth are inputted in the form of analog data.

Meanwhile, setting of a clutch torque of the hydraulic multiple disk clutch 28 is performed such that a suitable one is selected from among four torque values including ① a differential operation responding clutch torque Tv with which a control is to be executed taking notice of a differential operation condition (which is a difference in speed of rotation and may be represented as speed difference) between the front and rear wheels so that an ideal differential operation condition may be achieved as front/rear wheel speed difference proportional calculating means; ② an advancing direction responding clutch torque Tx with which a control is to be executed in accordance with an advancing direction acceleration acting upon the vehicle; ③ an engine torque proportional clutch torque Ta which is set in proportion to an engine torque upon sudden starting of the vehicle or the like so that a high road transmitting torque may be obtained in a four wheel driving condition with the front and rear wheels coupled directly to each other; and ④ a protection controlling clutch torque Tpc for protecting the clutch portion of the wet type multiple disk clutch. Setting sections for such clutch torques Tv, Tx, Ta and Tpc will be described successively below.

The differential operation responding clutch torque Tv is used to cause the vehicle to operate in accordance with a will of a driver upon turning of the vehicle. Since it is effective, in order to perform posture control of a vehicle body, to set so that a slip may begin with the rear wheels with the rear wheels used as a driving base, the differential operation responding clutch torque Tv is set so as to realize such an effective condition.

Figure 1A:
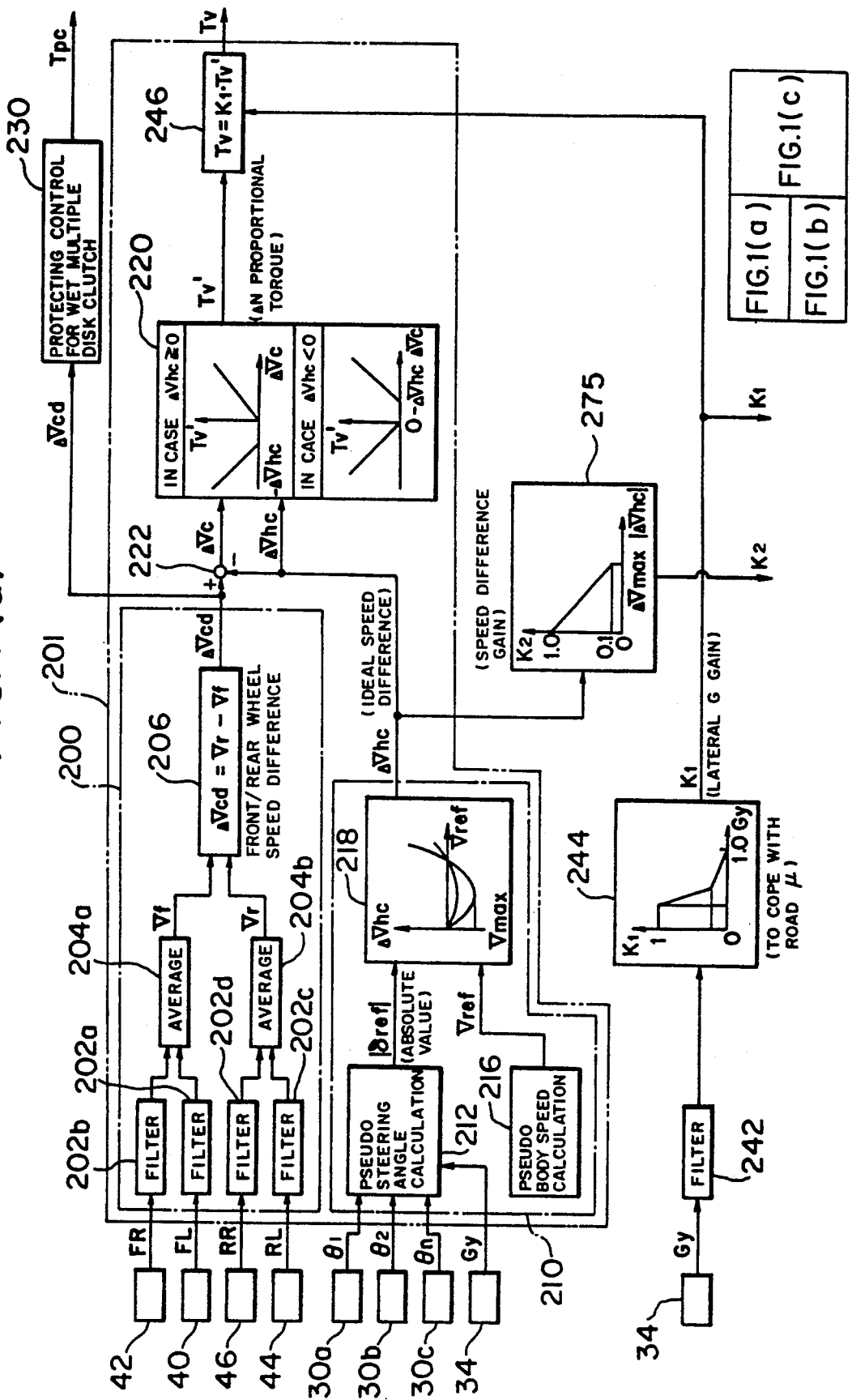

To this end, a section for setting such differential operation responding clutch torque Tv as the front/rear wheel speed difference proportional calculating means 201 is constituted from, as shown in FIG. 1(a), a front-/rear wheel actual speed difference detecting section 200, a front/rear wheel ideal speed difference setting section 210, a differential operation responding clutch torque setting section 220 for setting a clutch torque Tv' from a front/rear wheel actual speed difference ΔVcd and a front/rear wheel ideal speed difference ΔVhc, and a correcting section 246 for correcting such clutch torque Tv' in accordance with a lateral acceleration.

The front/rear wheel actual speed difference detecting section 200 includes four filters 202a to 202d, a front wheel speed data calculating section 204a, a rear wheel speed data calculating section 204b and a front/rear wheel actual speed difference calculating section 206.

The filters 202a to 202d remove fine vibration components of data caused by a disturbance or the like from speed data signals FL, FR, RL and RR of the left front wheel 16, right front wheel 18, left rear wheel 24 and right rear wheel 26 detected by the wheel speed sensors 40, 42, 44 and 46, respectively.

Speeds of the front wheels obtained from the front wheel speed data signals FL and FR are averaged to obtain a front wheel speed Vf by the front wheel speed data calculating section 204a. Meanwhile, speeds of the rear wheels obtained from the rear wheel speed data signals RL and RR are averaged to obtain a rear wheel speed Vr by the rear wheel speed data calculating section 204b.

The front/rear wheel actual speed difference calculating section 206 subtracts the front wheel speed Vf from the rear wheel speed Vr to calculate a front/rear wheel actual speed difference ΔVcd which is a difference in speed of rotation between the front and rear wheels and is equivalent to a difference in speed of rotation at the center differential gear.

The front/rear wheel ideal speed difference setting section 210 includes a driver requested steering angle calculating section (pseudo steering angle calculating section) 212 serving as steering angle data detecting means, an estimated vehicle or car body speed calculating section (pseudo car body speed calculating section) 216 serving as vehicle body speed data detecting means, and an ideal speed difference setting section 218 serving as an ideal operating condition setting section.

Figure 8:
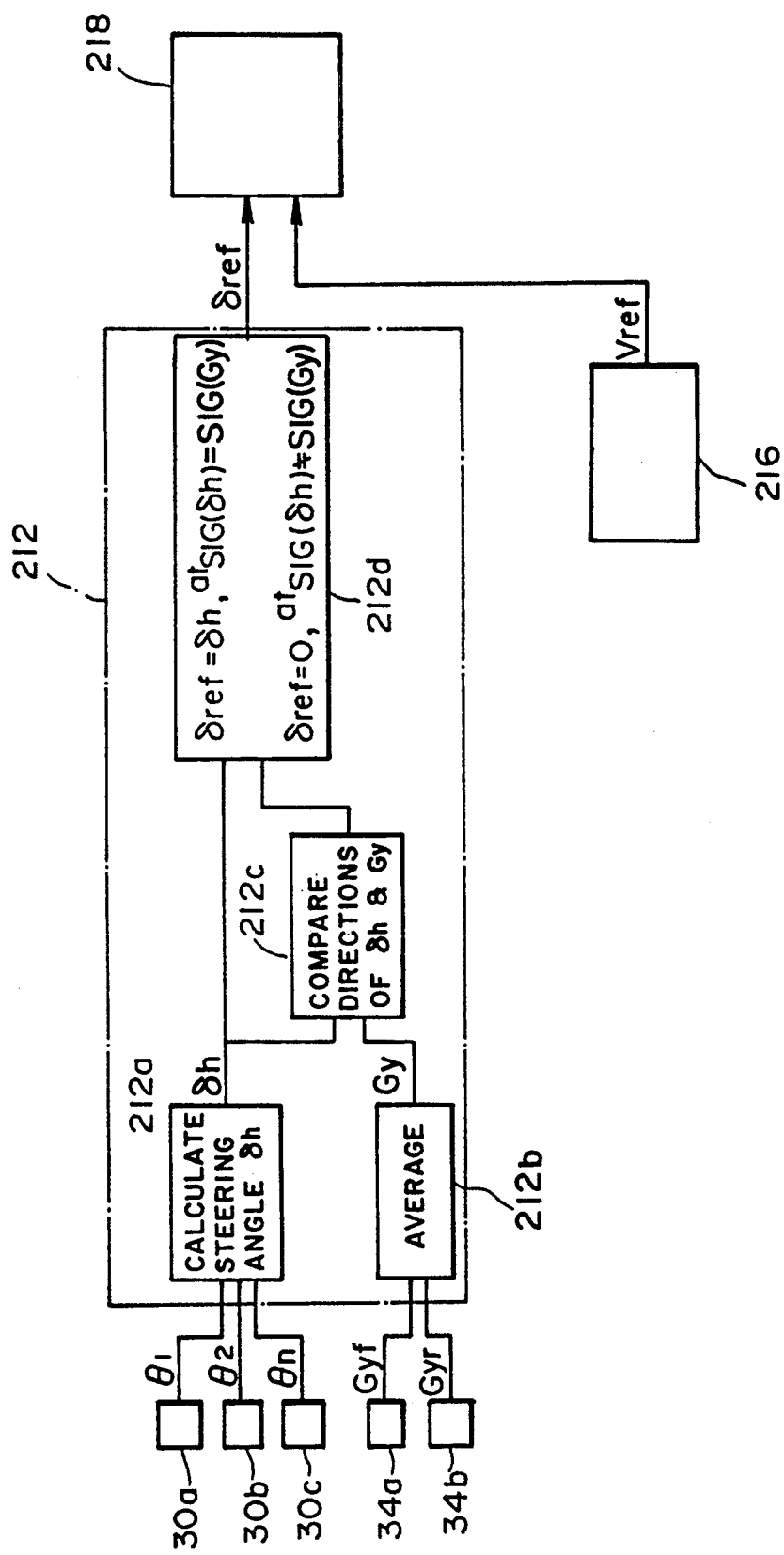
FIG. 8 is a block diagram showing details of steering angle data detecting means of the front/rear wheel torque distribution controlling system.

Referring now to FIG. 8, the driver requested steering angle calculating section 212 serving as the driver requested steering angle data setting means includes a sensor responding steering angle data setting section 212a for calculating a sensor responding steering angle $\delta h$ (=$f(\theta_1, \theta_2, \theta n)$) in accordance with detection data from the first and second steering angle sensors 30a and 30b and neutral position sensor 30c provided for the steering wheel, a lateral acceleration data calculating section 212b for averaging data Gyf and Gyr detected by the lateral acceleration sensors 34a and 34b to calculate lateral acceleration data Gy, a comparing section 212c for comparing a direction of the sensor responding steering angle $\delta h$ and a direction of the lateral acceleration data Gy with each other, and a driver requested steering angle setting section (steering angle data setting section) 212d for setting a driver requested steering angle $\delta ref$ in accordance with a result of comparison at the comparing section 212c.

It is to be noted that the function $\delta h = f(\theta_1, \theta_2, \theta n)$ to obtain a sensor responding steering angle $\delta h$ depends upon specifications of the steering wheel angle sensors.

Further, the sensor responding steering angle $\delta h$ and the lateral acceleration data Gy are determined to be positive in sign when the steering wheel and the vehicle body are turned in a rightward (clockwise) direction, respectively.

In order to compare directions of such sensor responding steering angle $\delta h$ and lateral acceleration data Gy, the following function SIG(x) regarding a direction is set for detection data x:

when $x > 0$, $SIG(x) = 1$ when $x = 0$, $SIG(x) = 0$ and when $x < 0$, $SIG(x) = -1$ Thus, at the a comparing section 212c, comparison between a direction of the sensor responding steering angle $\delta h$ and a direction of the lateral acceleration data Gy is performed by comparing the functions SIG($\delta h$) and SIG(Gy) with each other.

Then, at the driver requested steering angle setting section 212d, when the direction SIG($\delta h$) of the sensor responding steering angle $\delta h$ and the direction SIG(Gy) of the lateral acceleration data Gy are equal to each other, the sensor responding steering angle $\delta h$ is employed as a driver requested steering angle (steering angle data) δref, but when the direction SIG(δh) of the sensor responding steering angle δh and the direction SIG(Gy) of the lateral acceleration data Gy are not equal to each other, the value "0" is employed as a driver requested steering angle δref.

The reason why the value "0" is employed as a driver requested steering angle δref when the direction SIG(δh) of the sensor responding steering angle δh and the direction SIG(Gy) of the lateral acceleration data Gy are not equal to each other is that, when a driver performs such an operation of the steering wheel, for example, as a counter steering operation, a steering position of the steering wheel is sometimes different from an actual steering angle (turning condition) of the vehicle. In such a case, if a steering angle of the vehicle is set from a steering position of the steering wheel, appropriate control cannot be achieved.

Thus, in order to eliminate such possible inconvenience, when the direction SIG(δh) of the sensor responding steering angle δh and the direction SIG(Gy) of the lateral acceleration data Gy are not equal to each other, the driver requested steering angle is set to "0".

Figure 9:
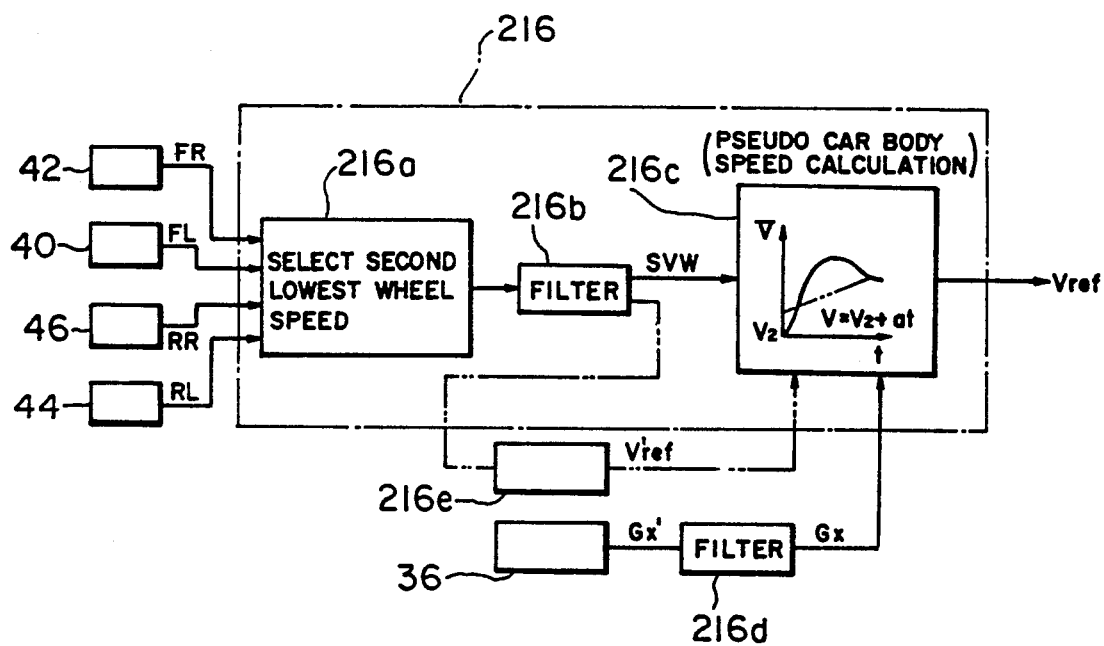
FIG. 9 is a block diagram showing details of car speed detecting means of the front/rear wheel torque distribution controlling system.

Referring now to FIG. 9, the estimated vehicle body speed calculating section 216 includes a wheel speed selecting section 216a for selecting wheel speed data of a second lowest value among speed data signals FL, FR, RL and RR of the left front wheel 16, right front wheel 18, left rear wheel 24 and right rear wheel 26 detected by the wheel speed sensors 40, 42, 46 and 44, respectively, and an estimated vehicle body speed calculating section 216c for setting an estimated vehicle body speed from the thus selected wheel speed data and so forth.

Particularly, the estimated vehicle body speed calculating section 216c receives wheel speed data SVW obtained by introducing wheel speed data selected by the wheel speed selecting section 216a to the filter 216b to remove noise components from the wheel speed data and advancing direction acceleration data Gx obtained by introducing an advancing direction acceleration detected by the advancing direction acceleration sensor 36 to the filter 216d to remove noise components from the advancing direction acceleration, and estimates, from the thus received data SVW and Gx at a certain point of time, a vehicle or car body speed after then. In short, if the wheel speed data SVW at a certain point of time are represented by $V_2$ and the advancing direction acceleration data Gx are represented by a, then a theoretical vehicle body speed Vref after an interval of time t after the certain point of time can be calculated in accordance with an equation Vref=$V_2$+a t.

It is to be noted that the reason why wheel speed data of a second lowest value from among the speed data signals FL, FR, FL and RR is adopted is that, while it is often the case that each wheel is normally slipping to the overspeed side and naturally it is desirable to adopt a speed of a wheel which is rotating at the lowest speed, such wheel speed data of a second lowest value is adopted taking the reliability of data into consideration.

Figure 10:
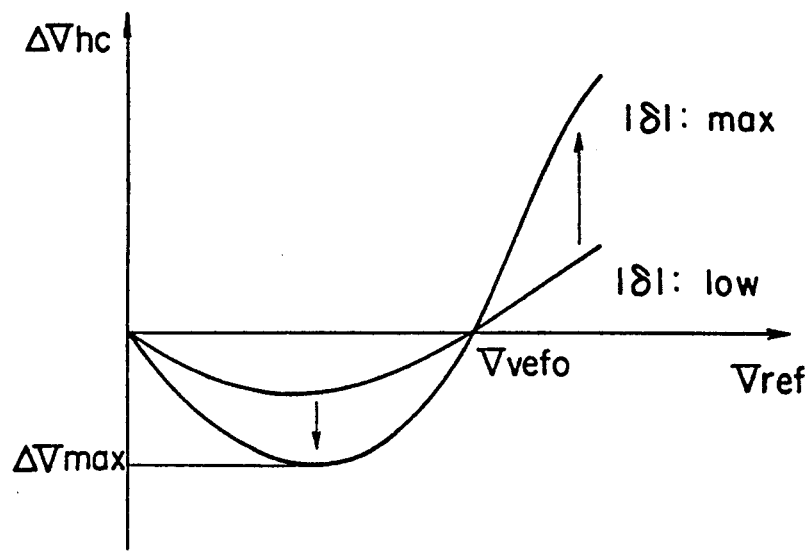
FIG. 10 is a diagram showing an ideal speed difference setting map of the speed detecting means.

Referring back to FIG. 1(a), at the ideal speed difference setting section 218, an ideal speed difference ΔVhc is set from a driver requested steering angle δref calculated at the driver requested steering angle calculating section 212 and an estimated vehicle body speed Vref calculated at the estimated vehicle body speed calculating section 216 using such a map as shown in FIG. 10. As seen from FIG. 10, as for a vehicle speed, when it is low, an influence of a difference in radius between loci of the front and rear wheels is high and the speed Vr of the rear wheels is lower than the speed Vf of the front wheels. However, as the vehicle speed increases, the speed Vr of the rear wheels increases at a greater rate than the speed Vf of the front wheels so as to allow a slip at the rear wheels at a high speed thereby to assure a responsibility of the posture of the vehicle body which is required as the vehicle speed increases. Meanwhile, as for a steering angle, since the required speed difference between the front and rear wheels increases as the steering angle increases, the value of ΔVhc increases as the absolute value |δref| of steering angle data δref increases.

Figure 12A:
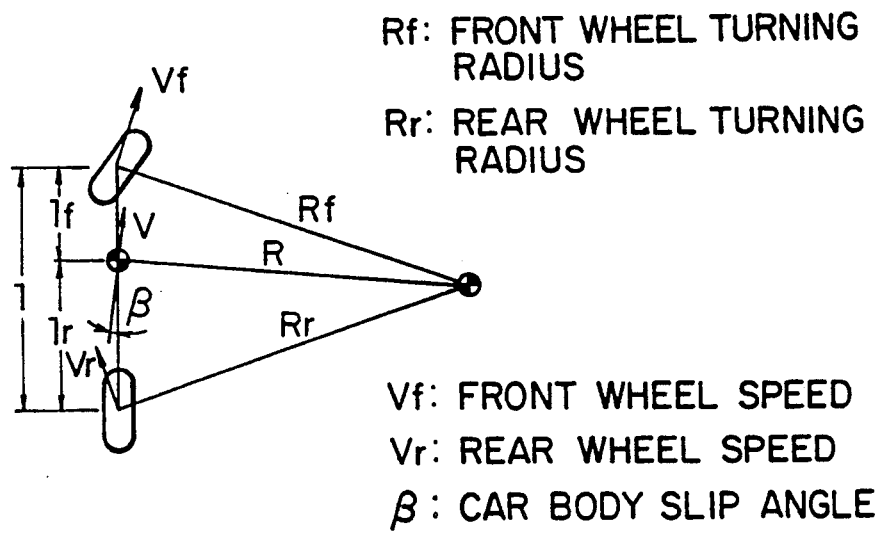
FIGS. 12(a) and 12(b) are plan views diagrammatically showing wheels of the automobile in obtaining an ideal speed difference.
Figure 12B:
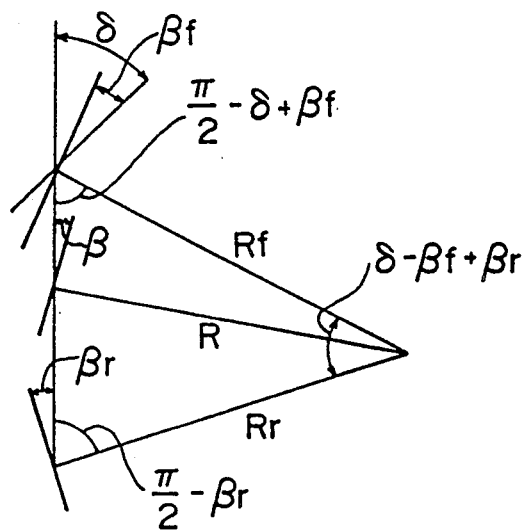

Such speed difference ΔVhc between the front and rear wheels caused by a difference in radius between loci of the front and rear wheels will be described subsequently with reference to FIGS. 12(a) and 12(b). It is to be noted that FIG. 12(a) diagrammatically shows such radius difference in the case of a two-wheel vehicle having a single front wheel and a single rear wheel, and FIG. 12(b) shows such radius difference in a more simplified diagrammatic representation. When a front wheel speed is represented by Vf, a rear wheel speed by Vr, a vehicle speed at the center of gravity of the vehicle by V, a radius of turning motion of the front wheel by Rf, a radius of turning motion of the rear wheel by Rr, a radius of turning motion of the center of gravity of the vehicle by R, a slip angle of the vehicle body by β, a wheel base by l, a distance between the center of the front wheel and the center of gravity by lf and a distance between the center of the rear wheel and the center of gravity by lr as seen in FIGS. 12(a) and 12(b), then a speed difference ΔVhc between the front and rear wheels is given by the following expression:

$$\Delta Vhc = Vr - Vf = [(Rr-Rf)/R] \cdot Vref \quad (1.1)$$

where the radii Rr and Rf and slip angle β are given by the following expressions:

$$Rr = \{R^2 + lr^2 - 2R \, lr \cdot \cos(\pi/2 - \beta)\}^{\frac{1}{2}}$$

$$Rf = \{R^2 + lf^2 - 2R \, lf \cdot \cos(\pi/2 + \beta)\}^{\frac{1}{2}}$$

$$\beta = (1 - (m/2l) \cdot (lf/lr \cdot kr) V^2)/(1 + A \cdot V^2) \cdot lr/l \cdot \delta$$

where m is a weight of the vehicle, kr is a rear cornering power, and A is a stability factor.

Further, if the front and rear wheel speeds Vf and Vr are considered to be theoretical ones, then Vf:Vr=Rf:Rr and Vf:V=Rf:R, and angles βf and βr shown in FIG. 12(b) have a relationship of βf−βr=AV². From the relationships and the expressions given above, the speed difference ΔVhc can be defined as a function between V and δ, that is, ΔVhc=fc(V, δ). In this instance, however, V corresponds to a theoretical value, that is, an estimated vehicle body speed Vref while also δ corresponds to a theoretical value, that is, a driver requested steering angle δref. If such function [ΔVhc=fc(Vref, δref)] is mapped, then such a graph as shown in FIG. 10 is obtained.

By the way, as for a steering angle, there is a turning G responding steering angle δy calculated from a lateral acceleration Gy upon turning of the vehicle (turning G) in addition to an actual steering angle (sensor responding steering angle) δh based on a steering wheel angle θ. Such turning G responding steering angle δy can be calculated in accordance with the following expression:

$$\delta y = [(1 + A \cdot Vref^2)/Vref^2] \cdot l \cdot Gy \quad (1.2)$$

where A is a stability factor, Vref is a theoretical vehicle body speed (driver requested vehicle body speed) which will be hereinafter described, and l is a wheel base.

In contrast to the turning G responding steering angle $\delta y$ calculated in this manner, such as actual steering angle (sensor corresponding steering angle) $\delta h$ as described above is a steering angle on which a will of a driver is reflected at a higher degree. In short, if a driver wants to turn to a greater extent than at present, then $|\delta h| > |\delta y|$, and the steering angle value $|\delta h|$ is adopted so that the magnitude of the ideal speed difference (aimed slip value) can be made greater than that otherwise when the steering angle value $|\delta y|$ is adopted. On the contrary, if the driver wants to turn to a smaller extent than at present, then $|\delta h| > |\delta y|$, and the steering angle value $|\delta h|$ is adopted so that the magnitude of the ideal speed difference (aimed slip value) can be made smaller than that otherwise when the steering angle value $|\delta y|$ is adopted.

Referring back to FIG. 1(a), a front/rear wheel actual speed difference $\Delta Vcd$ detected by the front/rear wheel actual speed difference detecting section 200 and a front/rear wheel actual speed difference $\Delta Vhc$ set by the front/rear wheel ideal speed difference setting section 210 in such a manner as described hereinabove are supplied to a subtractor 222, at which the latter is subtracted from the former ($\Delta Vcd - \Delta Vhc$) to obtain a difference $\Delta Vc$ ($=\Delta Vcd - \Delta Vhc$) between them. The difference $\Delta Vc$ thus obtained and the front/rear wheel ideal speed difference $\Delta Vhc$ are inputted as data to the differential operation responding clutch torque setting section 220.

The differential operation responding clutch torque setting section 220 serving as clutch engaging force setting means sets a clutch torque Tv' in accordance with the difference $\Delta Vc$ ($=\Delta Vcd - \Delta Vhc$) between the front/rear wheel actual speed difference $\Delta Vcd$ and the front/rear wheel ideal speed difference $\Delta Vhc$. In this instance, however, the differential operation responding clutch torque setting section 220 sets a clutch torque Tv' in different manners depending upon whether the front/rear wheel ideal speed difference $\Delta Vhc$ is in the positive or negative.

(i) In the case of $\Delta Vhc \geq 0$

In this instance, the speed of rotation of the rear wheels should be made higher than the speed of rotation of the front wheels. The clutch torque Tv' is set in the follow three manners ① to ③:

① In the case of $\Delta Vcd \geq \Delta Vhc$, the rear wheels are rotating at an overspeed and consequently are slipping, and accordingly, a portion of an engine torque which is disturbed at a high rate to the rear wheel side should be re-assigned to the front wheel side to reduce the slip of the rear wheels. Therefore, the clutch torque Tv' is set in accordance with the following expression $$Tv' = a \cdot (\Delta Vcd - \Delta Vhc) = a \cdot \Delta Vc \quad (1.3)$$

where a is a proportional constant, so that it may increase in proportion to the magnitude of the difference $\Delta Vc$ ($=\Delta Vcd - \Delta Vhc$).

② In the case of $\Delta Vhc > \Delta Vcd > 0$, the actual speed of rotation of the rear wheels is higher than that of the front wheels while the front wheels are slipping, and accordingly, if the clutch torque Tv' is increased in this instance, then an engine torque which is distributed to the front wheel side will be increased to promote the slip at the front wheels. Therefore, the limit to the differential operation should be made free to reduce an engine torque to be distributed to the front wheel side. Thus, in this instance, the clutch torque Tv' is set to "0", thereby setting a so-called dead zone.

③ In the case of $0 \geq \Delta Vcd$, the front wheels are slipping, and accordingly, a distribution of an engine torque to the front wheel side should be decreased to decrease the slip at the front wheels. Therefore, the clutch torque Tv' is set in accordance with the following expression $$Tv' = -a \cdot \Delta Vcd = -a \cdot (\Delta Vc + \Delta Vhc) \quad (1.4)$$

where a is a proportional constant, so that it may increase in proportion to the magnitude of $\Delta Vcd$.

Figure 13A:
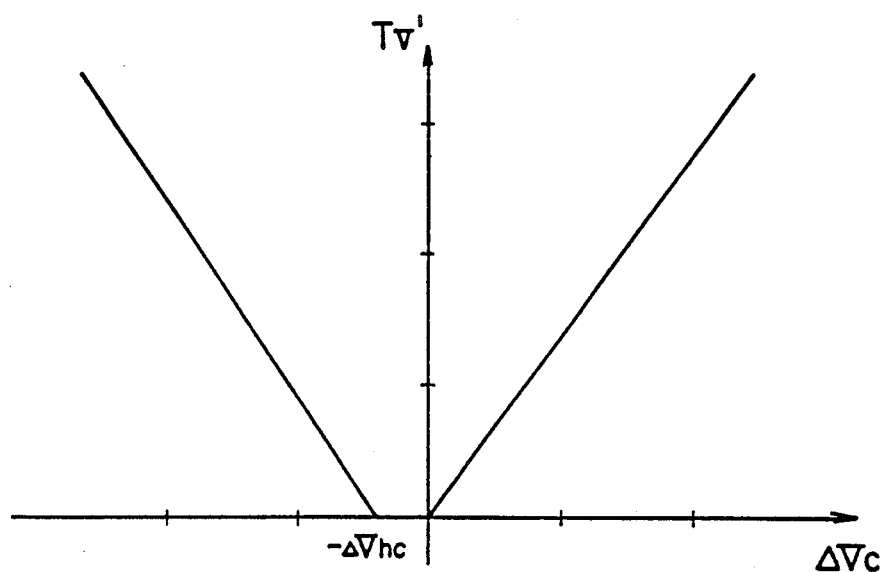
FIGS. 13(a) and 13(b) are diagrams showing differential operation responding clutch torque setting maps corresponding to FIGS. 12(a) and 12(b), respectively.

If such relationship between Tv' and $\Delta Vc$ as described above is mapped, then such a graph as shown in FIG. 13(a) is obtained. Thus, using the map, a differential operation responding clutch torque Tv can be obtained from the difference $\Delta Vc$ and the front/rear wheel ideal speed difference $\Delta Vhc$.

It is to be noted that, in the case of $\Delta Vhc = 0$, the dead zone of $\Delta Vhc > \Delta Vcd > 0$ disappears.

(ii) In the case of $\Delta Vhc < 0$

In this instance, the speed of the front wheels should be made higher than the speed of the rear wheels, and the clutch torque Tv' is set in the following three manners ① to ③:

① In the case of $\Delta Vcd \geq 0$, the rear wheels are rotating at an overspeed and consequently are slipping, and accordingly, a portion of an engine torque which is distributed at a high ratio to the rear wheel side should be re-assigned to the front wheel side to reduce the slip of the rear wheels. Therefore, the clutch torque Tv' is set in accordance with the following expression $$Tv' = a \cdot \Delta Vcd = a \cdot (\Delta Vc + \Delta Vhc) \quad (1.5)$$

where a is a proportional constant, so that it may increase in proportion to the magnitude of $\Delta Vcd$.

② In the case of $0 > \Delta Vcd > \Delta Vhc$, the actual speed of rotation of the front wheels is higher than that of the front wheels while the rear wheels are slipping, and accordingly, if the clutch torque Tv' is increased in this instance, then an engine torque which is distributed to the rear wheel side will be increased to promote the slip at the rear wheels. Therefore, the limit to the differential operation should be made free to reduce an engine torque to be distributed to the rear wheel side. Thus, in this instance, the clutch torque Tv' is set to "0", thereby setting a so-called dead zone.

③ In the case of $\Delta Vhc \geq \Delta Vcd$, the front wheels are slipping, and accordingly, a distribution of an engine torque to the front wheel side should be decreased to decrease the slip at the front wheels. Therefore, the clutch torque Tv' is set in accordance with the following expression $$Tv' = -a \cdot (\Delta Vcd - \Delta Vhc) = -a \cdot \Delta Vc \quad (1.6)$$

where a is a proportional constant, so that it may increase in proportion to the magnitude of $\Delta Vc$ ($=\Delta Vcd - \Delta Vhc$).

Figure 13B:
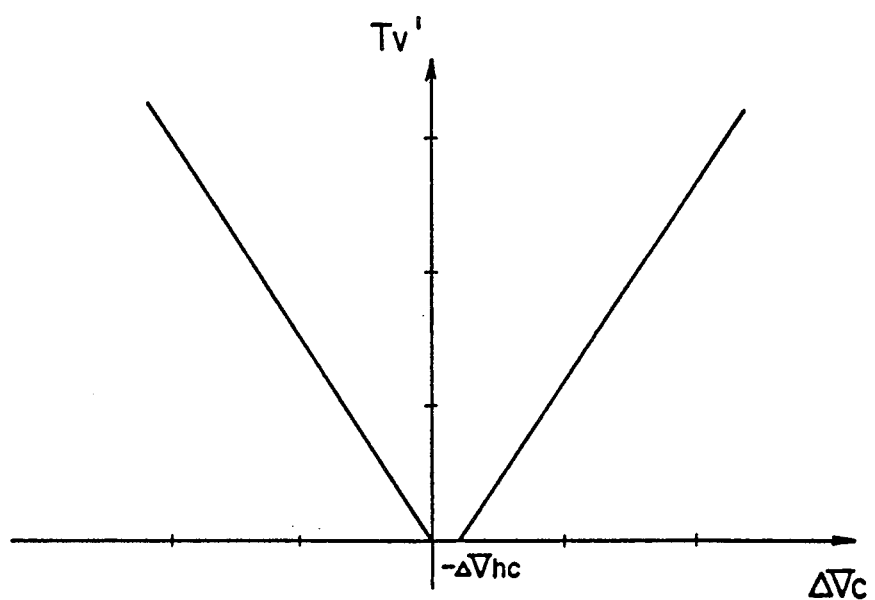

If such relationship between Tv' and $\Delta Vc$ as described above is mapped, then such a graph as shown in FIG. 13(b) is obtained. Thus, using the map, a differential operation responding clutch torque Tv can be obtained from the difference ΔVc and the front/rear wheel ideal speed difference ΔVhc.

A differential operation responding clutch torque Tv' obtained from ΔVc and ΔVhc using the map (FIG. 13(a) or 13(b)) by the differential operation responding clutch torque setting section 220 in this manner is then lateral acceleration corrected at the correcting section 246.

In the correcting section 246, the differential operation responding clutch torque Tv' is multiplied by a lateral G gain $k_1$ to conduct lateral acceleration correction to obtain a differential operation responding clutch torque Tv. In this instance, such lateral G gain $k_1$ is set in the following manner.

In short, detection data Gy from the lateral acceleration sensor 34 are introduced to a filter 242, at which fine vibration components of data which are produced by a disturbance or the like are removed from the data Gy, whereafter the data Gy are transmitted to a lateral G gain setting section 244. At the lateral G gain setting section 244, a lateral G gain $k_1$ is set from the lateral acceleration data Gy using a map shown in the block of the setting section 244 of FIG. 1.

Such lateral G gain $k_1$ is employed in order that a condition of a coefficient $\mu$ of friction of a road may be reflected on a control. It can be determined that the higher the lateral acceleration Gy, the higher the road friction coefficient $\mu$, and it is desired that, as the road friction coefficient $\mu$ increases, the distribution of an engine torque to the rear wheels be increased so that the head turning performance of the vehicle body may take precedence. Thus, when the magnitude of the road friction coefficient $\mu$ (and accordingly the magnitude of the lateral acceleration Gy) increases, the lateral G gain $k_1$ is decreased to effect correction to reduce the preset clutch torque Tv. It is to be noted that, even when the load friction coefficient $\mu$ is high, if the head turning performance of the vehicle body need not take special precedence, correction with such lateral G gain $k_1$ may otherwise be omitted.

An advancing direction acceleration responding clutch torque Tx is used in such front/rear wheel differential operation responding clutch torque control as described above to make it possible, when the vehicle is running on a road having such a low road friction coefficient that all of the four wheels may slip to cause a hunting phenomenon of a control, for such advancing direction acceleration responding clutch torque Tx to act to prevent an excessive under steering condition to achieve a smooth turning movement of the vehicle. Thus, a control is executed by advancing direction acceleration proportional calculating means 203 shown in FIG. 1(b) in accordance with an advancing direction acceleration acting upon the vehicle.

Figure 1B:
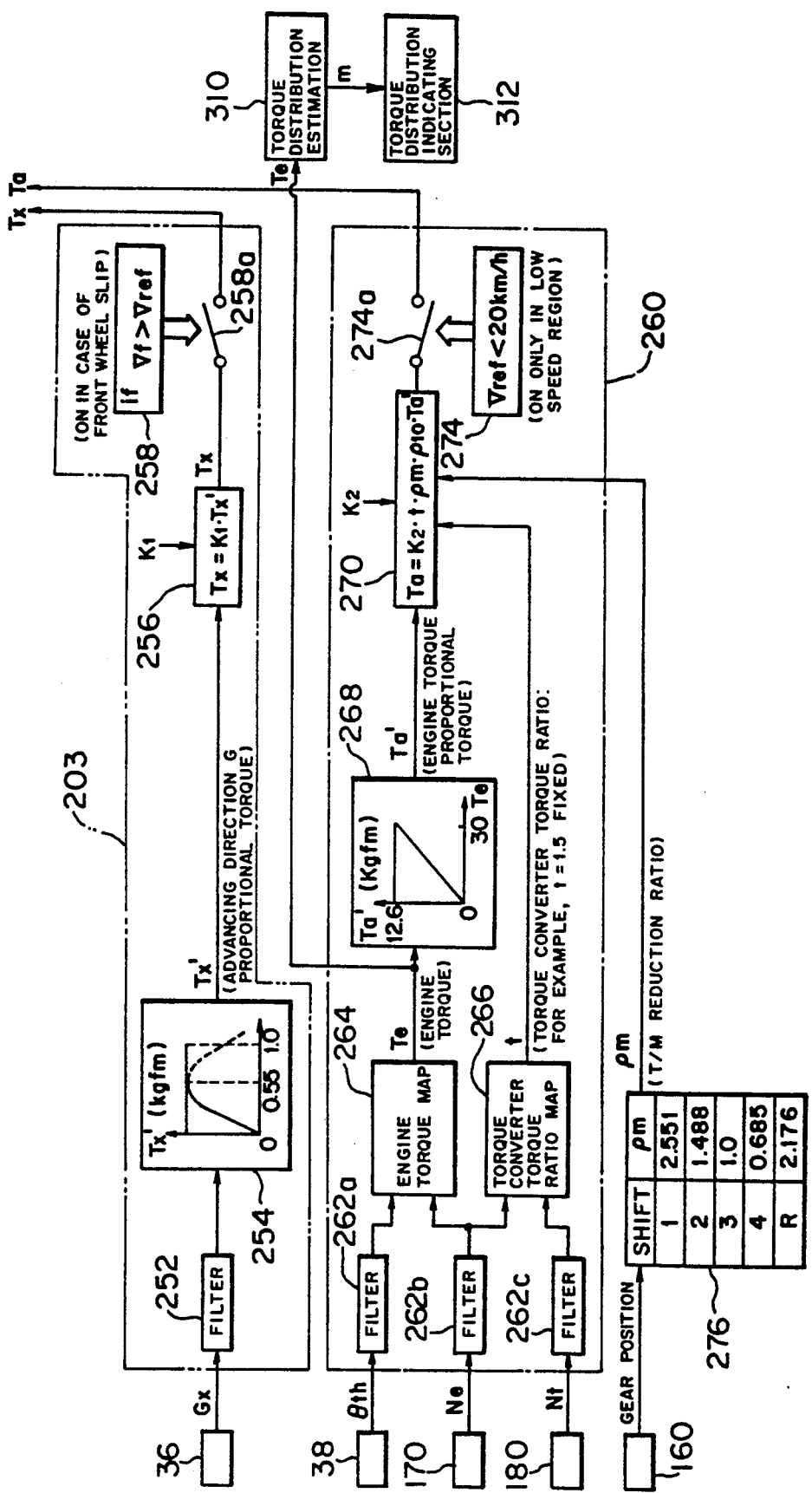

Referring to FIG. 1(b), setting of such advancing direction acceleration responding clutch torque Tx is executed by advancing direction acceleration responding clutch torque setting means 254. Thus, detection data Gx from the advancing direction acceleration sensor 36 are introduced to a filter 252, at which fine vibration components of data produced by a disturbance and so forth are removed, whereafter the data Gx are transmitted to the clutch torque setting means 254.

Figure 14:
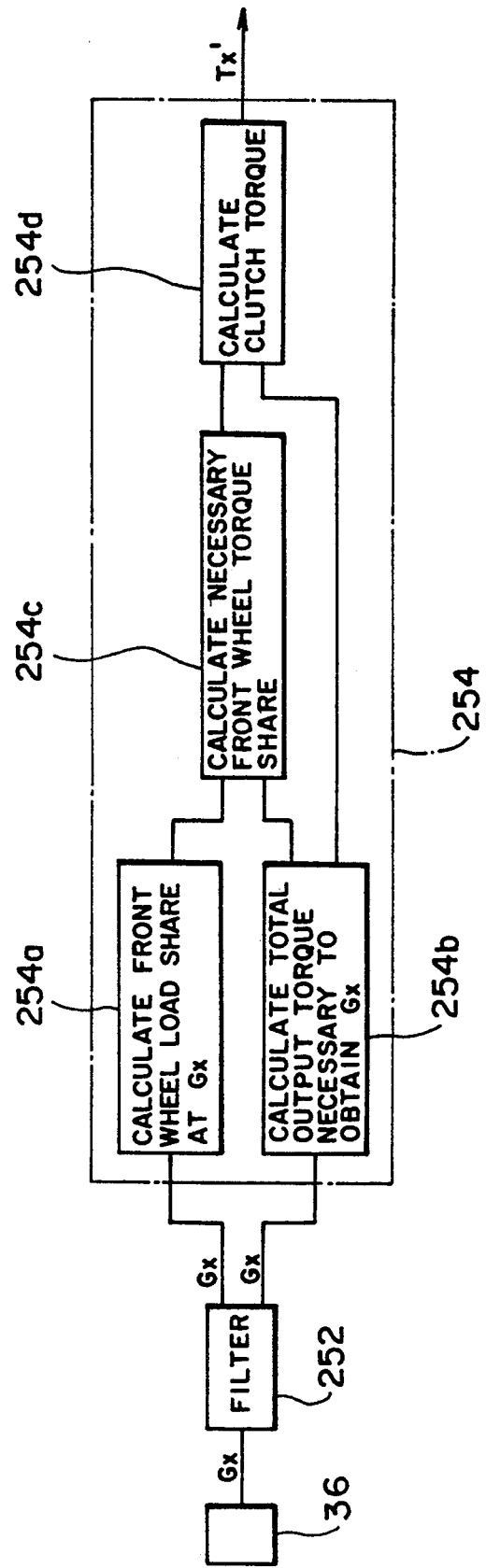
FIG. 14 is a block diagram showing advancing direction acceleration responding clutch torque setting means of the front/rear wheel torque distribution controlling system.

Referring now to FIG. 14, the clutch torque setting means 254 includes front wheel assigned load calculating means 254a, total output torque calculating means 254b, front wheel assigned torque calculating means 254c and clutch torque calculating means 254d.

At the front wheel assigned load calculating means 254a, a front wheel load share or assigned load Wf' upon acceleration is calculated from advancing direction acceleration data Gx. Here, such front wheel assigned load Wf' is calculated from known values of a front wheel assigned load Wf taken in a stopping condition of the vehicle, a vehicle weight Wa, a height h of the center of gravity, a wheel base l and so forth and the advancing direction acceleration data Gx in accordance with the following expression:

$$Wf' = Wf - (h/l) \cdot Wa \cdot Gx \qquad (2.1)$$

At the total output torque calculating means 254b, a necessary total output torque (torque taken on the propeller shaft) Ta is calculated from advancing direction acceleration data Gx. In this instance, such necessary total output torque Ta is calculated from a vehicle weight Wa, a radius Rt of a tire, a final reduction ratio (average value between the rear differential gear and front differential gear) $\rho$ and advancing direction acceleration data Gx in accordance with the following expression:

$$Ta = Wa \cdot Gx \cdot Rt / \rho \qquad (2.2)$$

At the front wheel assigned torque calculating means 254c, a front wheel load share or assigned torque Tf is calculated from a front wheel assigned load Wf' upon acceleration of the vehicle calculated by the front wheel assigned load calculating means 254a and a necessary total output torque Ta calculated by the total output torque calculating means 254b in accordance with the following expression:

$$Tf = (Wf'/Wa) \cdot Ta \qquad (2.3)$$

At the clutch torque calculating means 254d, an advancing direction acceleration responding clutch torque Tx' is calculated from a necessary total output torque Ta calculated by the total output torque calculating means 254b and a front wheel assigned torque Tf calculated by the front wheel assigned torque calculating means 254c.

In short, a front wheel torque distribution Tf by the center differential gear 12 and the hydraulic multiple disk clutch 28 can be represented in the following expression where a rear wheel slip takes place precedently:

$$Tf = [Zs/(Zs+Zr)] \cdot Ta + [Zr/(Zs+Zr)] \cdot Tx' \qquad (2.4)$$

where Zs is a number of teeth of the sun gear 12a, and Zr is a number of teeth of the ring gear 12c.

The expression (2.4) above can be modified in the following manner:

$$Tx' = Tf - [Zs/(Zs+Zr)] \cdot Ta/[Zr/(Zs+Zr)] \qquad (2.4')$$

Accordingly, an advancing direction acceleration responding clutch torque Tx' can be calculated from a necessary total output torque Ta and a front wheel assigned torque Tf.

On the other hand, in order to eliminate Wf', Tf and Ta from the expressions (2.1) to (2.4) above and then solve Tx' for Gx, substituting first the expressions (2.1) and (2.2) into the expression (2.3), the expression $$Tf = (Rt/\rho) \cdot (Wf \cdot Gx - h/l \cdot Wa \cdot Gx^2) \qquad (2.5)$$

is obtained.

Then, from the expressions (2.1), (2.4) and (2.5), the expression $$Tx' = -A \cdot C \cdot (Gx - B/2C)^2 + AB^2/4C \qquad (2.6)$$

is obtained, where $$A = [(Zs + Zr)/Zr] \cdot (Rt/\rho)$$

$$B = Wf - [Zs/(Zs + Zr)] \cdot Wa$$

$$C = (h/l) \cdot Wa$$

Here, if various constants relating to the constants A, B and C are determined such that $Zs=28$, $Zr=60$, $Rt=0.296$ (m), $\rho=3.6$, $Wf=880$ (kg), $Wa=1,595$ (kg), $H=0.55$ (m) and $l=2.6$ (m), then $Tx' = -40.7 (Gx-0.552)^2 + 12.4$. Consequently, $Tx'$ can be represented in such a quadratic curve as shown in FIG. 15 with regard to Gx.

However, while $Tx'$ assumes its maximum value at $Gx \approx 0.55$ but decreases in a region of $Gx > 0.55$, $Tx'$ here is set, taking the safety of control into consideration, to a constant having a value equal to such maximum value also in the region of $Gx > 0.55$. It is to be noted that such setting can be applied also to calculation of an advancing direction acceleration responding clutch torque $Tx'$ by the clutch torque calculating means 254d.

Figure 15:
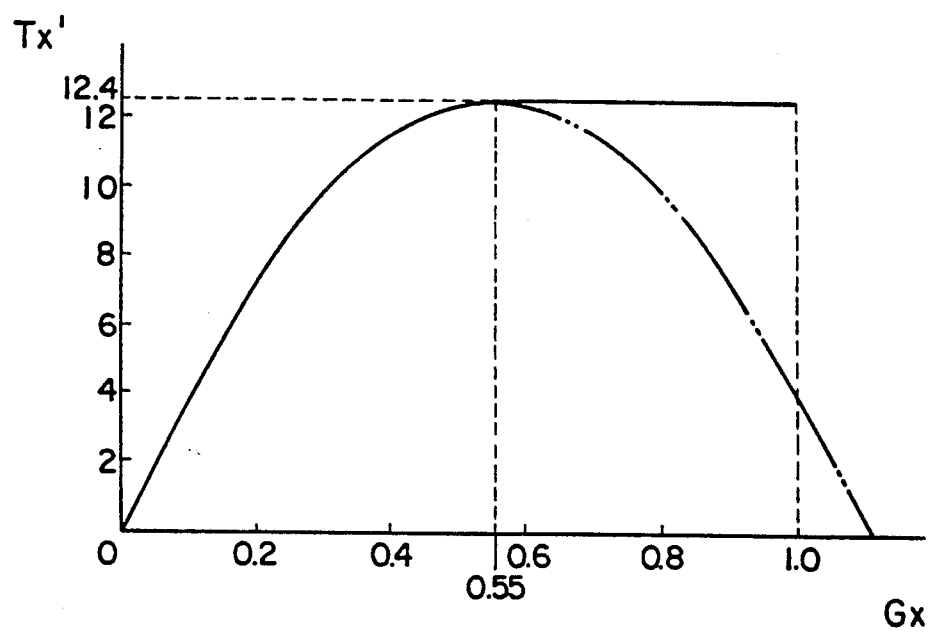
FIG. 15 is a block diagram showing an advancing direction acceleration responding clutch torque setting map of the advancing direction acceleration responding clutch torque setting means.

In the advancing direction acceleration responding clutch torque setting means 254, an advancing direction acceleration responding clutch torque $Tx'$ may otherwise be calculated from advancing direction acceleration data Gx using the map shown in FIG. 15.

Referring back to FIG. 1(b), the advancing direction acceleration responding clutch torque $Tx'$ set in this manner is corrected by a lateral acceleration responding correcting section 256. At the correcting section 256, similar correction to that executed by the aforementioned correcting section 246 is executed such that an advancing direction acceleration responding clutch torque $Tx'$ is multiplied by a lateral gain $k_1$ to effect lateral acceleration correction to obtain an advancing direction acceleration responding clutch torque Tx. Here, however, description of such correction will be omitted to avoid redundancy because such lateral G gain $k_1$ is described hereinabove and the intention of such correction is to have a condition of a friction coefficient $\mu$ of a road reflect on control similarly as described hereinabove.

The advancing direction acceleration responding clutch torque Tx corrected in this manner is outputted as data in response to switching on and off of a switch 258a. The switch 258a operates in response to a signal from judging means 258 such that it is switched on when a front wheel speed Vf is higher than a vehicle body speed Vref, in short, when the front wheels are slipping (upon front wheel slipping), but it is switched off in any other case. As described above, an advancing direction acceleration responding clutch torque control is executed in order to prevent a hunting phenomenon of a differential operation responding clutch torque control upon slipping of the four wheels, and such four wheel slipping is judged by detecting a slip of the front wheels. Accordingly, only when slipping of the front wheels takes place, a set advancing direction acceleration responding clutch torque Tx is outputted, but is not outputted in any other case. In this instance, $Tx=0$ is adopted. After then, when the switch is opened and no clutch torque is outputted, generally the value of the clutch torque is set to 0.

An engine torque proportional clutch torque Ta is adopted to set a directly coupled four wheel driving condition in advance, when it is forecast upon sudden starting from a stopping condition or the like that a transmission torque will become high, so that initial slipping of the rear wheels can be prevented.

Thus, a section (engine torque proportional clutch torque setting means) for setting an engine torque proportional clutch torque Ta, which serves as driving output torque proportional calculating means 260, includes an engine torque detecting section 264 for detecting an engine torque Te at a certain instant, a torque converter torque ratio detecting section 266 for detecting a torque converter torque ratio t then, a transmission reduction ratio detecting section 276 for detecting a reduction ratio $\rho m$ of the automatic transmission then, an engine torque proportional torque setting section 268 for calculating an engine torque proportional torque Ta' from the engine torque Te using a map in which the engine torque proportional torque Ta' is set in a proportional relationship to the engine torque Te, an engine torque proportional clutch torque calculating section 270 for multiplying the engine torque proportional torque Ta' by such torque converter torque ratio t as mentioned hereinabove, a transmission speed reduction ratio $\rho m$, a final reduction speed $\rho_1$ and a speed difference gain $k_2$ to obtain an engine torque proportional clutch torque Ta, and a switch 274a for outputting the thus set engine torque proportional clutch torque Ta as data only when the vehicle speed is low (for example, $Vref < 20$ km/h).

Figure 16:
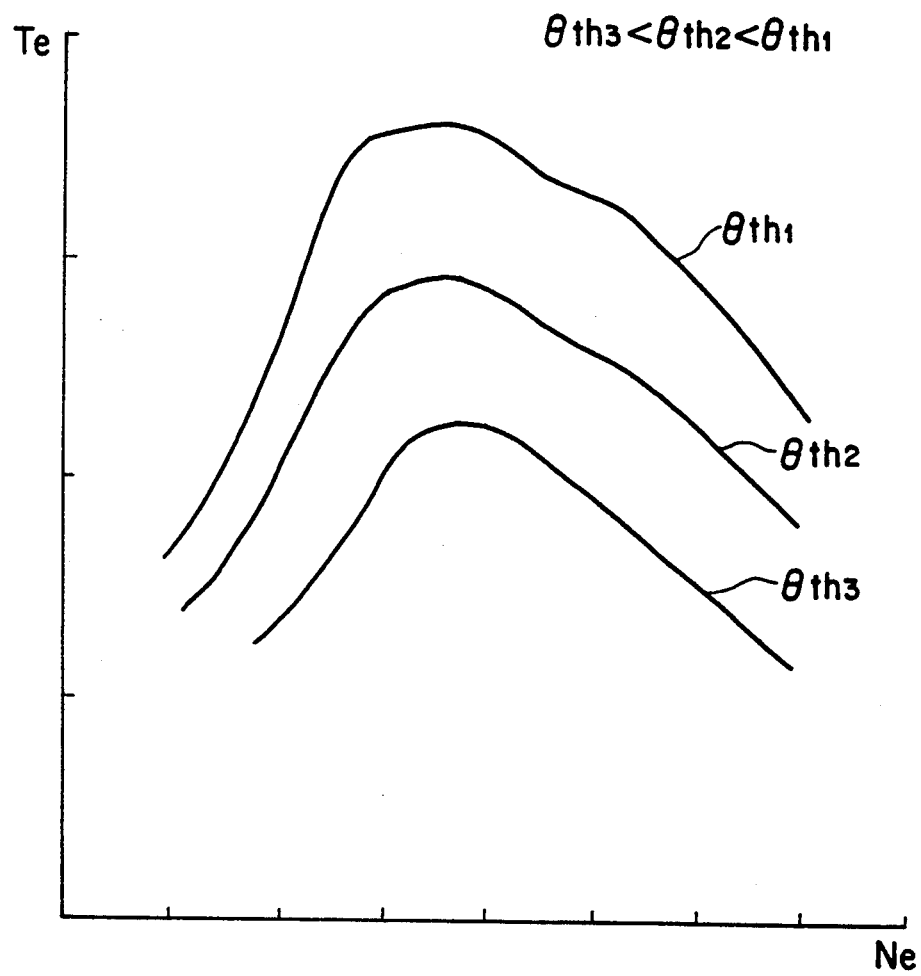
FIG. 16 is a diagram showing an engine torque map of the front/rear wheel torque distribution controlling system.

The engine torque detecting section 264 receives throttle opening data $\theta$th from which fine vibration components of data produced by a disturbance and so forth are removed by a filter 262a to which such data are introduced from the throttle position sensor 38, and further receives engine speed data Ne from which fine vibration components of data produced by a disturbance and so forth are removed by another filter 262b to which such data are introduced from the engine speed sensor 170. The engine torque detecting section 264 thus determines an engine torque Te then from the received throttle opening data $\theta$th and engine speed data Ne using, for example, such an engine torque map as shown in FIG. 16.

Figure 17:
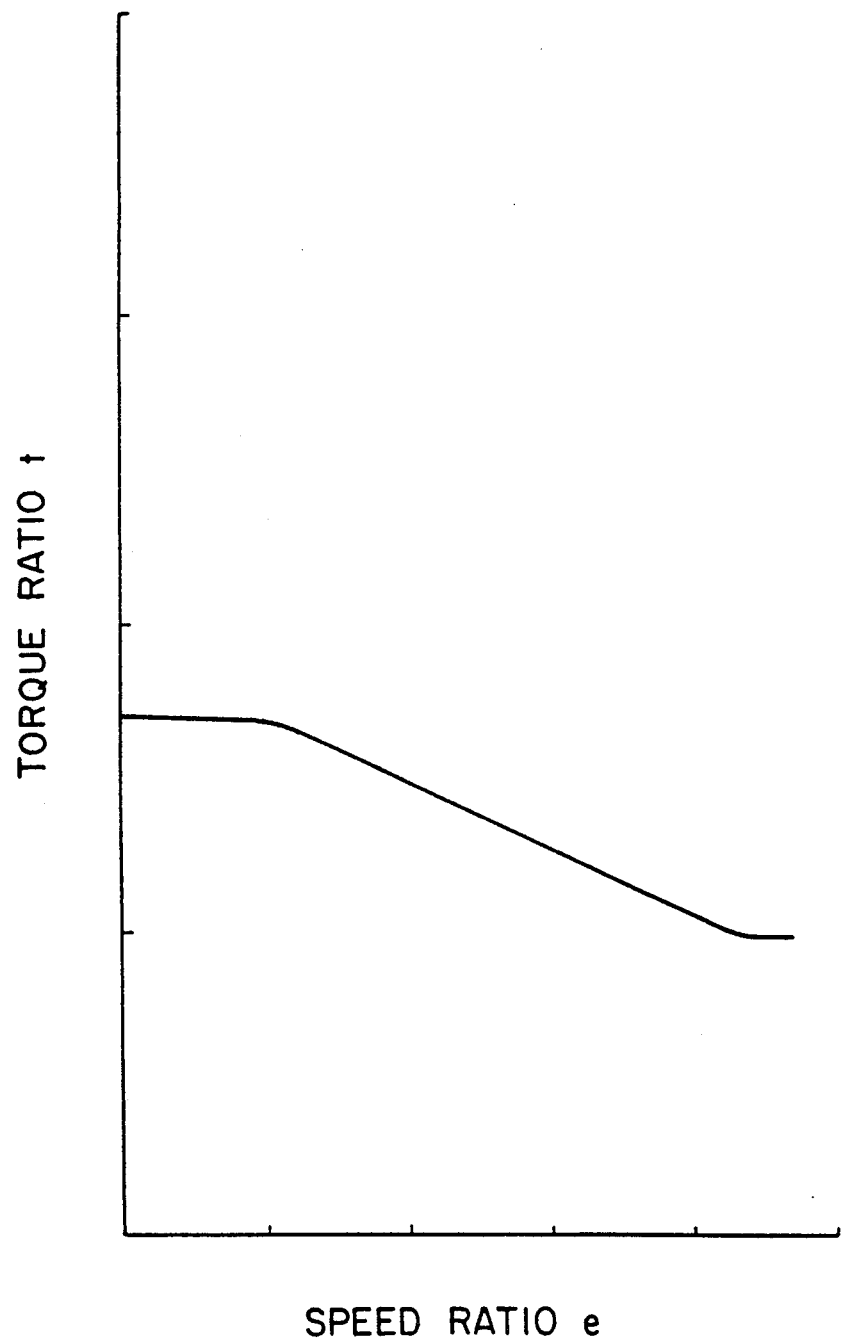
FIG. 17 is a block diagram showing a transmission torque ratio map of the front/rear wheel torque distribution controlling system.

The torque converter torque ratio detecting section 266 receives engine speed data Ne from which fine vibration components are removed by the filter 262b to which such data are introduced from the engine speed sensor 170 and transmission speed data Nt from which fine vibration components are removed by the filter 262c to which such data are introduced from the transmission speed sensor 180. Then, the torque converter torque ratio detecting section 266 finds out a transmission torque ratio t then from the thus received engine speed data Ne and transmission speed data Nt using, for example, such a transmission torque ratio map as shown in FIG. 17.

At the transmission reduction ratio detecting section 276, a transmission reduction ratio $\rho m$ is found out from information of a selected gear position from the shift lever position sensor 160 using such a gear position-reduction ratio map as shown in the block 276 of FIG. 1.

In a map (refer to the block 268 in FIG. 1) for use for the setting at the engine torque proportional torque setting section 268, an engine torque Te and an engine torque proportional torque Ta' have a relationship of a linear line based on a proportional constant which depends upon numbers Zs and Zr of teeth of the sun gear and ring gear, front wheel assigned load Wf, vehicle weight Wa and so forth.

At the engine torque proportional clutch torque calculating section 270, a calculation is executed from an engine torque proportional torque Ta', a torque converter torque ratio t, a transmission reduction ratio $\rho m$, a final reduction speed $\rho_1$ and a speed difference gain $k_2$ determined in such a manner as described above. Here, such speed gain $k_2$ is set in the following manner by the speed gain setting section 275.

Figure 11:
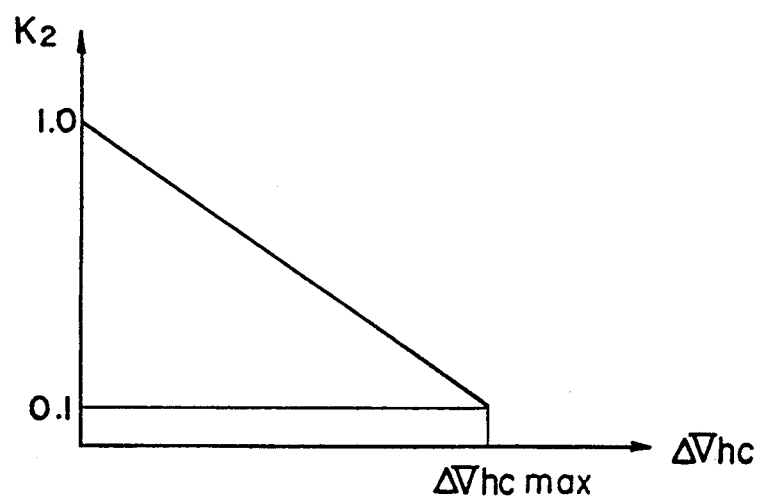
FIG. 11 is a diagram showing a speed difference gain setting map of the speed detecting means.

Referring back to FIG. 1(a), such speed gain $k_2$ is adopted to prevent a tight corner braking phenomenon and determined from an ideal speed difference $\Delta Vhc$ set by the ideal speed difference setting section 218 using such a map as shown in FIG. 11. The relationship between the speed difference gain $K_2$ and the ideal speed difference $\Delta Vhc$ according to the map is represented by the following expression:

$$K_2 = 0.9 \cdot (|\Delta Vhcmax| - |\Delta Vhc|)/|\Delta Vhcmax| + 0.1 \quad (3.1)$$

where $\Delta Vhcmax = MAX\ |\Delta Vhc(\delta = MAX)|$. Further, the coefficient of 0.9 and the constant of 0.1 are used to set a lower limit of $k_2$ to 0.1.

In this manner, as the ideal speed difference $\Delta Vhc$ increases, the speed difference gain $k_2$ decreases linearly, and when the ideal speed difference $\Delta Vhc$ becomes high upon turning of the vehicle or the like, the engine torque proportional clutch torque Ta is decreased by correction by multiplication of such speed difference gain $k_2$ so that the turning performance of the vehicle (such performance as can prevent a tight corner braking phenomenon) may take precedence over the sudden starting performance.

Figure 18:
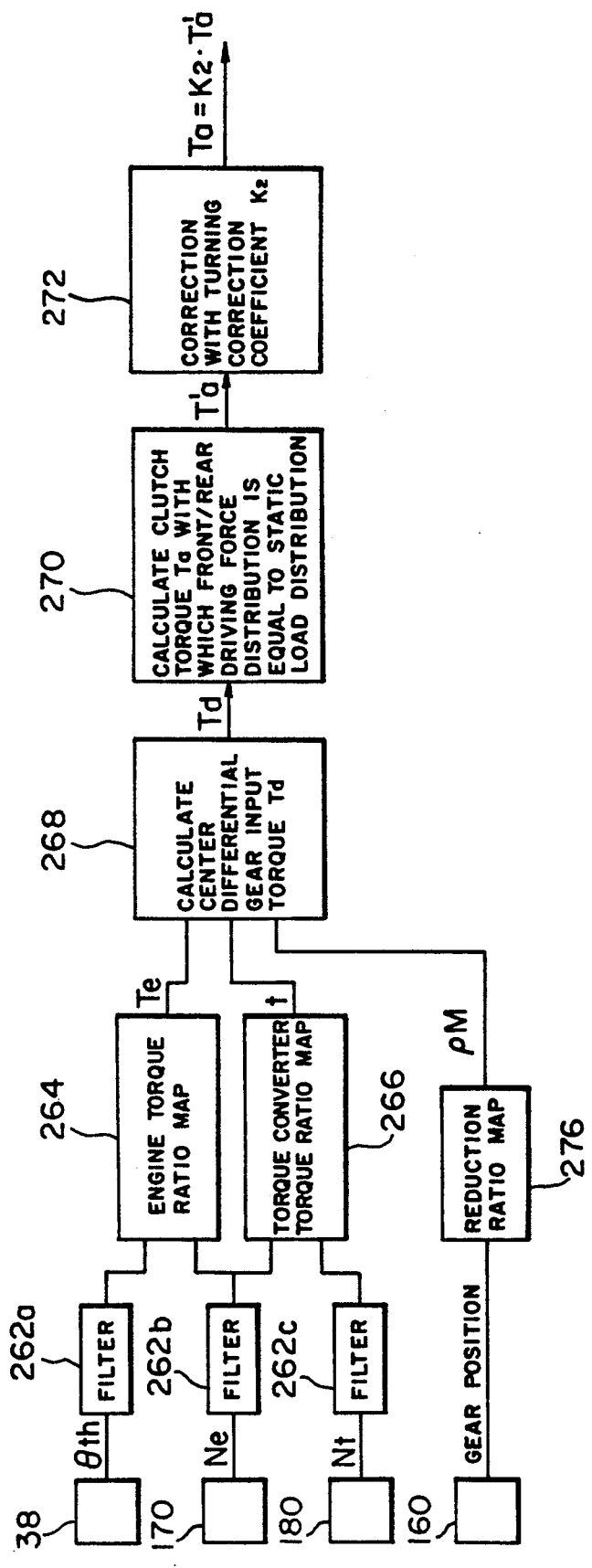
FIG. 18 is a block diagram showing a modification to engine torque proportional clutch torque setting means of the front/rear wheel torque distribution controlling system of FIG. 1.

Referring back to FIG. 1(b), such engine torque proportional torque setting section 268 and engine torque proportional clutch torque calculating section 270 as described above may otherwise be replaced by such a construction which includes a center differential gear input torque calculating section 268, a clutch torque calculating section 270 and a turning correcting section 272 as shown in FIG. 18.

In short, referring to FIG. 18, at the center differential gear input torque calculating section 268, a center differential gear input torque (transmission output torque) Td is calculated from an engine torque Te received from the engine torque detecting section 264, a torque converter torque ratio t received from the torque converter torque ratio detecting section 266 and a transmission reduction ratio $\rho m$ received from the transmission reduction ratio detecting section 276 in accordance with the following expression:

$$Td = t \cdot \rho m \cdot \rho_1 \cdot Te \quad (3.2)$$

where $\rho_1$ is a final reduction ratio.

Figure 19:
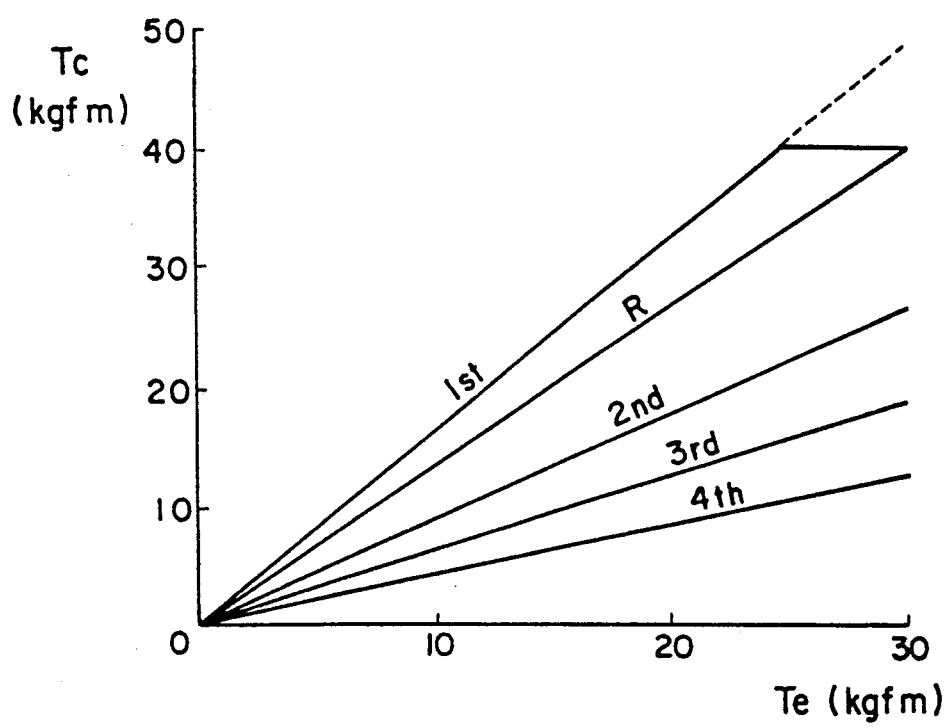
FIG. 19 is a diagram showing a center differential gear input torque setting map of the engine torque proportional clutch torque setting means.

It is to be noted that the relationship between such center differential gear input torque Td and engine torque Te is a proportional relationship for each gear position, and if the torque converter torque ratio t is set to 1.5, then such a relationship as shown in FIG. 19 is obtained. Actually, however, the relationship varies to a great extent depending upon the magnitude of the torque converter torque ratio $t_1$. Accordingly, a torque converter torque ratio t should be determined from a speed ratio i and then a relationship between Td and Te should be determined based on such torque converter torque ratio t.

At the clutch torque calculating section 270, a clutch torque Tc with which an advancing direction driving distribution becomes equal to a static load distribution is calculated in accordance with the following expression:

$$Tc = [(Zs + Zr)/Zr \cdot Wf/Wa - Zs/Zr] \cdot Td \quad (3.3)$$

where Zs is a number of teeth of the sun gear, Zr is a number of teeth of the ring gear, Wf is a front wheel assigned load, and Wa is a vehicle weight.

Then at the turning correcting section 272, the clutch torque Ta' obtained in this manner is corrected with such speed difference gain $k_2$ as described hereinabove to obtain an engine torque proportional clutch torque Ta.

It is to be noted that otherwide the center differential gear input torque calculating section 268 and the clutch torque calculating section 270 may be united such that a clutch torque Ta' may be calculated from an engine torque Te, a torque converter torque ratio t and a transmission reduction ratio $\rho m$ in accordance with the following expression:

$$Ta' = [(Zs + Zr)/Zr \cdot Wf/Wa - Zs/Zr] \cdot t \cdot \rho m \cdot \rho_1 \cdot Te \quad (3.4)$$

Referring back to FIG. 1(b), when the vehicle is running at a low speed, that is, when Vref<20 km/h in the present example, the switch 274a is switched on in response to a signal from judging means 274 so that it may output an engine torque proportional clutch torque Ta as data. However, when the vehicle speed exceeds such value, that is, when Vref≧20 km/h, the switch 274a presents an off-state to stop outputting of an engine torque proportional clutch torque Ta as data. Incidentally, an engine torque proportional control may sometimes cause a tight corner braking phenomenon upon turning of the vehicle at a somewhat high speed or may possibly exclude any other control speed at a stage where permission of a slip is required, and in order to prevent such a possible case, a requirement is provided that such engine torque proportional control be executed only when the vehicle is running at a low speed.

Subsequently, setting of a protection controlling clutch torque Tpc for protecting the clutch portion of the wet multiple disk clutch 28 will be described. Setting of such clutch torque Tpc is executed at a protection controlling section 230.

In short, with such wet multiple disk clutch 28, if the difference in rotation between the clutch disks increases, then a seizure of clutch facings or a damage such as a great amount of abrasion may be caused thereby, and naturally, the greater the difference in rotation and the longer the duration of the condition, the larger the damage. In the meantime, in order to prevent such condition to protect the clutch 28, it may seem a solution to make the clutch free (to cancel engagement between the clutch disks). However, if changing over of the clutch 28 from an engaged condition to a free condition takes place momentarily, then the posture of the vehicle may possibly be changed suddenly. Thus, in order to prevent such possible phenomenon, a protection controlling clutch torque Tpc is set by the protection controlling section 230.

Figure 20:
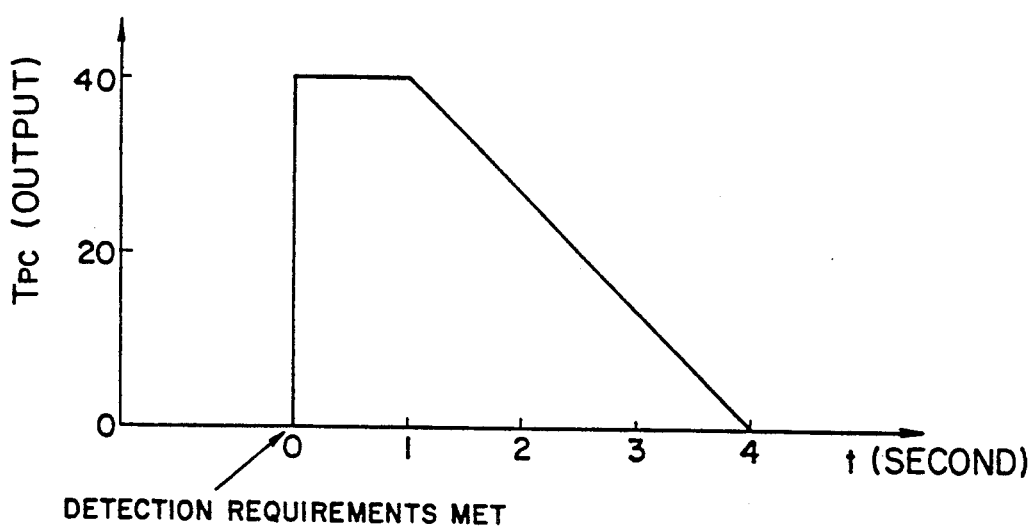
FIG. 20 is a diagram showing a protection controlling clutch torque characteristic of the front/rear wheel torque distribution controlling system.

Referring back to FIG. 1(a), the protection controlling section 230 receives a front/rear wheel actual speed difference ΔVcd calculated by the front/rear wheel actual speed difference calculating section 206 and sets, in case a condition wherein the front/rear wheel actual speed difference ΔVcd is higher than a reference value (8.6 km/h in the present example) continues for longer than a reference period of time (1 second in the present example), a protection controlling clutch torque Tpc in such a pattern as shown in FIG. 20.

In short, if such detection requirement as described above is met, then a protection controlling clutch torque Tpc is first set to an upper limit for a short period of time (1 second in the present example) and then gradually decreased to zero (naturally cancelled). In the present example, the relationship between the protection controlling clutch torque Tpc and the time t is such as given by the following expression:

$$Tpc = 40 - 14t \qquad (4.1)$$

It is to be noted that a period of time for which an upper limit is adopted and a rate at which the clutch torque Tpc is gradually decreased to zero (such rate corresponds to an inclination of the curve in FIG. 20) are desirably set to optimum values in accordance with characteristics of the vehicle in question.

On the other hand, in case the detection requirement described above is not met, the protection controlling clutch torque Tpc is set to zero.

The clutch torques described above including the differential operation responding clutch torque Tv, advancing direction acceleration responding clutch torque Tx, engine torque proportional clutch torque Ta and protection controlling clutch torque Tpc are individually set for each control cycle which is repeated at a suitable timing, and the thus set clutch torques Tv, Tx, Ta and Tpc are transmitted to the maximum value selecting section 280.

Referring now to FIG. 1(c), the maximum value selecting section 280 selects, for each control cycle, a maximum one from among the clutch torques Tv, Tx, Ta and Tpc (such maximum clutch torque is represented by Tc). It is to be noted here that, when the switch 258a or 274a (FIG. 1(b)) is in an off-state, the clutch torque Tx or Ta is not transmitted to the maximum value selecting section 280, and consequently, the maximum value selecting section 280 selects a maximum value from among clutch torques transmitted thereto.

The clutch torque Tc selected in this manner is transmitted to a torque-pressure converting section 282, at which a clutch controlling pressure Pc with which the thus set clutch torque Tc will be obtained is set.

The torque-pressure converting section 282 finds out a clutch controlling pressure Pc from the received clutch torque Tc using a map (refer to the block 282 in FIG. 1(c)). Since such clutch torque Tc and clutch controlling pressure Pc generally have a proportional relationship, the map which is used presents such a linear line as seen in FIG. 1(c).

Further, the thus modified clutch controlling pressure Pc subsequently undergoes centrifugal pressure correction and pre-pressure correction at an adding-/subtracting unit 284 serving as pre-pressure applying means.

Centrifugal pressure correction is performed by subtracting a centrifugal correction pressure Pv set by centrifugal correction pressure setting section 286 from a clutch controlling pressure Pc. At the centrifugal correction pressure setting section 286, a centrifugal correction pressure Pv is determined from a front wheel speed Vf calculated by the front wheel speed data calculating section 204a using such a map as shown in the block 286. This is because a centrifugal hydraulic pressure is produced in accordance with a front wheel speed Vf since the piston chamber rotates in synchronism with the front wheel side shaft. Thus, the centrifugal correction pressure Pv is set such that it may vary directly as square a front wheel speed Vf.

Pre-pressure correction is executed by adding an initial engaging pressure (initial pressure) Pi set by an initial engaging pressure setting section (pre-pressure setting section) 288 as a pre-pressure to a clutch controlling pressure Pc.

The purpose of such pre-pressure correction is to maintain the clutch disks of the clutch 28 in a very delicate contacting condition in which a drag torque is not produced (that is, in a condition wherein the clutch disks contact very slightly with each other) to assure a high control responsibility. However, clearances between clutch disks of a clutch will vary for different products at a stage of production and further will vary with a same product as time passes. Particularly, since a return spring for clutch disks generally has a high spring force, a tolerance between different portions or a secular change has a high influence upon clearances between clutch disks. Therefore, it is necessary to always try to maintain the clutch disks in a very delicate contacting condition while detecting a clearance condition between the clutch disks at a suitable timing.

To this end, the pre-pressure setting section 288 learns, at a suitable interval of time, to what degree a pre-pressure is required, and sets an initial pressure Pi.

Such pre-pressure learning (setting of an initial pressure Pi from a pre-pressure learned value) can be performed by various techniques, and here, three techniques for pre-pressure learning will be described.

A first pre-pressure learning technique will be described first. Pre-pressure learning must be performed in such a situation that the engine is in a steadily operating condition (which can be discriminated from the fact that the temperature of oil of the engine presents a predetermined level in a stable condition) and a fixed line pressure is obtained and further, no influence will be had on any other control regarding the clutch 28. To this end, requirements for pre-pressure learning are set, for example, in the following manner.

① That more than 30 minutes have elapsed after the ignition key was changed into an on-state.

② That the shift selector is selectively positioned at one of the "1" (first speed) position, "2" (second speed) position, "D" (driving) position and "N" (neutral) position. The reason why neither of the "P" (parking) and "R" (reverse) positions is included is that, in the present example, when the shift selector is at either of the "P" and "R" positions, a very high hydraulic pressure is outputted comparing with that when the shift selector is at the "1", "2", "D" or "N" position.

③ That the vehicle body speed Vref is equal to 0 (i.e., Vref=0 km/h).

④ That the clutch torque Tc is equal to or lower than a predetermined low value (1 kgfm) (i.e., Tc≦1 kgfm).

If all of the four requirements given above are met simultaneously, pre-pressure learning is performed in the following manner.

Figure 21A:
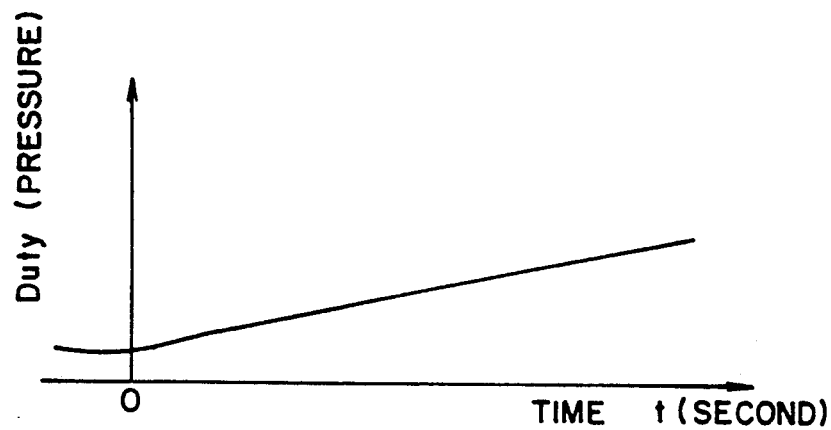
FIGS. 21(a) and 21(b) are diagrams showing a duty characteristic and a pressure characteristic, respectively, in first pre-pressure learning of the front/rear wheel torque distribution controlling system.

Referring to FIG. 21(a), first a duty equivalent to a pressure (for example, P=0.4 kgf/cm²) higher than a biasing pressure of the return spring of the multiple disk clutch 28, but lower than a designed initial engaging pressure of the clutch 28, is applied for 2 seconds, and then the duty is swept moderately at an increasing rate of, for example, 1.5%/sec to a duty equivalent to, for example, P=3.0 kgf/cm².

Figure 21B:
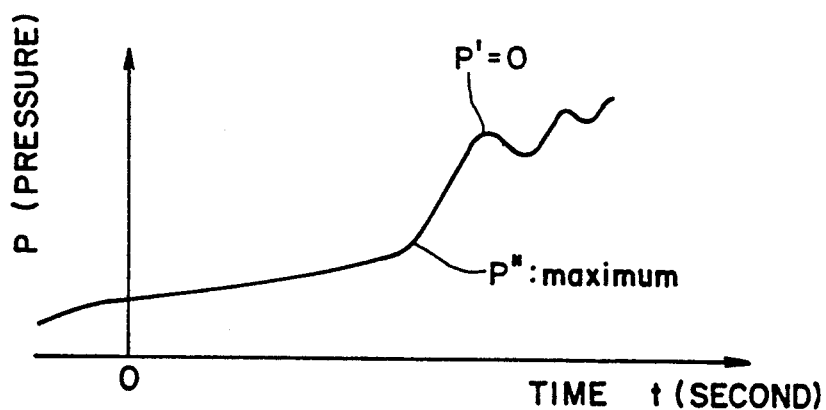

In this instance, the pressure P applied to the hydraulic pistons 141 and 142 presents such a variation as shown in FIG. 21(b). In short, in an initial condition, the clutch disks of the multiple disk clutch 28 are in a disengaged condition from each other, and when the duty rises moderately, the hydraulic pistons 141 and 142 are moved in accordance with such rise of duty, whereupon also the pressure P rises moderately. However, when the hydraulic pistons 141 and 142 move to a particular position, the clutch disks are contacted with each other, and consequently, also the force of the return spring thereafter takes part in the pressure P so that the pressure P increases suddenly. Then, when the hydraulic pistons 141 and 142 are further moved, the clutch disks are contacted strongly with each other to establish full engagement of the multiple disk clutch 28. Such condition can be discriminated from the fact that the pressure P exhibits its upper limit value.

Here, a value (difference) P″ obtained by differential of second order of a detected pressure P for time and another value (difference) P′ obtained by differential of first order of such pressure P for time are calculated from time to time at a short interval, and a time at which the differential value P″ of second order exhibits a maximum value is determined as a starting time of contact of the clutch disks with each other and the pressure P then is determined as an initial pressure. Further, another time at which the differential value P′ of first order exhibits a maximum value is determined as a time at which the clutch disks are engaged fully with each other.

More particularly, when learning is started and the pressure P rises, a maximum value of the differential value P″ of second order and a pressure P are then stored. The differential value P″ of second order is calculated for each short control period and updated suitably.

Then, when the differential value P′ exhibits the value "0" (in short, when the multiple disk clutch 28 is engaged completely), calculation of the differential value P″ of second order is stopped, and a pressure P when the differential value P″ of second order assumes a maximum value for a period of time till then is stored as an initial pressure Pi.

It is to be noted that, if any of the requirements ① to ④ for pre-pressure learning described hereinabove is no longer met during execution of such pre-pressure learning, then the pre-pressure learning is stopped suddenly and control returns to a normal mode.

Further, if the ignition key is turned on and such pre-pressure learning as described above is executed once, then pre-pressure learning will not be executed until the ignition key is turned off once and then turned on again.

Subsequently, a second technique of pre-pressure learning by the pre-pressure setting section 288 will be described.

Also the present pre-pressure learning must be executed in such conditions that the engine exhibits a predetermined high oil temperature in a stable condition and a fixed line pressure is obtained and further, no influence is had on any other control regarding the clutch 28. However, since it is intended to try such pre-pressure learning several times, the requirements for pre-pressure learning described above are somewhat loosened, and for example, such requirements for pre-pressure learning as described below are set here.

①′ That more than 10 minutes have elapsed after the ignition key was turned on.

② That the shift selector is selectively positioned at one of the "1" (first speed) position, "2" (second speed) position, "D" (driving) position and "N" (neutral) position.

③ That the vehicle body speed Vref is equal to 0 (i.e., Vref=0 km/h).

④ That the clutch torque Tc is equal to or lower than a predetermined low value (1 kgfm) (i.e., Tc≦1 kgfm).

⑤ That a predetermined interval of time (for example, 5 minutes or so, or a suitable interval of time shorter than 5 minutes) has elapsed after a preceding trial.

If all of the five requirements given above are met simultaneously, pre-pressure learning is performed in the following manner.

First, a duty equivalent to a preset initial pressure Pi (=P₁) is held for a predetermined period of time (for example, for 2 seconds), and then the duty is swept to a duty equivalent to P=8.8 kgf/cm2 (which is a duty of almost 100%) for a predetermined time (for example, for 1 second).

Figure 22:
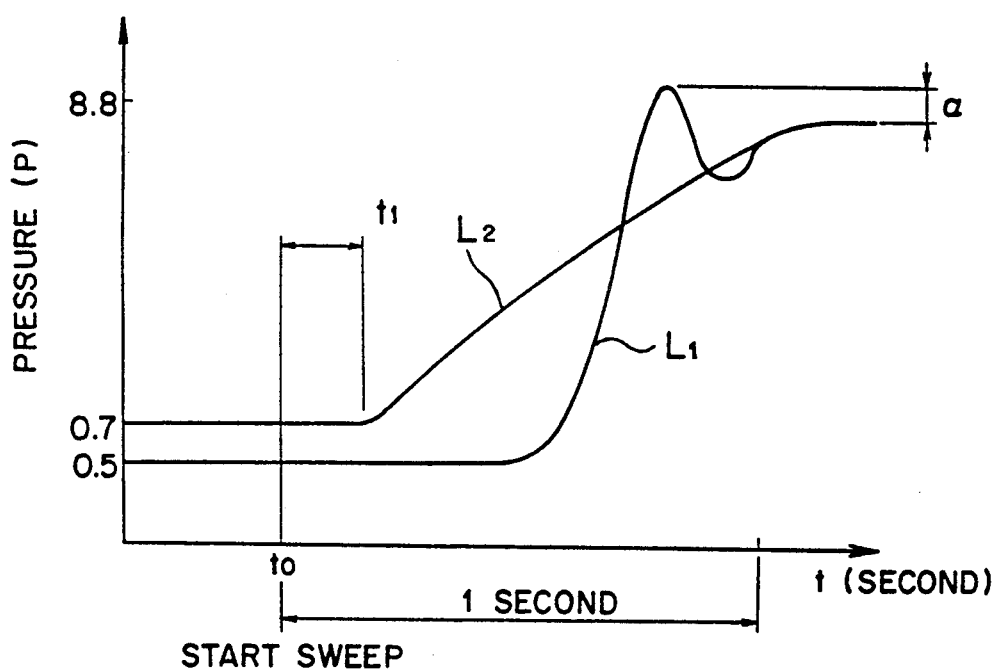
FIG. 22 is a diagram showing a pressure characteristic in second pre-pressure learning of the front/rear wheel torque distribution controlling system.

In this instance, the pressure P applied to the hydraulic pistons 141 and 142 can present such variations of two patterns as shown by curves L₁ and L₂ in FIG. 22, respectively.

In short, the multiple disk clutch 28 is in a disengaged condition at the initial pressure P₁, and when the duty is swept as shown by the curve L₁, the clutch is engaged to start a drag thereof. Consequently, the hydraulic pistons 141 and 142 are acted upon by a shock and the pressure P increases suddenly to present an overshoot, whereafter the pressure P oscillates until it calms down to a complete engagement pressure (steady peak pressure) corresponding to a duty of almost 100%.

When the pressure P presents an overshoot, a peak value (maximum value) Pmax appears which is higher than a steady maximum pressure Pc (which is a known value and 8.8 kgf/cm² or so here) after then by more than a fixed amount.

On the other hand, if the multiple disk clutch 28 is in an engaged condition and consequently presents a drag at the initial pressure P₁, then when the duty is swept, the pressure P first increases substantially linearly and then calms down smoothly to a complete engagement pressure (steady maximum pressure) Pc at a certain point of time.

Due to such characteristic, if a peak value Pmax of the pressure P is stored and a difference α (=Pmax−Pc) between the value Pmax and the steady maximum pressure Pc is greater than a predetermined value α₀, then it can be determined that the multiple disk clutch 28 is in a disengaged condition at the initial pressure P₁.

Thus, such trial as described above is repeated at a suitable interval of time (for example, at an interval of 5 minutes) while suitably increasing or decreasing the starting pressure P from the initial value $P_1$ to detect and set an appropriate initial pressure Pi.

In short, the present pre-pressure learning should preferably be performed many times so far as the requirements given hereinabove are met, and if an initial learned value set at a certain point of time (at a stage of n-th learning) and an initial pressure Pi are represented in a generalized form, then the initial learned value and the initial pressure Pi can be represented as PINTG(n) and PINT(n), respectively. Accordingly, an initial learned value and an initial pressure in preceding learning can be represented as PINTG(n−1) and PINT(n−1), respectively. Thus, at a stage of n-th learning, learning is executed based on the initial pressure PINTG(n−1) in the preceding learning.

Then, a difference $\alpha$ (=Pmax−Pc) obtained by predetermined sweeping of the duty is compared with a threshold value $\alpha_0$, and an initial learned value PINTG(n) and an initial pressure PINT(n) in a present trial are set in the following manner in accordance with a result of such comparison.

① In the case of $\alpha \geq \alpha_0$

PINTG(n)=PINTG(n−1)+$\beta$

PINT(n)=PINTG(n−1)+$\beta$=PINTG(n)

② In the case of $\alpha < \alpha_0$

PINTG(n)=PINTG(n−1)−$\beta$

PINT(n)=PINTG(n−1)

In short, in the case of $\alpha \geq \alpha_0$, an initial learned value PINTG(n) is set to a value obtained by addition of $\beta$ (=pressure corresponding to 1 bit) to the initial learned value PINTG(n−1) in preceding learning, and an initial pressure PINT(n) is set to a value obtained by addition of $\beta$ (=pressure corresponding to 1 bit) to the initial learned value PINTG(n−1) in the preceding learning, in short, the initial learned value PINTG(n) in the present learning.

This is because, in the case of $\alpha \geq \alpha_0$, it can be determined that an overshoot takes place, and consequently, it can be determined that, at the initial pressure PINT(n−1) in the preceding learning, the clutch 28 is not in the proximity of a delicately contacting condition. Accordingly, the initial learned value PINTG(n) in the present learning is set to a value obtained by addition of $\beta$ (=pressure corresponding to 1 bit) to the initial learned value PINTG(n−1) in the preceding learning while the initial pressure PINT(n) in the present learning is set to a value obtained by addition of $\beta$ (=pressure corresponding to 1 bit) to the initial learned value PINTG(n−1) in the preceding learning.

It is to be noted that 1 bit is set to a suitable value such as, for example, 1 bit=0.05 kgf/cm$^2$ or 1 bit=0.1 kgf/cm$^2$ while it is limited by a resolution of a signal of the hydraulic pressure sensor for detecting a hydraulic pressure applied to a piston.

On the other hand, in the case of $\alpha < \alpha_0$, an initial learned value PINTG(n) is set to a value obtained by subtraction of $\beta$ (=pressure corresponding to 1 bit) from the initial learned value PINTG(n−1) in the preceding learning while an initial pressure PINT(n) is set to the initial learned value PINTG(n−1) in the preceding learning.

This is because, in the case of $\alpha < \alpha_0$, an overshoot does not take place, and consequently, it can be determined that, at the initial pressure PINT(n−1) in the preceding learning, the clutch 28 is either in a delicately contacting condition or in an excessively contacting condition. Accordingly, the initial learned value PINTG(n) in the present learning is set to a value obtained by subtraction of $\beta$ (=pressure corresponding to 1 bit) from the initial learned value PINTG(n−1) in the preceding learning while the initial pressure PINT(n) in the present learning is set equal to the initial learned value PINTG(n−1) in the preceding learning. This is because, since it cannot be determined only from the result of $\alpha < \alpha_0$ whether the clutch 28 is in a delicately contacting condition or an excessively contacting condition and consequently chattering may possibly be invited, a result of present learning is not adopted immediately as an initial pressure Pi but the learned value in the preceding learning is adopted in order to prevent such possible chattering.

Thus, if the clutch 28 is in an excessively contacting condition, then it is considered that the condition of $\alpha < \alpha_0$ continues at least for two cycles, and the initial pressure Pi is decreased toward a suitable value with a delay by one cycle.

It is to be noted that, if any of the requirements ①' to ⑤ for pre-pressure learning described above is no longer met during execution of such pre-pressure learning, the pre-pressure learning is stopped and control returns to a normal mode.

On the contrary, such pre-pressure learning as described above is repetitively performed so far as the requirements ①' to ⑤ for pre-pressure learning are met.

Subsequently, a third technique of pre-pressure learning by the pre-pressure setting section 288 will be described.

Also the present pre-pressure learning is set similarly to the second pre-pressure learning described above when the following requirements for pre-pressure learning are met simultaneously. ①' That more than 10 minutes have elapsed after the ignition key was turned on.

② That the shift selector is selectively positioned at one of the "1" (first speed) position, "2" (second speed) position, "D" (driving) position and "N" (neutral) position.

③ That the vehicle body speed Vref is equal to 0 (i.e., Vref=0 km/h).

④ That the clutch torque Tc is equal to or lower than a predetermined low value (1 kgfm) (i.e., Tc$\geq$1 kgfm).

⑤ That a predetermined interval of time (for example, 5 minutes or so or a suitable interval of time shorter than 5 minutes) has elapsed after a preceding trial.

If all of the five requirements given above are met simultaneously, pre-pressure learning is performed in the following manner.

Figure 23A:
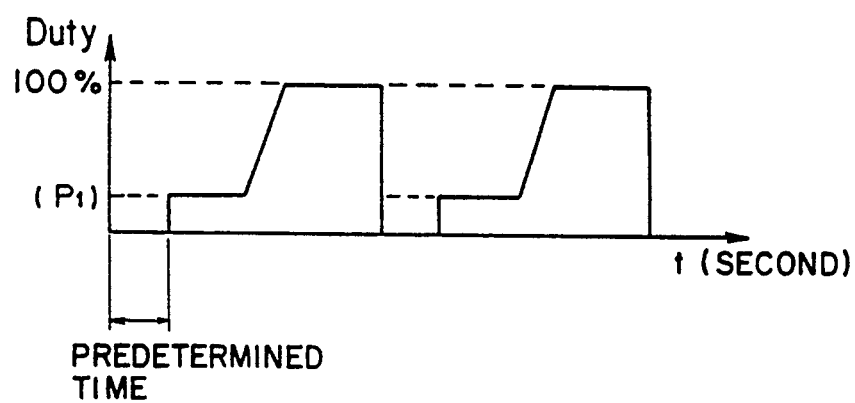
FIG. 23(a) is a diagram showing a duty characteristic in third pre-pressure learning of the front/rear wheel torque distribution controlling system.

First, a duty is adjusted such that it may present such a pressure pattern as shown in FIG. 23(a). In short, the duty is first held at 0% for a predetermined period of time (for example, 1 second), and then the duty is set to a value equivalent to an initial pressure $P_1$ and held at such value for another predetermined period of time (for example, for 2 seconds), whereafter the duty is swept to a value equivalent to P=8.8 kgf/cm$^2$ (a duty almost equal to 100%) for a predetermined period of time (for example, for one second). Then, the duty equivalent to P=8.8 kgf/cm$^2$ is held for a further predetermined period of time (for example, for 2 seconds). Such pattern is repeated successively while changing the initial pressure Pi suitably.

Figure 23B:
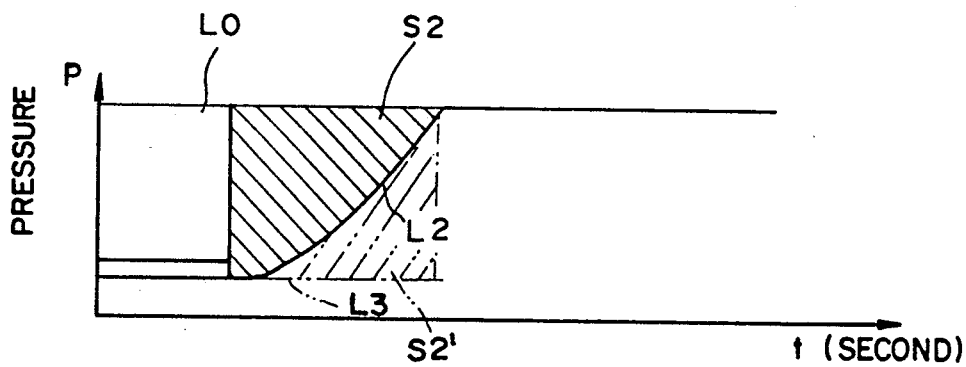
FIGS. 23(b) and 23(c) are diagrams showing pressure characteristics in the third-pressure learning.
Figure 23C:
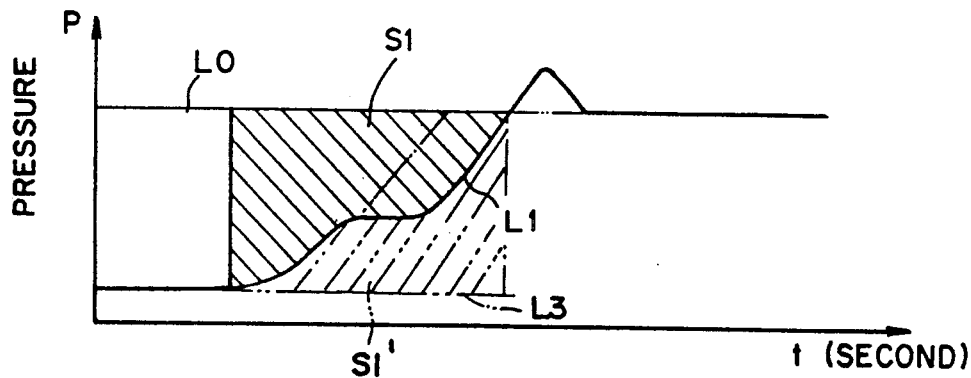

Consequently, the pressure P applied to the hydraulic pistons 141 and 142 presents, similarly to that of the case of the second pre-pressure learning described above, such variations of two patterns as shown by curves L2 and L1 in FIGS. 23(b) and 23(c), respectively.

Then, the areas S1 and S2 of portions (shadowed in FIGS. 23(c) and 23(b)) are compared with each other which are taken from a point of time $t_0$ when sweeping of the duty is started (or another point of time $t_1$ when the pressure P starts to rise) to a point of time when such a steady maximum pressure Pc (or a fixed pressure value near to the steady maximum pressure Pc) as indicated by a straight line L0 in FIG. 23(b) or 23(c) and are defined by such straight line L0 and a curve L1 or L2 which represents a variation of the pressure P. Such comparison reveals that the area S1 defined by the curve L1 which presents an overshoot is apparently greater than the area S2 defined by the curve L2 which does not present an overshoot.

Therefore, also with the present third pre-pressure learning, such trial as described above is repeated at a suitable interval of time (for example, at an interval of 5 minutes) to detect and set an appropriate initial pressure Pi similarly to that of the second pre-pressure learning described above.

In short, the present pre-pressure learning is performed many times so far as the requirements given hereinabove are met, and if an initial learned value set at a certain point of time (at a stage of n-th learning) and an initial pressure Pi are represented in a generalized form, similarly as described hereinabove, as PINTG(n) and PINT(n), respectively.

Accordingly, an initial learned value and an initial pressure in preceding learning are represented as PINTG(n−1) and PINT(n−1), respectively, and at a stage of n-th learning, learning is performed based on the initial pressure PINT(n−1) in the preceding learning.

Then, an area S obtained by predetermined sweeping of the duty is compared with a threshold value $S_0$, and an initial learned value PINTG(n) and an initial pressure PINT(n) in a present trial are set in the following manner in accordance with a result of such comparison.

① In the case of $S \geq S_0$

PINTG(n)=PINTG(n−1)+β

PINT(n)=PINTG(n−1)+β=PINTG(n)

② In the case of $S < S_0$

PINTG(n)=PINTG(n−1)−β

PINT(n)=PINTG(n−1)

In short, the case of $S \geq S_0$ corresponds to the case of $\alpha \geq \alpha_0$ in the second pre-pressure learning while the case of $S < S_0$ corresponds to the case of $\alpha < \alpha_0$ in the second pre-pressure learning.

In particular, in the case of $S \geq S_0$, it can be determined that an overshoot takes place. Consequently, it can be determined that, at an initial pressure PINT(n−1) in preceding learning, the clutch 28 is not in the proximity of a delicately contacting condition. Accordingly, an initial learned value PINTG(n) in present learning is set to a value obtained by an addition of β (=pressure corresponding to 1 bit) to the initial learned value PINTG(n−1) in the preceding learning while an initial pressure PINT(n) in the present learning is set to a value obtained by addition of β (=pressure corresponding to 1 bit) to the initial learned value PINTG(n−1) in the preceding learning.

On the other hand, in the case of $S < S_0$, an overshoot does not take place, and consequently, it can be determined that, at an initial pressure PINT(n−1) in preceding learning, the clutch 28 is either in a delicately contacting condition or in an excessively contacting condition. Accordingly, an initial learned value PINTG(n) in present learning is set to a value obtained by subtraction of β (=pressure corresponding to 1 bit) from the initial learned value PINTG(n−1) in the preceding learning while the initial pressure PINT(n) in the present learning is set equal to the initial learned value PINTG(n−1) in the preceding learning. This is because, similarly to the case of $\alpha < \alpha_0$ described hereinabove, since it cannot be determined only from the result of $S < S_0$ whether the clutch 28 is in a delicately contacting condition or an excessively contacting condition and consequently chattering may possibly be invited, a result of present learning is not adopted immediately as an initial pressure Pi but a learned value in preceding learning is adopted in order to prevent such possible chattering.

Thus, if the clutch 28 is in an excessively contacting condition, then it is considered that the condition of $S < S_0$ continues at least for two cycles, and the initial pressure Pi is decreased toward a suitable value with a delay by one cycle.

It is to be noted that, if any of the requirements ①′ to ⑤ for pre-pressure learning described above is no more met during execution of such pre-pressure learning, the pre-pressure learning is stopped and control returns to a normal mode.

On the contrary, such pre-pressure learning as described above is repetitively performed so far as the requirements ①′ to ⑤ for pre-pressure learning are met.

It is to be noted that, in the present third pre-pressure learning, determination may otherwise be based, in place of the areas S (S1 and S2) of the portions defined by the linear line L0 and the curve L1 or L2, on areas S′ (S1′ and S2′) of portions defined by the curve L1 or L2 and another linear line L3 representing a fixed pressure around an initial pressure.

In such instance, calculation of an area S′ should be started at a point of time $t_0$ at which sweeping of the duty is started (or another point of time $t_1$ at which the pressure P starts to rise) and then ended at a further point of time at which the hydraulic pressure P reaches such a steady maximum pressure Pc (or a fixed pressure value near such steady maximum pressure Pc) as indicated by the linear line L0. Then, where a reference value for judgment is represented by $S_0'$, in the case of $S' \geq S_0'$, it can be determined that there is an overshoot, but in the case of $S' < S_0'$, it can be determined that there is no overshoot.

Thus, a clutch controlling pressure Pc which is an effective hydraulic pressure undergoes centrifugal pressure control by subtracting therefrom a centrifugal correction pressure Pv and then undergoes pre-pressure application correction by adding thereto an initial pressure (pre-pressure) Pi in such a manner as described above to obtain a control pressure Pcd′ (=Pc−Pv+Pi)

at an oil chamber supplying level. Such control pressure Pcd' is fetched into a peak holding filter 290.

Referring back to FIG. 1(c), the peak holding filter 290 acts as a kind of limiter for preventing an excessively sudden variation of the hydraulic pressure so that hunting in control may not be caused by a sudden variation of the hydraulic pressure. The peak holding filter 290 sets, for a rise of a hydraulic pressure, a rather high limit rate (for example, 31.4 kg/cm$^2$/s, but sets, for a fall of a hydraulic pressure, a rather low limit rate (for example, 15.7 kg/cm$^2$/s). Then, when a controlling pressure Pcd' is received with which a rate of variation of a hydraulic pressure exceeds such limit, the peak holding filter 290 restricts its controlling pressure to a value corresponding to such limit.

The controlling pressure Pcd having passed the filter 290 is then transmitted to a duty setting section 295 by way of switches 292a and 294a.

It is to be noted that the switch 292a presents an off-state in response to a signal from judging means 292 when ABS control (antilocking braking control) proceeding, but presents an on-state when ABS control is not proceeding. In short, a signal of a controlling pressure Pcd is transmitted on condition that ABS control is being performed. This is because the antilocking brake system must operate with certainty upon ABS control, and it is not preferable to control a torque distributing condition between the front and rear wheels upon such ABS control because such control may interfere with the ABS control.

Meanwhile, the switch 294a is a controlling switch for protecting the duty solenoid valve in response to a signal from another judging means 294 and is provided to reduce the duty to zero when the vehicle is running at a low speed and a set clutch torque Tc is low. The low speed requirement may be defined such that the vehicle speed Vref is, for example, Vref≦5 km/h while the requirement for a clutch torque Tc may be defined such that, for example, Tc≦1 kgfm. Then, if the two requirements are met, then the switch 294a is switched off and consequently does not transmit a signal of a controlling pressure Pcd.

The duty setting section 295 includes a pressure feedback correcting section 296 and a pressure to duty converting section 298.

The pressure feedback correcting section 296 receives detection information from a pressure sensor 304 for detecting an actual pressure acting upon the pistons and corrects a signal of a controlling pressure Pcd in accordance with such information. It is to be noted that a signal to be transmitted from the pressure sensor 304 to the pressure feedback correcting section 296 is once introduced into a filter 306, at which noise components produced by a disturbance or the like are removed therefrom.

The pressure to duty converting section 298 sets a duty corresponding to a controlling pressure P feedback corrected by the pressure feedback correcting section 296. Such duty increases linearly with respect to the pressure from a pre-pressure condition to a maximum pressure condition as seen from a map shown in the block of the clutch pressure-duty converting section 298 of FIG. 1(c). A duty corresponding to a controlling pressure P is thus set from such relationship.

At a hydraulic circuit 300 which functions as a control executing section, a duty solenoid 302 operates in response to a duty set in this manner by the duty setting section 295 to control the differential operation limiting clutch 28 of the center differential gear.

Meanwhile, in parallel to such control of the center differential gear, a torque distributing condition between the front and rear wheels is indicated in a meter cluster of an instrument panel of a driver's seat.

Figure 24:
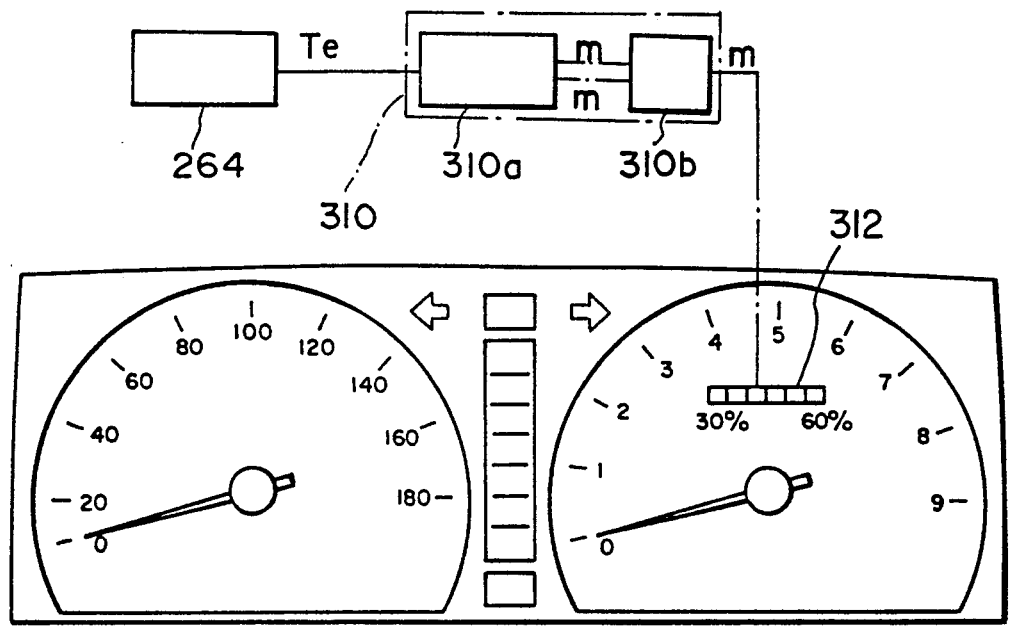
FIG. 24 is a diagrammatic representation showing torque distribution indicating means of the front/rear wheel torque distribution controlling system.

In short, referring to FIGS. 1(b) and 24, a torque distribution indicating section 312 for indicating a torque distribution condition to the front wheels (or rear wheels) in a graphic indication (or in a meter indication) is provided in the meter cluster. Thus, a torque distribution condition is indicated on the torque indicating section 312 in accordance with a magnitude of a distributed torque estimated by torque estimating means 310.

The reason why a torque distributing condition is estimated in this manner by the torque estimating means 310 is that it is difficult to actually measure a torque distribution condition.

The torque estimating means 310 includes calculating means 310a for calculating a front wheel output torque (or rear wheel output torque) when a difference in speed between the front and rear wheels takes place at the multiple disk clutch 28 and a front wheel output torque (or rear wheel output torque) when no difference in speed between the front and rear wheels takes place, and selecting means 310b for selecting a lower one of such front wheel output torques (or rear wheel output torques) in each of such two cases. The two means 310a and 310b execute estimation of a torque distribution condition in the following manner.

In short, when a torque distribution is to be estimated, the following two different cases are available. In one of the two cases, it is assumed that the tires and the road are contacted with each other without having a slip therebetween in such an engaging condition as in the case of gear wheels and consequently a slip takes place at the center differential clutch without fail. In the other case, the center differential clutch may not involve a slip because actually a slip exists between the tires and the road without fail.

Thus, a torque distribution in each of such cases will be examined together with when a torque distribution condition is changed over.

First, it is assumed as a premise that, when differential operation limiting is not performed as in the case of the present four wheel driving system, the torque distribution is set to a rear wheel stressed distribution in which the torque ratio between the front and rear wheels is set, for example, to 32:68, and further, the differential operation limiting clutch 28 transmits torque always from the rear wheel side to the front wheel side. Thus, for the object of simplification, the following setting is assumed.

$$\rho f / rf < \rho r \cdot pt < rr \quad (5.1)$$

where $\rho f$ is a front differential gear ratio, $\rho r$ is a rear differential gear ratio, $pt$ is a transfer ratio, $rf$ is a radius of the front wheel tires, and $rr$ is a radius of the rear wheel tires.

Thus, when the differential operation limiting clutch 28 does not slip, a distribution in directly coupled four wheel driving is established, and consequently, a front wheel torque Tf and a rear wheel torque Tr are given by the following expressions:

$$Tf = Wf/Wa \cdot \{Tm + kWr \cdot rf/p \cdot (rf \cdot \rho r \cdot pt / rr \cdot pt - 1)\} \quad (5.2)$$

$$Tr = Wr/Wa \cdot \{Tm - kWf \cdot rr/\rho \cdot (rf \cdot pr \cdot pt/rr \cdot pt - 1)\} \quad (5.3)$$

where Wf is a front wheel assigned load, Wr is a rear wheel assigned load, Wa is a car weight ($=Wf+Wr$), Tm is a transmission output torque ($=$center differential gear input torque), k is a slip rate coefficient, and $\rho$ is a final reduction ratio ($=(\rho f + \rho r \cdot \rho t)/2$).

On the other hand, when the differential operation limiting clutch 28 slips, a front wheel torque Tf' and a rear wheel torque Tr' are given by the following expressions:

$$Tf' = (Tm - Tc) \cdot a/(a+b) + Tc \quad (5.4)$$

$$Tr' = (Tm - Tc) \cdot b/(a+b) \quad (5.5)$$

where Tc is a clutch transmission torque capacity, a is a number of teeth of the sun gear, and b is a number of teeth of the ring gear.

When the differential operation limiting clutch 28 slips as described above, it means that the clutch 28 permits a torque difference between the front and rear wheels which is caused by a load distribution, a difference between differential gear ratios and so forth. Since the case wherein the clutch transmits torque from the rear wheel side to the front wheel side is considered here, a lower one of the front wheel torques Tf and Tf' can be considered to be a front wheel torque value.

In particular, if Tf<Tf', then the clutch is in a locked condition, and consequently, the front wheel torque distribution ratio m is given by $$m = Tf/(Tf + Tr) \quad (5.6)$$

But, if Tf>Tf', then the clutch is in a slipping condition, and the front wheel torque distribution ratio m can be estimated as $$m = Tf'/(Tf' + Tr') \quad (5.7)$$

Figure 25:
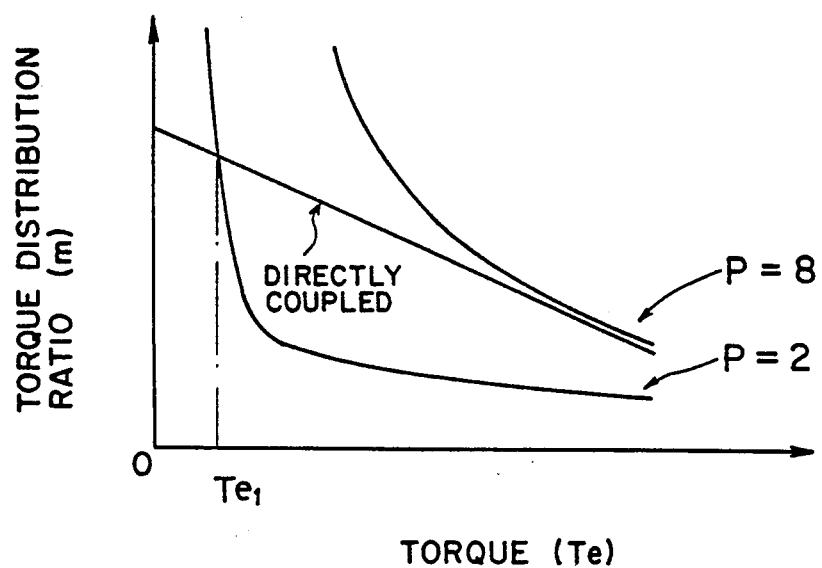
FIG. 25 is a diagram showing a torque distribution characteristic by torque distribution estimating means of the front/rear wheel torque distribution controlling system.

FIG. 25 shows a front wheel torque distribution ratio m with respect to a center differential gear input torque Tm. As seen from FIG. 25, the characteristic of the input torque responding front wheel torque distribution ratio presents, when the clutch is in a locked condition, such a linear line condition as denoted by "directly coupled", but when the clutch is in a free condition, the characteristic presents a form of a curve which varies in accordance with a magnitude of a controlling pressure P. It is to be noted that curves of such characteristic when the pressure P is 2 kgf/cm² (P=2) and 8 kgf/cm² (P=8) are shown in FIG. 25.

Thus, the one, among the linear line denoted by "directly coupled" and the curves of the different controlling pressures P of the graph of FIG. 25, in which the value of m presents a smallest value is adopted.

For example, when the controlling pressure P is 2 kgf/cm², since the linear line denoted by "directly coupled" is below the curve of P=2 in a region wherein the torque Te is lower than Te$_1$, a front wheel torque distribution ratio m which varies in accordance with the linear line is employed. On the other hand, in another region wherein the torque Te is higher than Te$_1$, the curve of P=2 is lower than the linear line denoted by "directly coupled", and consequently, a front wheel torque distribution m which varies in accordance with the curve of P=2 is employed.

In the meantime, in case the controlling pressure P is 8 kgf/cm², the linear line denoted by "directly coupled" is always below the curve of P=8, and consequently, a front wheel torque distribution ratio m which varies in accordance with the linear line is employed.

Referring back to FIGS. 1(c) and 24, after a front wheel torque distribution ratio m is set in this manner, a signal corresponding to such set value is transmitted to the torque distribution indicating section 312, at which a torque distribution condition to the front wheels is indicated in accordance with such signal. Since the torque distribution to the front wheels varies from 32% to 60% or so in the present example, corresponding graduations may be applied to the torque distribution indicating section 312 so that a lamp or lamps may be lit or a pointer may be moved to a position of a graduation corresponding to the signal in order to provide an indication easy to watch.

It is to be noted that such indication of a torque distribution condition may otherwise be an indication of a torque distribution condition to the rear wheels or else a torque distribution condition between the front and rear wheels may be indicated in an analog form by way of a graph or the like.

Since the four wheel driving vehicle is constructed in such a manner as described above, differential operation adjustment proceeds in the following manner.

Figure 26:
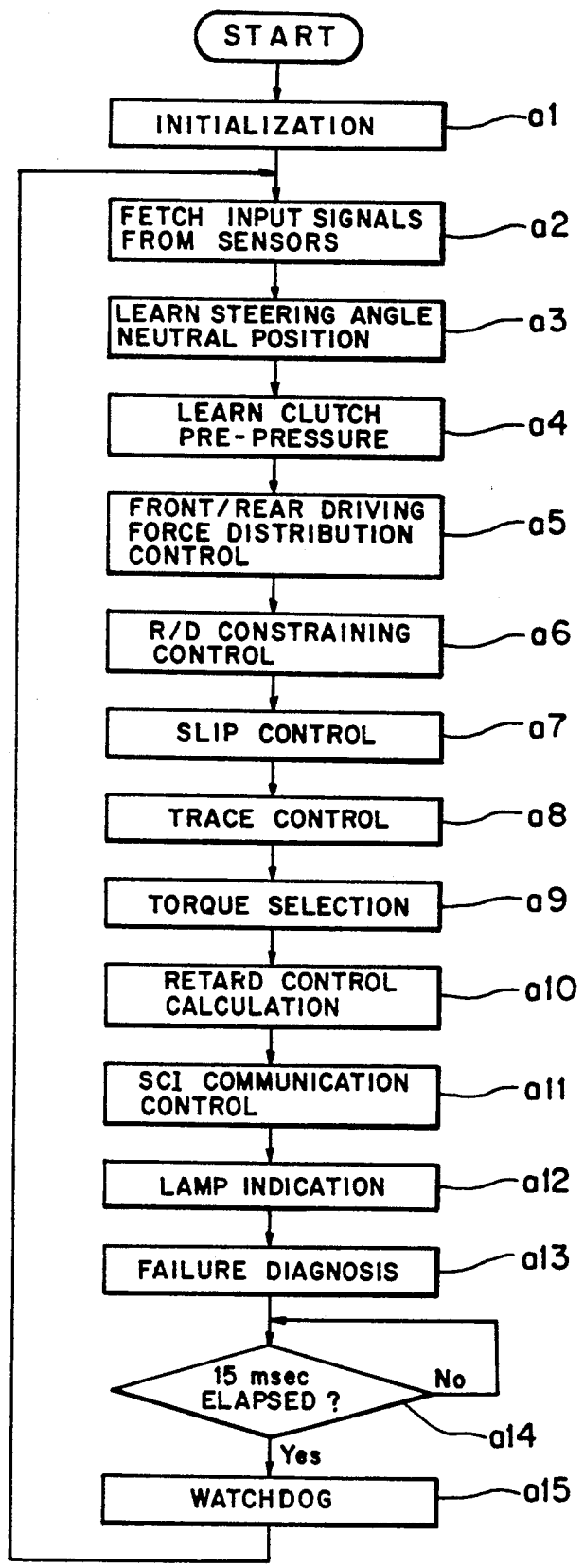
FIG. 26 is a flow chart showing a flow of a control of the entire automobile by the front/rear wheel torque distribution controlling system of FIG. 1.

Referring first to FIG. 26, there is shown a flow of general operation of the four wheel driving torque transmitting system of the four wheel driving vehicle. First, various control elements are initialized at step a1, and then information is fetched from the various sensors at step a2. Then, learning of a steering angle neutral position is executed at step a3, and pre-pressure learning of the clutch is executed at step a4, whereafter a front-/rear wheel driving force distributing control is executed at step a5 while controlling the clutch 28 in response to a set duty. Subsequently, a control of the rear differential gear is executed at step a6.

Then, at steps a7 to a11, engine output controls (traction control) including a slip control, a trace control, torque selection, a retard controlling calculation and an SCI (series communication interface) communication control are executed successively. Subsequently the torque distribution indicating lamps are lit at step a12, and failure diagnosis is executed at step a13. At step a14, it is judged whether or not a predetermined interval of time (15 msec) has elapsed, and if the predetermined interval of time has elapsed, then a check of runaway by a watchdog is performed at step a15, whereafter the control sequence returns to step a2 to repeat the series of controls at steps a2 to a13.

In short, the front/rear wheel driving force distributing control, rear differential gear control and engine output control are executed at a predetermined period (15 msec).

Figure 27:
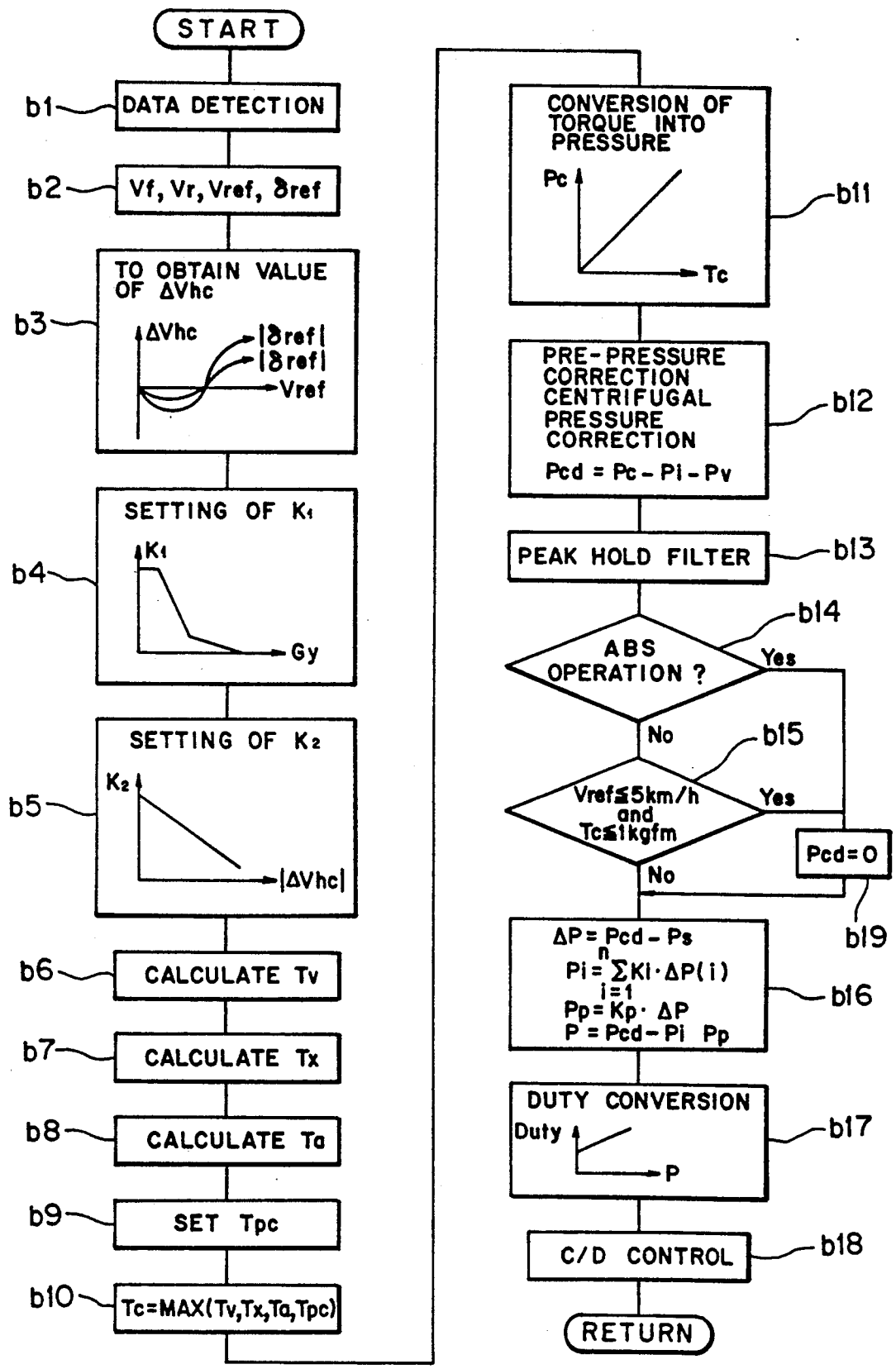
FIG. 27 is a flow chart showing a flow of a front/rear wheel torque distribution control in the control flow of FIG. 26.

Of those controls, the front/rear wheel driving force distributing control will first be described with reference to the flow chart of FIG. 27.

First at step b1, various data including wheel speeds FR, FL, RR and RL, steering angles $\theta_1$, $\theta_2$ and $\theta_n$, a lateral acceleration Gy, an advancing direction acceleration Gx, a throttle opening $\theta$th, an engine speed Ne, a transmission speed Nt and a selected gear position are detected and fetched. Then, a front wheel speed Vf, a rear wheel speed Vr, an estimated vehicle speed Vref, a driver requested steering angle $\delta$ref and so forth are calculated from the thus fetched data at step b2.

Then at step b3, an ideal speed difference $\Delta$Vhc between the front and rear wheels is determined from the estimated vehicle speed Vref and driver requested steering angle $\delta$ref in accordance with the map therefor, and then, a lateral G gain k$_1$ is set from the lateral acceleration Gy in accordance with the map therefor at step b4, whereafter a speed difference gain $k_2$ is set from the ideal speed difference $\Delta Vhc$ in accordance with the map therefor at step b5.

Further at steps b6 to b9, a differential operation responding clutch torque Tv is calculated from the actual speed difference $\Delta Vc$, ideal speed difference $\Delta Vhc$ and lateral G gain $k_1$ (determined by conversion using the corresponding map in the present example); an advancing direction acceleration responding clutch torque Tx is calculated (converted from the map therefor) from the advancing direction acceleration Gx and lateral G gain $k_1$; an engine torque proportional clutch torque Ta is calculated (converted from the map therefor) from the throttle opening $\theta$th, engine speed Ne, transmission speed Nt, selected gear position and speed difference gain $k_2$; and a protection controlling clutch torque Tpc is set in response to a signal of the actual speed difference $\Delta Vcd$.

Then at step b10, a highest one of the clutch torques Tv, Tx, Ta and Tpc is determined as a set clutch torque Tc.

Further at step b11, the clutch torque Tc determined in this manner is converted into a clutch engaging pressure Pc using the map therefor.

Subsequently at step b12, pre-pressure correction (to add a pre-pressure Pi) and centrifugal pressure correction (to subtract a centrifugal pressure Pv) are executed for the clutch engaging pressure Pc to obtain a center differential gear controlling pressure Pcd.

Subsequently, the center differential gear controlling pressure Pcd is passed through the peak holding filter so as to restrict an excessive variation of the pressure P at step b13.

Then, it is judged at step b14 whether or not the antilocking braking system is operating, and then judged at step b15 whether or not the protection requirements ($Vref \leq 5$ km/h and $Tc \leq 1$ kgfm) for the solenoid valve are met. If one of the judgments at steps b14 and b15 is in the affirmative ("Yes"), then the center differential gear controlling pressure Pcd is reset to "0" at step b19.

The center differential gear controlling pressure Pcd set in such a manner as described above then undergoes pressure feedback correction at step b16. In short, a difference $\Delta P$ between a value of the center differential gear controlling pressure Pcd and an actually measured value by the pressure sensor is calculated, and the center differential gear controlling pressure Pcd is corrected with an integral correction pressure Pi determined from an integral correction gain ki and a difference $\Delta P(i)$ and a proportional correction pressure Pp determined from a proportional correction gain kp and the difference $\Delta P$ to obtain a pressure P.

Subsequently, the pressure P is converted into a corresponding duty at step b17, whereafter a center differential gear control, in short, a control of the differential operation limiting clutch, is executed at step b18.

Figure 28:
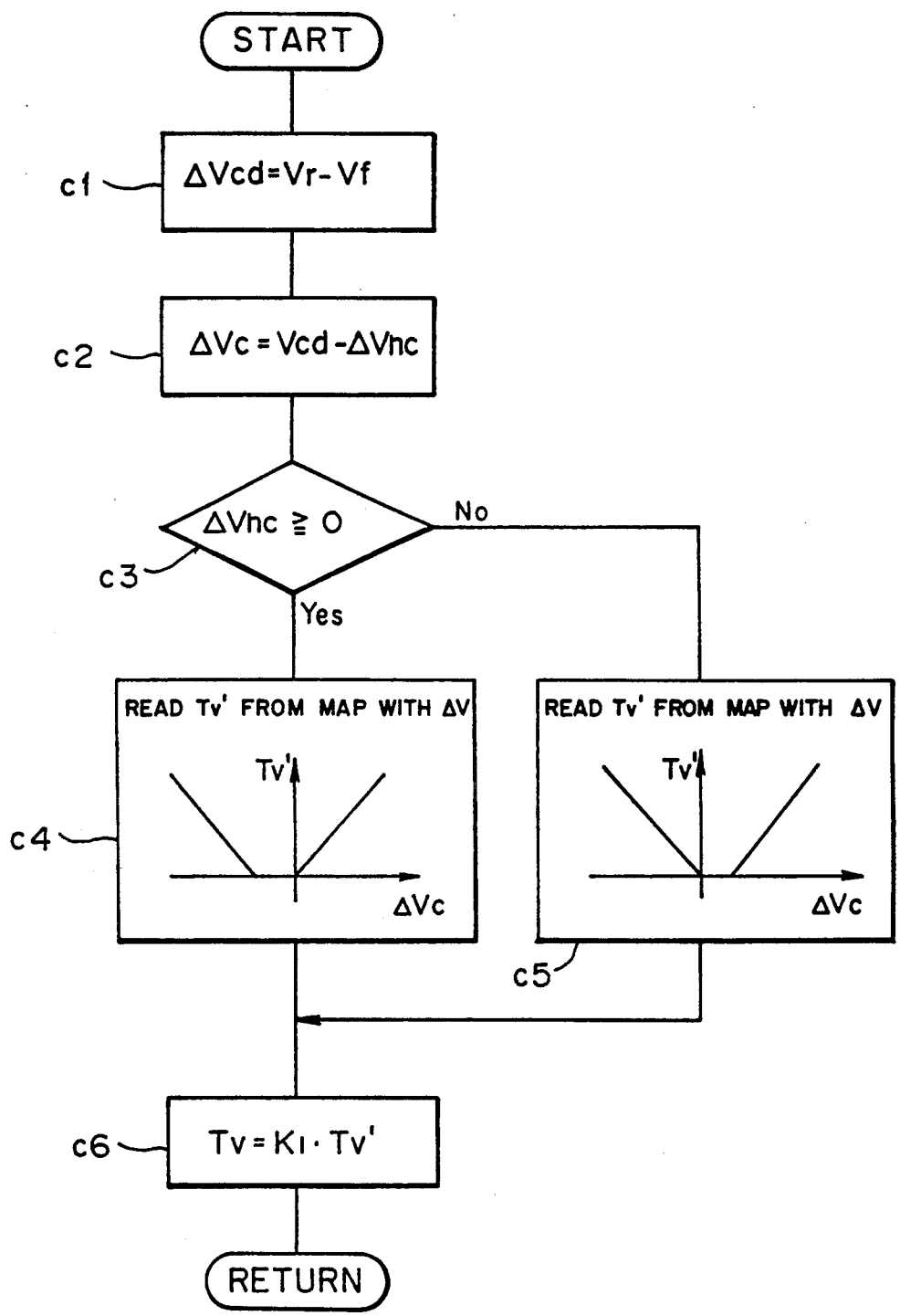
FIG. 28 is a flow chart showing a flow of setting of a differential operation responding clutch torque in the control flow of FIG. 26.

Meanwhile, calculation of a differential operation responding clutch torque Tv described above proceeds in such a manner as illustrated in FIG. 28.

Referring to FIG. 28, first at step c1, the front wheel speed Vf is subtracted from the rear wheel speed Vr to calculate a difference $\Delta Vcd$ ($=Vr-Vf$) between them, and then at step c2, the front/rear wheel ideal speed difference $\Delta Vhc$ calculated at step b3 in such a manner as described hereinabove is subtracted from the thus calculated difference (front/rear wheel actual speed difference) $\Delta Vcd$ to obtain a difference $\Delta Vc$ ($=\Delta Vcd-\Delta Vhc$) between them.

Then at step c3, it is judged whether or not the front/rear wheel ideal speed difference $\Delta Vhc$ is equal to or higher than 0, and if the difference $\Delta Vhc$ is equal to or higher than 0, then the control sequence advances to step c4. However, to the contrary, if $\Delta Vhc$ is lower than 0, then the control sequence advances to step c5.

At step c4, a clutch torque Tv' is set from the difference $\Delta Vc$ using such map as shown in FIG. 13(a).

More particularly, ① if $\Delta Vcd \geq \Delta Vhc$, then the clutch torque Tv' is set to $$Tv' = a \cdot (\Delta Vcd - \Delta Vhc) = a \cdot \Delta Vc$$

where a is a proportional constant, so that it may increase in proportion to the magnitude of the difference $\Delta Vc$ ($\Delta Vcd - \Delta Vhc$) between them.

On the other hand, ② if $\Delta Vhc > \Delta Vcd > 0$, then the clutch torque Tv' is set to 0 thereby to set a so-called dead zone.

Further, ③ if $0 \geq \Delta Vcd$, then the clutch torque Tv' is set to $$Tv' = -a \cdot \Delta Vcd = -a \cdot (\Delta Vc + \Delta Vhc)$$

where a is a proportional constant, so that it may increase in proportion to the magnitude of the front/rear wheel actual speed difference $\Delta Vcd$.

It is to be noted that, when $\Delta Vhc = 0$, the dead zone of $\Delta Vhc < \Delta Vcd < 0$ disappears.

On the other hand, at step c5, a clutch torque Tv' is set from the difference $\Delta Vc$ using the map shown in FIG. 13(b).

More particularly, ① if $\Delta Vcd \geq 0$, then the clutch torque Tv' is set to $$Tv' = a \cdot \Delta Vcd = a \cdot (\Delta Vc + \Delta Vhc)$$

where a is a proportional constant, so that it may increase in proportion to the magnitude of the front/rear wheel actual speed difference $\Delta Vcd$.

On the other hand, ② if $0 < \Delta Vcd < \Delta Vhc$, then the clutch torque Tv' is set to 0 thereby to set a dead zone.

Further, ③ if $\Delta Vhc \geq \Delta Vcd$, then the clutch torque Tv' is set to $$Tv' = -a \cdot (\Delta Vhc - \Delta Vhc) = -a \cdot \Delta Vc$$

where a is a proportional constant, so that it may increase in proportion to the magnitude of the difference $\Delta Vc$ ($\Delta Vcd - \Delta Vhc$).

The differential operation responding clutch torque Tv' calculated at step c4 or c5 in this manner is then multiplied by the lateral G gain $k_1$ by the correcting section 246 to effect lateral acceleration responding correction thereof thereby to obtain a differential operation responding clutch torque Tv at step c6.

By such setting of a differential operation responding clutch torque Tv, a magnitude of the clutch torque Tv is set suitably without waste, which makes it possible for posture control of the vehicle body to be adjusted appropriately while setting the driving system suitably so that the rear wheels are used as a driving base and a slip may take place beginning with the rear wheels. Consequently, the vehicle can be operated upon turning thereof so that it may follow a will of the driver.

In short, in case the direction SIG(δh) of the sensor responding steering angle δh and the direction SIG(Gy) of the lateral acceleration data Gy are not equal to each other, the driver requested steering angle is set to 0. Accordingly, for example, when the driver tries to perform a steering wheel operation such as a counter steering operation, even if the steered position of the steering wheel and the actual steering angle (turning condition) of the vehicle become different from each other, inappropriate data are not adopted. This contributes to improvement in performance of a control of the vehicle.

Further, since wheel speed data of a second lowest magnitude among the wheel speed data signals FL, FR, RL and RR are adopted as an estimated vehicle speed Vref, the reliability of data is assured.

Further, an ideal speed difference ΔVhc is set such that, when the speed of the vehicle is low, an influence of a difference in radius between loci of the front and rear wheels upon turning is high and the speed Vr of rotation of the rear wheels is lower than the speed Vf of rotation of the front wheels. However, as the vehicle speed rises, the speed Vr of rotation of the rear wheels increases at a higher rate than the speed Vf of rotation of the front wheels. Consequently, when the vehicle is running at a high speed, the rear wheels are liable to slip, and the responsibility in posture of the vehicle body which is required more as the speed of the vehicle increases is assured. Further, as for a steering angle, as it increases, the required difference in rotational speed between the front and rear wheels increases, which is permitted appropriately. Consequently, a tight corner braking phenomenon can be prevented advantageously.

Figure 29:
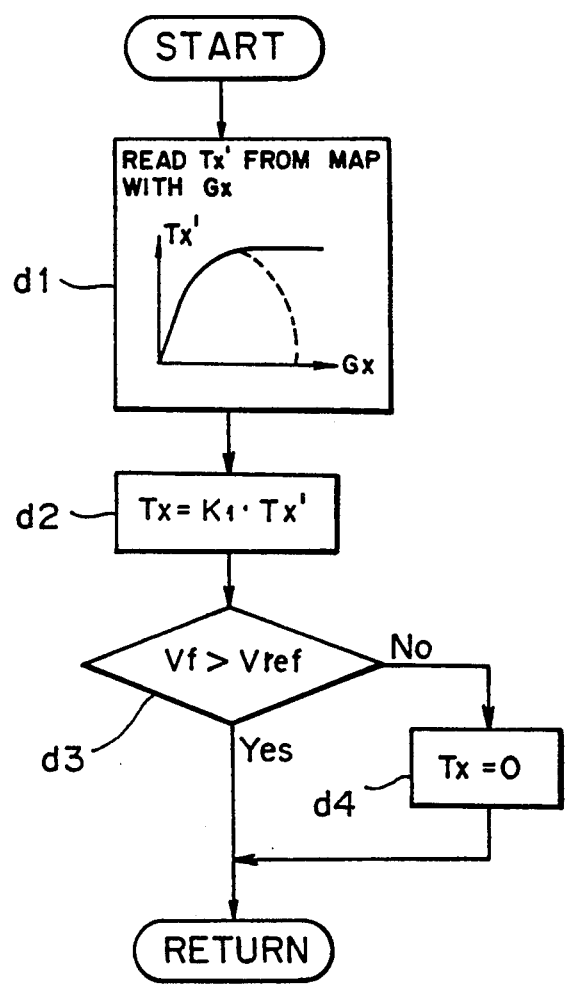
FIG. 29 is a flow chart showing a flow of setting of an advancing direction acceleration corresponding clutch torque in the control flow of FIG. 26.

Calculation of an advancing direction responding clutch torque Tx described above proceeds in such a manner as illustrated in FIG. 29.

Referring to FIG. 29, an advancing direction acceleration responding clutch torque Tx' is read out, first at step d1, from the map shown in FIG. 15 in accordance with detection data from the advancing direction acceleration sensor 36.

Then at step d2, the advancing direction acceleration responding clutch torque Tx' is multiplied by the lateral G gain $k_1$ to effect lateral acceleration correction to obtain an advancing direction acceleration responding clutch torque Tx.

Subsequently at step d3, it is judged whether or not the front wheel speed Vf is higher than the vehicle speed Vref, and in case it is judged by way of the switch 258a that the front wheel speed Vf is higher than the vehicle speed Vref, in short, the front wheels are slipping (upon front wheel slipping), the advancing direction acceleration responding clutch torque Tx is adopted as control data as it is. But on the contrary when the front wheel speed Vf is not higher than the vehicle speed Vref, that is, when the front wheels are not slipping, the advancing direction acceleration responding clutch torque Tx is set to 0 at step d4.

As a result, upon acceleration of the vehicle such as upon front wheel slipping, while a torque distribution equivalent to that in a directly coupled four wheel driving condition is established, a torque higher than that is distributed in accordance with a base distribution ratio (to the rear wheel side). Consequently, a high under steering condition is prevented and smooth turning can be assured.

Figure 30:
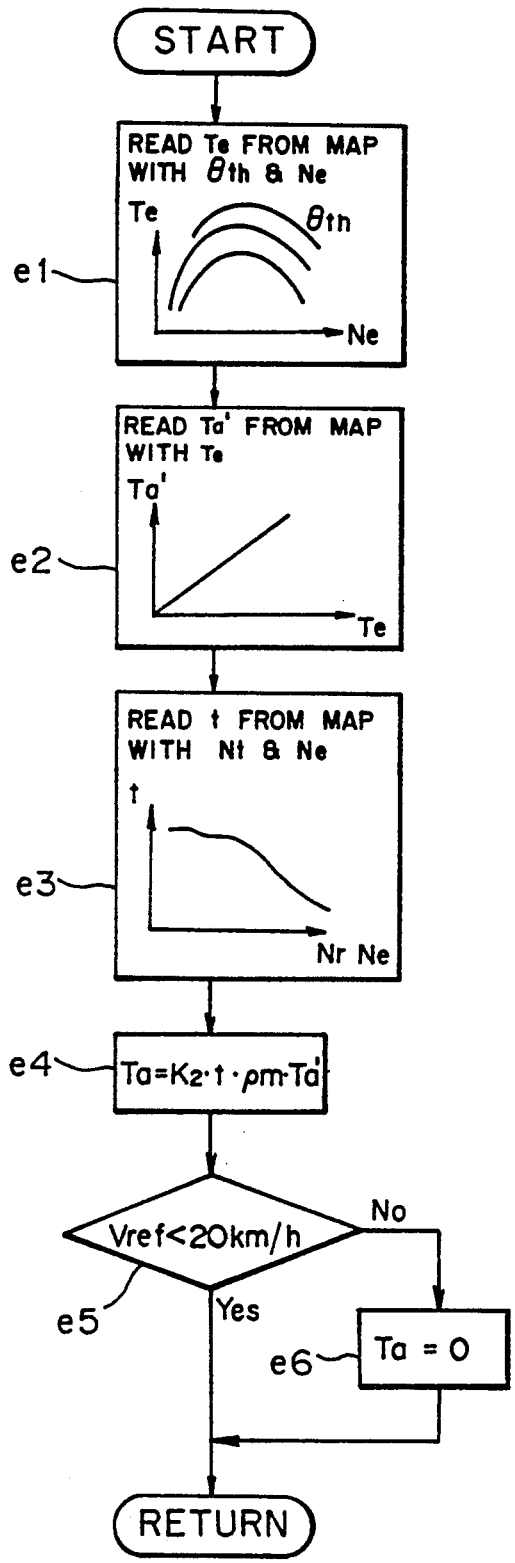
FIG. 30 is a flow chart showing a flow of setting of an engine torque proportional clutch torque in the control flow of FIG. 26.

Meanwhile, calculation of an engine torque proportional clutch torque Ta proceeds in such a manner as illustrated in FIG. 30.

Referring to FIG. 30, a current engine torque Ta is read first at step e1 from such engine torque map as shown in FIG. 12 in accordance with the throttle opening data θth and engine speed data Ne by the engine torque detecting section 264.

Then at step e2, an engine torque proportional torque Ta' is read from the map therefor in accordance with the engine torque Te by the engine torque proportional torque setting section 268.

Subsequently at step e3, a current transmission torque ratio t is read from such transmission torque ratio map as shown in FIG. 13 in accordance with the engine speed data Ne and transmission speed data t by the torque converter torque ratio detecting section 266.

Then at step e4, an engine torque proportional clutch torque Ta ($= t \cdot \rho m \cdot \rho 1 \cdot Te$) is calculated by the engine torque proportional clutch torque calculating section 270 from the thus obtained engine torque proportional torque Ta', torque converter torque ratio t, reduction ratio $\rho m$ and final speed ratio $\rho_1$ obtained at the transmission reduction ratio detecting section 276 and speed difference gain $k_2$ obtained at the speed difference gain setting section 275.

Subsequently at step e5, it is judged whether or not the vehicle is running at a low speed (in the present example, Vref<20 km/h), and if the vehicle is running at a low speed, then the engine torque proportional clutch torque Ta calculated at step e4 is outputted as data as it is. On the contrary, if the vehicle is running but not at a low speed (i.e., if Vref≧20 km/h), then the engine torque proportional clutch torque Ta is set to 0 and outputted as control data at step e6.

Due to the engine torque proportional clutch torque Ta determined in such a manner as described above, when the vehicle is to be started or accelerated suddenly from a low speed running condition, a directly coupled four wheel driving condition is established suitably so that a high torque can be transmitted to the road. Consequently, a possible slip of the tires upon starting or upon sudden acceleration of the vehicle is prevented, which improves the driving performance of the vehicle and also contributes to improvement in durability of the driving system.

Figure 31:
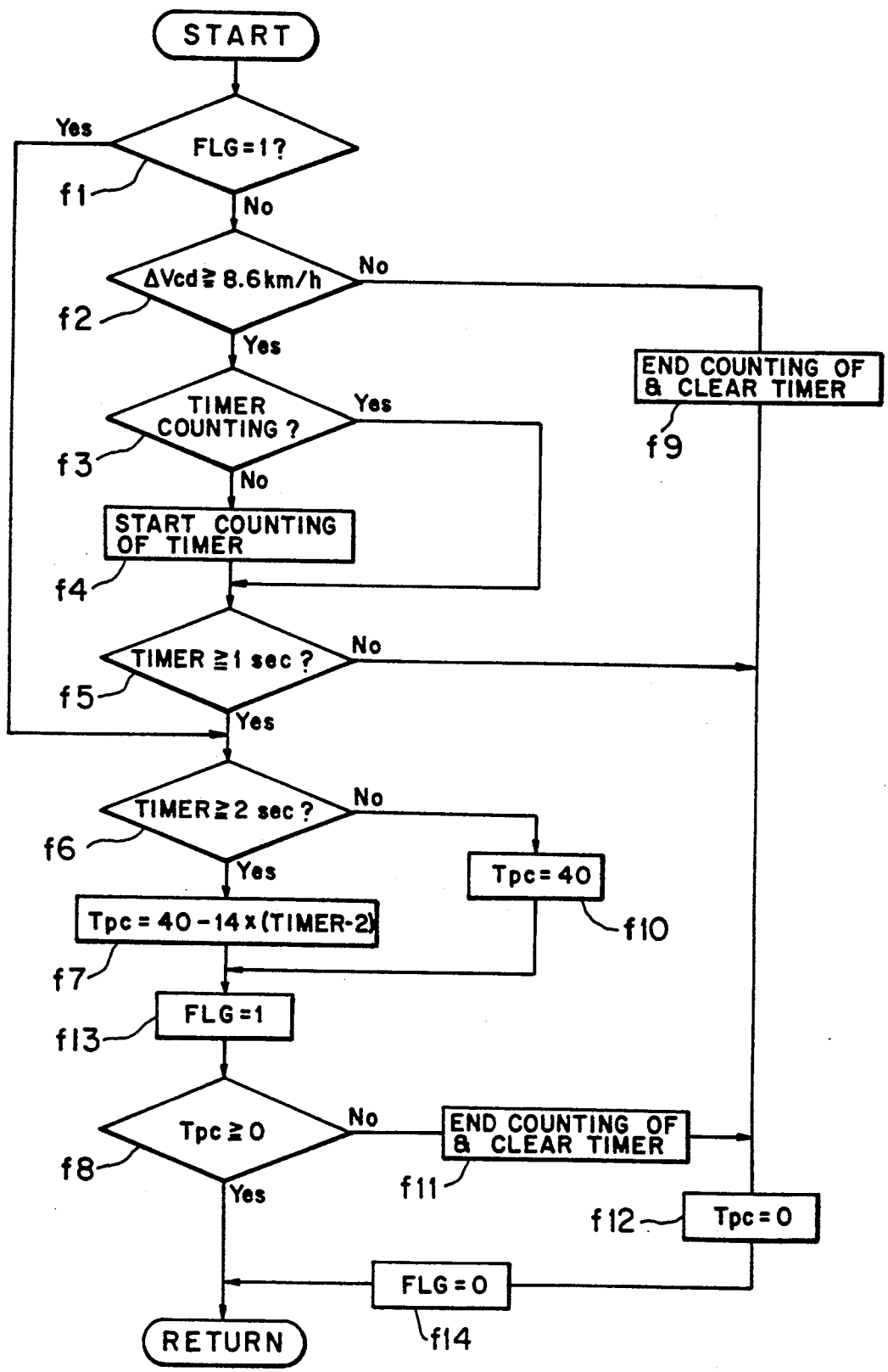
FIG. 31 is a flow chart showing a flow of setting of a protection controlling clutch torque in the control flow of FIG. 26.

Further, calculation of a protection controlling clutch torque Tpc described hereinabove proceeds in such a manner as illustrated in FIG. 31.

Referring to FIG. 31, it is judged first at step f1 whether or not a control flag FLG is equal to 1. The flag FLG is set to 1 when a protection control should be executed, but is set to 0 when a control of the entire driving system should be started.

Accordingly, immediately after the control has been started, the control sequence advances to step f2, at which it is judged whether or not the front/rear wheel actual speed difference ΔVcd is equal to or higher than a reference value (8.6 km/h in the present example).

If the front/rear wheel actual speed difference ΔVcd is not equal to nor higher than the reference value (8.6 km/h), the control sequence advances to step f9, at which, if counting of a timer is proceeding, such counting is stopped and the timer is cleared. Then at step f12, the protection controlling clutch torque Tpc is set to 0, and then at step f14, the flag FLG is reset to 0.

On the other hand, if it is judged at step f2 that the front/rear wheel actual speed difference ΔVcd is equal to or higher than the reference value (8.6 km/h), the control sequence advances to step f3, at which it is judged whether or not a counting operation of the timer is proceeding. Then, if a counting operation of the timer is not proceeding, then the control sequence advances to step f4, at which counting of the timer is started.

After starting of counting of the timer, it is judged at step f5 whether or not the count value of the timer is equal to or higher than a reference time (1 second), and if the timer count value does not reach the reference time, the control sequence advances to step f12, at which the protection controlling clutch torque Tpc is set to 0, whereafter the flag FLG is reset to 0 at step f14.

If the front/rear wheel actual speed difference $\Delta Vcd$ remains equal to or higher than the reference value (8.6 km/h) continuously for several control cycles, also counting of the timer proceeds continuously. As a result, it will be judged finally at step f5 that the count value of the timer is equal to or higher than the reference time, and in this instance, the control sequence advances to step f6.

At step f6, it is judged whether or not the count value of the timer is equal to or higher than another reference time (2 seconds), and if the timer count value does not reach such reference time, then the control sequence advances to step f10, at which the protection controlling clutch torque Tpc is set to 40.

Then at step f13, the flag FLG is set to 1, whereafter the control sequence advances to step f8, at which it is judged whether or not the protection controlling clutch torque Tpc is equal to or higher than 0. In case the control sequence advances from step f10 to step f8, naturally the protection controlling clutch torque Tpc is higher than 0, and consequently, counting of the timer is continued.

Then, if the condition of Tpc=40 continues until the count value of the timer finally becomes equal to or higher than the reference time, that is, 2 seconds, then the control sequence now advances from step f6 to step f7. At step f7, the protection controlling clutch torque Tpc is gradually decreased in accordance with the following expression:

$$Tpc = 40 - 14 \cdot (\text{timer count value} - 2)$$

Then, if the protection controlling clutch torque Tpc is finally reduced to a value lower than 0 after several control cycles, then the control sequence now advances from step f8 to step f1. At step f11, counting of the timer is ended and the timer is cleared, and then at step f12, the protection controlling clutch torque Tpc is set to 0, whereafter the flag FLG is reset to 0 at step f14.

Thus, if the requirement necessary for protection of the clutch that the condition wherein the front/rear wheel actual speed difference $\Delta Vcd$ is equal to or higher than the reference value (8.6 km/h) continues for a period of time longer than the reference time (1 second) is met, the protection controlling clutch torque Tpc is set to such a characteristic as shown in FIG. 20, in which it is first set to an upper limit value for a short period of time (1 second in the present example) and then decreased gradually to zero (natural cancellation).

Due to such protection controlling clutch torque Tpc, the clutch disks are protected, which contributes to improvement in durability of the apparatus and is effective to prevent possible spinning of the vehicle.

Here, pre-pressure correction mentioned hereinabove will be described with reference to FIGS. 32 to 34.

Figure 32:
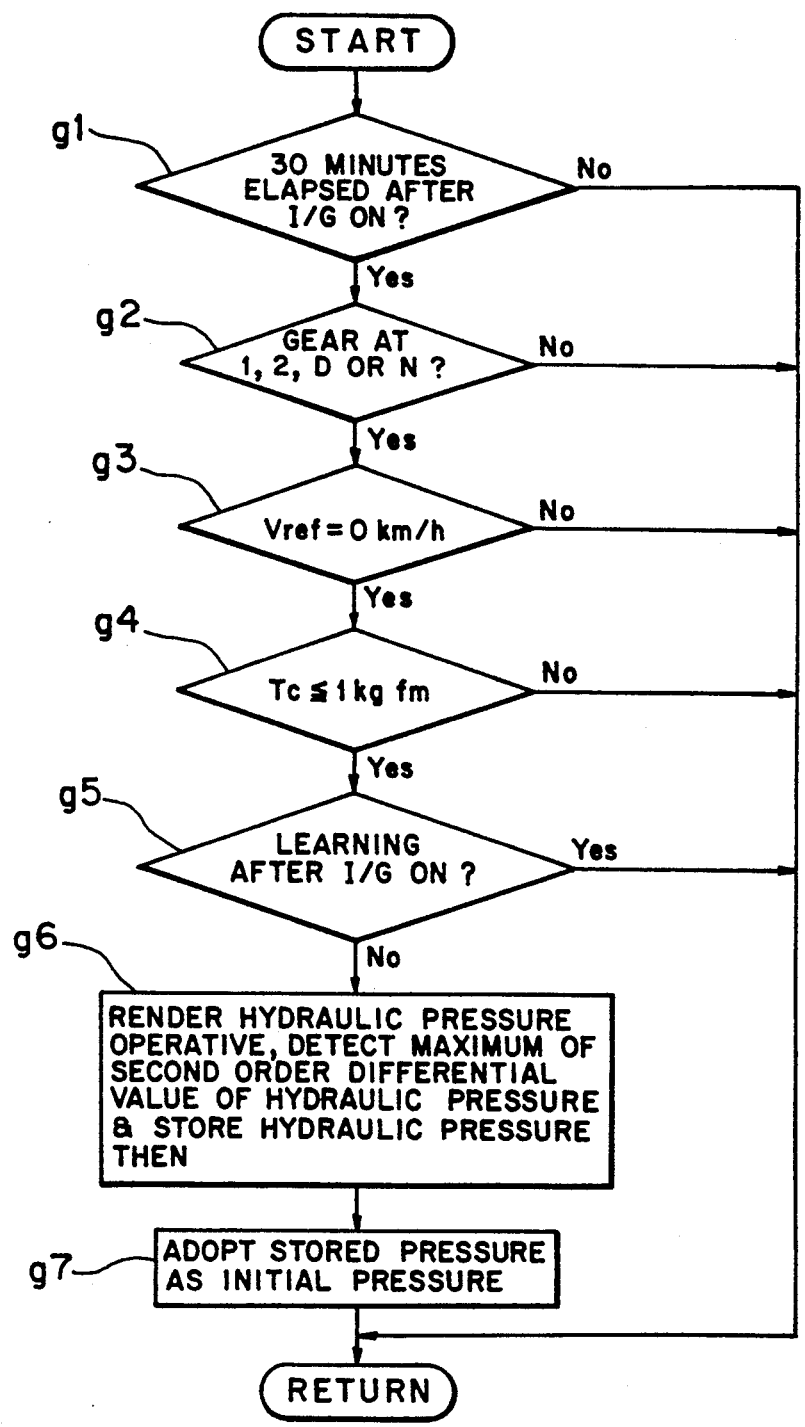
FIG. 32 is a flow chart showing a flow of first pre-pressure learning in the control flow of FIG. 26.

First, when the first pre-pressure learning technique described hereinabove is employed, such control as illustrated in FIG. 32 is executed. Referring to FIG. 32, it is successively judged at steps g1 to g4; ① whether or not 30 minutes or more have elapsed after the ignition key was put into an on-state; ② whether or not the shift selector is selectively positioned at one of the "1" (first speed) position, "2" (second speed) position, "D" (driving) position and "N" (neutral) position; ③ whether or not the vehicle body speed Vref is equal to 0 km/h, that is, whether or not the vehicle is in a stopping condition; and ④ whether or not the set value Tc of the clutch torque is equal to or lower than a predetermined low value (1 kgfm).

Then, if all of the requirements are met, the control sequence advances to step g5, but otherwise if any one of the requirements is not met, then a learning control is not executed.

At step g5, it is judged whether or not pre-pressure learning has been executed after the ignition key was put into an on-state, and if pre-pressure learning has already been executed, then a learning control is not executed. However, to the contrary, if pre-pressure learning has not been executed yet, then the control sequence advances to step g6.

At step g6, a hydraulic pressure is rendered operative, and a maximum value (MAX) of differential values of second order of such hydraulic pressure is detected and a hydraulic pressure P then is stored.

In short, as shown in FIG. 21(a), first a duty equivalent to a pressure P, for example, $P=0.4$ kgf/cm$^2$, is applied for 2 seconds, and then the duty is swept moderately at an increasing rate of, for example, 1.5%/sec to a duty equivalent to, for example, $P=3.0$ kgf/cm$^2$.

Then, a maximum value of a value, (difference) P" obtained by a second order time differential of second order the pressure P, which is applied to the hydraulic pistons 141 and 142 and presents such a variation as shown in FIG. 21(b), and a pressure P are then stored in memory.

Then, the thus stored pressure P is set as an initial pressure.

More particularly, when learning is started and the pressure P rises, a maximum value of a second order differential value P" and a pressure P then are stored in memory, and such second order differential value P" is calculated for each control cycle and updated suitably. Then, when a first order differential value P' exhibits a maximum value (in short, when the clutch is coupled completely), calculation of such second order differential value P" is stopped, and a pressure P when the second order differential value P" assumed a maximum value within a period till then is stored in memory as an initial pressure Pi.

Then, if any of the requirements ① to ④ for pre-pressure learning described hereinabove is no longer met during execution of such pre-pressure learning, then the pre-pressure learning is stopped immediately and control returns to a normal mode. After such pre-pressure learning is executed once after switching on of the ignition key, it will not be executed again unless the ignition key is turned off once and then turned on again.

Figure 33:
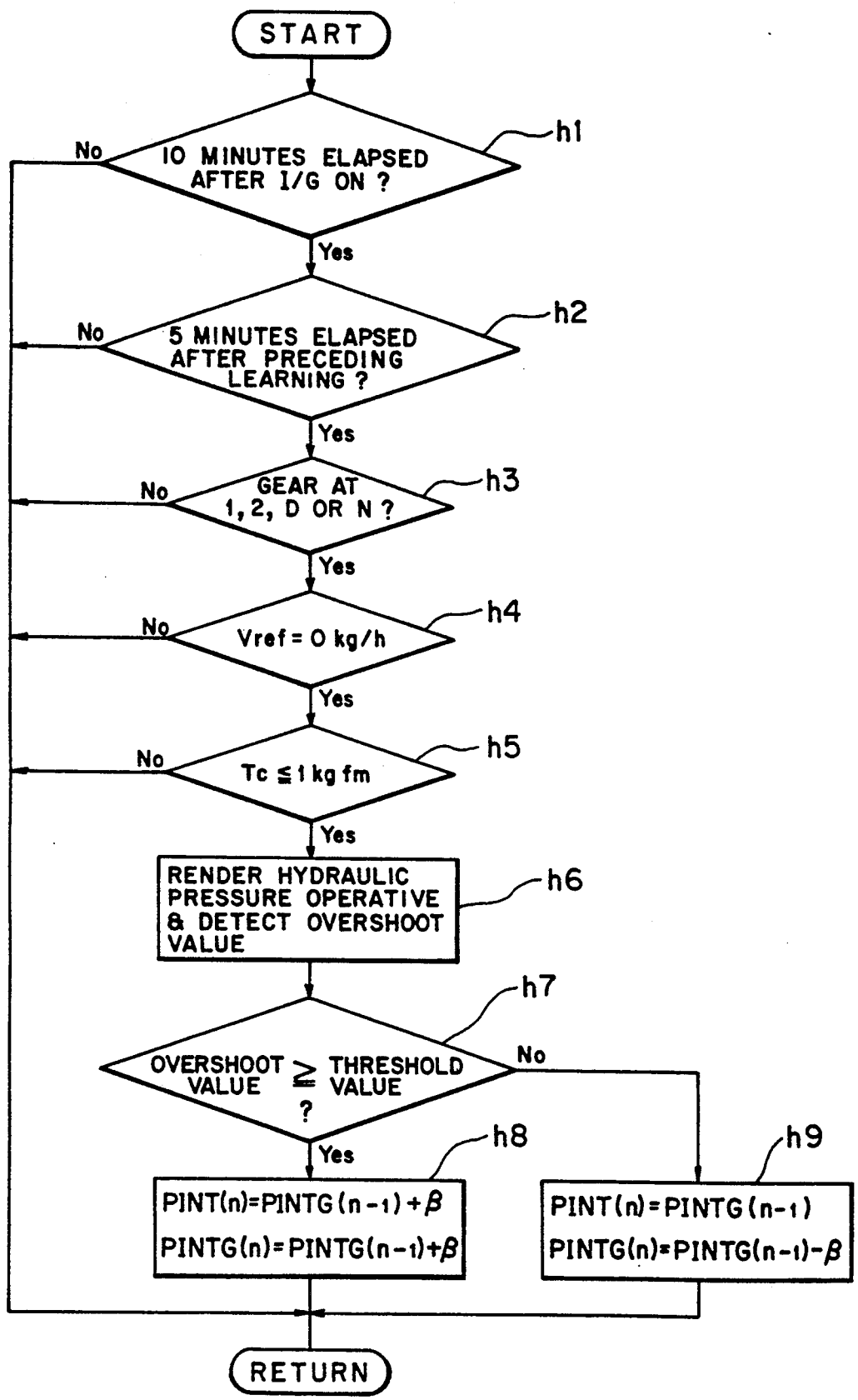
FIG. 33 is a flow chart showing a flow of second pre-pressure learning in the control flow of FIG. 26.

Subsequently, when the second pre-pressure learning technique described hereinabove is employed, such control as illustrated in FIG. 33 is executed. Referring to FIG. 33, it is successively judged at steps h1 to h5; ①' whether or not 10 minutes or more have elapsed after the ignition key was put into an on-state; ⑤ whether or not a predetermined interval of time (for example, 5 minutes or so or a suitable interval of time shorter than 5 minutes) has elapsed after a preceding trial; ②  whether or not the shift selector is selectively positioned at one of the "1" (first speed) position, "2" (second speed) position, "D" (driving) position and "N" (neutral) position; ③ whether or not the vehicle body speed Vref is equal to 0 km/h; and ④ whether or not the set value Tc of the clutch torque is equal to or lower than a predetermined low value (1 kgfm), that is, $Tc \geq 1$ kgfm. Then, if all of the five requirements are met, then the control sequence advances to step h6. However, to the contrary, if any one of the requirements is not met, then learning control is not executed.

At step h6, a hydraulic pressure is rendered operative and an overshoot value of such hydraulic pressure is detected.

In particular, a hydraulic pressure is rendered operative such that a duty equivalent to a preset initial pressure P1 is held for a predetermined period of time (for example, for 2 seconds), and after then, the duty is swept to a duty equivalent to $P = 8.8$ kgf/cm² (which is a duty of almost 100%) for a predetermined time (for example, for 1 second).

Then, an overshoot value $\alpha$ of the pressure P which is applied to the hydraulic pistons 141 and 142 and varies in response to such sweeping is detected.

Subsequently, it is judged at step h7 whether or not the overshoot value $\alpha$ is equal to or higher than a predetermined threshold value.

In particular, a peak value (maximum value) Pmax of the pressure P is detected, and a difference between the maximum value Pmax and a steady maximum value Pc (8.8 kgf/cm² here), that is, $Pmax - Pc$, is calculated and set as an overshoot value $\alpha$. Then, if the overshoot value $\alpha$ is equal to or higher than a threshold value ($\alpha_0$), then it can be determined that there has been an overshoot, and accordingly, the clutch 28 is in a disengaged condition at the initial pressure P1. On the contrary, if the overshoot value $\alpha$ is lower than the threshold value, it can be determined that there has been no overshoot, that is, the clutch 28 is in a delicately engaged condition or in an excessively contacting condition at the initial pressure P1.

Thus, if the overshoot value $\alpha$ is equal to or higher than the threshold value at step h7, the control sequence advances to step h8, at which an initial learned value PINTG(n) and an initial pressure PINT(n) for a present trial are set respectively to $$PINTG(n) = PINTG(n-1) + \beta$$

$$PINT(n) = PINTG(n-1) + \beta = PINTG(n)$$

In short, an initial learned value PINTG(n) is set to a value obtained by addition of $\beta$ (=pressure corresponding to 1 bit) to an initial learned value PINTG(n−1) in preceding learning, and an initial pressure PINT(n) is set to a value obtained by addition of $\beta$ (=pressure corresponding to 1 bit) to an initial learned value PINTG(n−1) in the preceding learning, in short, the initial learned value PINTG(n) in present learning.

On the other hand, if the overshoot value $\alpha$ is lower than the threshold value at step h7, the control sequence now advances to step h9, at which an initial learned value PINTG(n) and an initial pressure PINT(n) for a present trial are set respectively to $$PINTG(n) = PINTG(n-1) - \beta$$

$$PINT(n) = PINTG(n-1)$$

In short, a present initial learned value PINTG(n) is set to a value obtained by subtraction of $\beta$ (=pressure corresponding to 1 bit) from an initial learned value PINTG(n−1) in preceding learning while an initial pressure PINT(n) in present learning is set to the initial learned value PINTG(n−1) in the preceding learning.

It is to be noted that, if any of the requirements ①' to ⑤ for pre-pressure learning is no longer met during execution of such pre-pressure learning, the pre-pressure learning is stopped immediately and control returns to a normal mode.

On the contrary, such pre-pressure learning is repetitively performed so far as the requirements ①' to ⑤ for pre-pressure learning are met.

Figure 34:
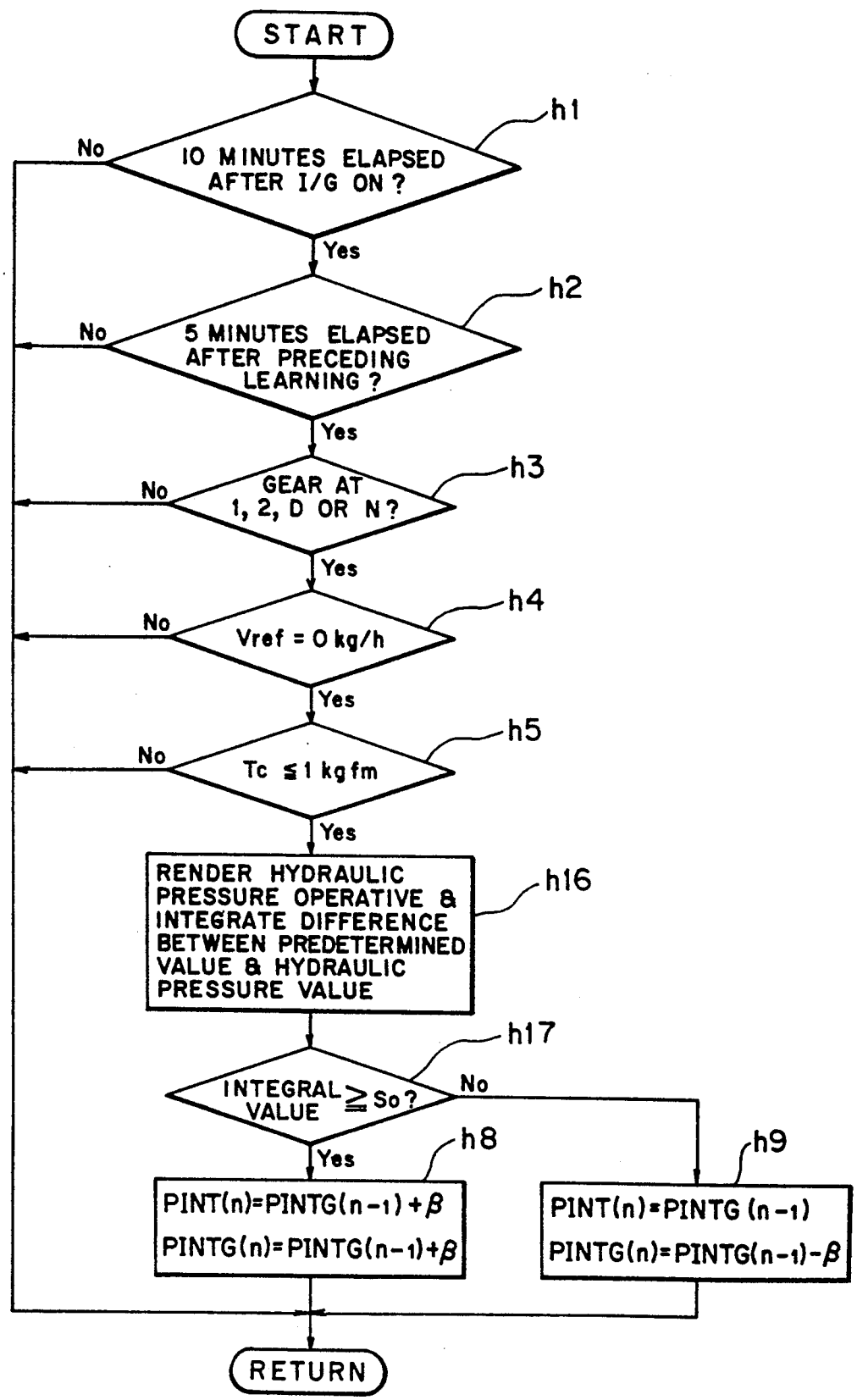
FIG. 34 is a flow chart showing a flow of third pre-pressure learning in the control flow of FIG. 26.

Finally, when the third pre-pressure learning technique described hereinabove is employed, such control as illustrated in FIG. 34 is executed. Referring to FIG. 34, similar requirements to those in the second pre-pressure learning technique described above are checked. In short, it is successively judged at steps h1 to h5; ①' whether or not 10 minutes or more have elapsed after the ignition key was put into an on-state; ⑤ whether or not a predetermined interval of time (for example, 5 minutes or so or a suitable interval of time shorter than 5 minutes) has elapsed after a preceding trial; ② whether or not the shift selector is selectively positioned at one of the "1" (first speed) position, "2" (second speed) position, "D" (driving) position and "N" (neutral) position; ③ whether or not the vehicle body speed Vref is equal to 0 km/h, that is, Vref=0 km/h; and ④ whether or not the set value Tc of the clutch torque is equal to or lower than a predetermined low value (1 kgfm), that is, $Tc \geq 1$ kgfm.

Then, if all of the five requirements are met, then the control sequence advances to step h16, but on the contrary, if any one of the requirements is not met, then learning control is not executed.

At step h16, a hydraulic pressure is rendered operative and a difference between a predetermined pressure and a hydraulic pressure value is integrated.

In short, a hydraulic pressure is rendered operative such that a duty equivalent to a preset initial pressure P1 is held for a predetermined period of time (for example, for 2 seconds). Subsequently, the duty is swept to a duty equivalent to $P = 8.8$ kgf/cm² (which is a duty of almost 100%) for a predetermined time (for example, for 1 second).

Then, a difference between the pressure P which is applied to the hydraulic pistons 141 and 142 and varies in response to such sweeping and a predetermined pressure (a pressure near to the maximum pressure) is integrated. In particular, as seen from FIGS. 23(b) and 23(c), an area S (S1 or S2) of a portion (shadowed portion in FIG. 23(b) or 23(c)) is calculated which is taken from a point of time $t_0$ when sweeping of the duty is started (or another point of time $t_1$ when the pressure P starts to rise) to a point of time when such a steady maximum pressure Pc (or a fixed pressure value near to the steady maximum pressure Pc) as indicated by a straight line L0 in FIG. 23(b) or 23(c) and is defined by such straight line L0 and a curve L1 or L2 which represents a variation of the pressure P.

Further at subsequent step h17, it is judged whether or not the thus calculated area S is greater than a threshold value $S_0$. In short, since the area S1 defined by the curve L1 having an overshoot is apparently greater than the area S2 defined by the curve L2 having no overshoot, presence or absence of an overshoot can be determined by comparison between the area S and the threshold value $S_0$.

Thus, if the area S is equal to or greater than the threshold value $S_0$, then the control sequence advances to step h8, at which an initial learned value PINTG(n) and an initial pressure PINT(n) for a present trial are set respectively to $$PINTG(n) = PINTG(n-1) + \beta$$

$$PINT(n) = PINTG(n-1) + \beta = PINTG(n)$$

In short, an initial learned value PINTG(n) is set to a value obtained by addition of $\beta$ (=pressure corresponding to 1 bit) to an initial learned value PINTG(n−1) in preceding learning, and an initial pressure PINT(n) is set to a value obtained by addition of $\beta$ (=pressure corresponding to 1 bit) to an initial learned value PINTG(n−1) in the preceding learning, in short, the initial learned value PINTG(n) in the present learning.

On the other hand, if the area S is smaller than the threshold value $S_0$ at step h7, then the control sequence now advances to step h9, at which an initial learned value PINTG(n) and an initial pressure PINT(n) for a present trial are set respectively to $$PINTG(n) = PINTG(n-1) - \beta$$

$$PINT(n) = PINTG(n-1)$$

In short, an initial learned value PINTG(n) in present learning is set to a value obtained by subtraction of $\beta$ (=pressure corresponding to 1 bit) from an initial learned value PINTG(n−1) in preceding learning while an initial pressure PINT(n) in the present learning is set to the initial learned value PINTG(n−1) in the preceding learning.

Also in this instance, if any of the requirements ①′ to ⑤ for pre-pressure learning described above is no longer met during execution of such third pre-pressure learning, the pre-pressure learning is stopped immediately and control returns to a normal mode.

On the contrary, such pre-pressure learning is repetitively performed so far as the requirements ①′ to ⑤ for pre-pressure learning are met.

Due to any of such first to third pre-pressure learning techniques, an appropriate initial pressure Pi can be set, which contributes significantly to improvement in responsibility of control.

Particularly, with the first pre-pressure learning technique, an initial pressure Pi can be set by single time learning. Accordingly, it is advantageous in that an initial pressure Pi can be set very simply.

Meanwhile, the second and third pre-pressure learning techniques are advantageous in that, while an initial pressure Pi is set by way of several times of learning, the accuracy in setting is high and the effect in improvement in responsibility is high.

Particularly, where a determination is based on an integral value (area), determination whether or not an initial pressure Pi is appropriate can be performed comparatively appropriately, and an initial pressure Pi can be set without relying very much upon a capacity of a pressure sensor.

Further, due to a control executed by way of the switch 294a, the duty solenoid valve and the clutch disks are protected, which contributes to improvement in reliability and durability of the apparatus.

Furthermore, since the torque distribution indicating section 312 is provided in the meter cluster and a torque distribution condition to the front wheels (or rear wheels) is graphically indicated on the torque distribution indicating section 312, the driver can drive the vehicle while recognizing a torque distribution condition of the vehicle. Such indication can thus be utilized effectively for driving and will make driving of the vehicle interesting, and the value of the product is improved significantly.

Besides, it may be possible to feed back a result of estimation of a torque distribution which is then executed to various components of the vehicle so that it may be used for control of them.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A four wheel driving vehicle of a front/rear wheel differential operation limiting type wherein a differential operation condition between front and rear wheels is limited to control a torque distribution between said front and rear wheels, comprising:

front/rear wheel speed difference proportional amount calculating means for calculating a limiting controlling amount for the differential operation condition in response to a difference in speeds of rotation between said front and rear wheels;

advancing direction acceleration proportional calculating means for calculating a limiting controlling amount for the differential operation condition in response to an acceleration of said vehicle in an advancing direction;

driving output torque proportional amount calculating means for calculating a limiting controlling amount for the differential operation condition in response to a driving output torque; and means for selecting a maximum one of the limiting controlling amounts calculated by said front/rear wheel speed difference proportional amount calculating means, advancing direction acceleration proportional calculating means and driving output torque proportional calculating means so that the differential operation condition may be limited in accordance with the thus selected limiting controlling amount.

2. A four wheel driving vehicle of a front/rear wheel differential operation limiting type as claimed in claim 1, further comprising a differential operation adjusting mechanism for adjusting the differential operation condition between the front and rear wheel sides, steering angle data detecting means for producing steering angle data from an angle of operation of a steering wheel of said vehicle, and controlling means for controlling said differential operation adjusting mechanism in accordance with the steering angle data.

3. A four wheel driving vehicle of a front/rear wheel differential operation limiting type as claimed in claim 2, wherein said steering angle data detecting means includes a steering angle sensor for detecting an angle of operation of said steering wheel, an acceleration sensor for detecting an acceleration acting in a lateral direction upon a body of said vehicle, a comparing section for comparing a turning direction determined in accordance with a signal from said steering angle sensor with another turning direction determined in accordance with another signal from said acceleration sensor, and a steering angle data setting section for setting, when it is judged by said comparing section that the two turning directions coincide with each other, steering angle data from an angle of operation of said steering wheel detected by said steering angle sensor but setting, when it is judged by said comparing section that the two turning directions are different from each other, the steering angle data to zero.

4. A four wheel driving vehicle of a front/rear wheel differential operation limiting type as claimed in claim 2, further comprising vehicle speed data calculating means for detecting vehicle speed data, and wherein said controlling means controls said differential operation adjusting mechanism in accordance with the steering angle data and the vehicle speed data and includes an ideal differential operation condition setting section for setting an ideal differential operation condition between said front and rear wheels in accordance with the steering angle data detected by said steering angle data detecting section and the vehicle speed data detected by said vehicle speed data detecting means, and a control executing section for controlling said differential operation adjusting mechanism so that the differential operation condition between said front and rear wheels may approach the ideal differential operation condition set by said ideal differential condition setting section.

5. A four wheel driving vehicle of a front/rear wheel differential operation limiting type as claimed in claim 4, wherein said vehicle speed data detecting means includes a wheel speed sensor for detecting a wheel speed of each of said wheels, a selecting means for selecting a second lowest value from among the wheel speeds detected by the individual wheel speed sensors, and a vehicle speed data setting means for setting vehicle speed data in accordance with the wheel speed selected by said selecting section.

6. A four wheel driving vehicle of a front/rear wheel differential operation limiting type as claimed in claim 4, wherein said differential operation adjusting mechanism is of the friction type which includes a wet multiple disk clutch interposed between said front and rear wheels for controlling a torque distribution between said front and rear wheels in accordance with an engaging force thereof, and further comprising ideal speed difference setting means for setting an ideal difference in speed of rotation between said front and rear wheels upon turning of said vehicle in accordance with the steering angle data and the vehicle speed data, actual speed difference detecting means for detecting an actual difference in speed of rotation between said front and rear wheels, and clutch engaging force setting means for setting an engaging force of said wet multiple disk clutch in accordance with a difference between the actual speed difference and the ideal speed difference so that the actual speed difference between said front and rear wheels may approach the ideal speed difference, said controlling means controlling said differential operation adjusting mechanism of the friction type so that the engaging force set by said clutch engaging force setting means may be obtained, said clutch engaging force setting means being constructed so as to set the engaging force to a value which increases as the difference between the actual speed difference and the ideal speed difference increases.

7. A four wheel driving vehicle of a front/rear wheel differential operation limiting type as claimed in claim 6, wherein said clutch engaging force setting means has, in a region in which the difference between the actual speed difference and the ideal speed difference is smaller than a predetermined value, a dead zone in which it sets the engaging force to zero.

8. A four wheel driving vehicle of a front/rear wheel differential operation limiting type as claimed in claim 7, wherein each of the actual speed difference and the ideal speed difference is a value obtained by substraction of a front wheel speed from a rear wheel speed and the difference between the actual speed difference and the ideal speed difference is a value obtained by subtraction of the ideal speed difference from the actual speed difference, and the dead zone is provided, when the ideal speed difference is positive, in a region in which the difference between the actual speed difference and the ideal speed difference ranges from 0 to a predetermined negative value, but is provided, when the ideal speed difference is negative, in another region in which the difference between the actual speed difference and the ideal speed difference ranges from 0 to a predetermined positive value.

9. A four wheel driving vehicle of a front/rear wheel differential operation limiting type according to claim 8, wherein the predetermined negative value and the predetermined positive value are each equal but opposite in sign to the ideal speed difference in the corresponding case.

10. A four wheel driving vehicle of a front/rear wheel differential operation limiting type as claimed in claim 6, wherein the ideal speed difference is a value obtained by subtraction of a speed of rotation of said front wheels from a speed of rotation of said rear wheels, and the dead zone is omitted when the ideal speed difference is equal to zero.

11. A four wheel driving vehicle of a front/rear wheel differential operation limiting type as claimed in claim 1, further comprising a differential operation adjusting mechanism for applying a frictional force between the front wheel side and the rear wheel side to limit the differential operation between said front and rear wheels to adjust the differential operation condition, advancing direction acceleration detecting means for detecting an acceleration of said vehicle in an advancing direction, assigned load calculating means for calculating a front wheel assigned load and a rear wheel assigned load at a magnitude of the advancing direction acceleration detected by said advancing direction acceleration detecting means, output torque calculating means for calculating a driving output torque necessary to obtain the advancing direction acceleration detected by said advancing direction acceleration detecting means, assigned load torque calculating means for calculating an assigned load torque from the assigned load calculated by said assigned load calculating means and the output torque calculated by said driving output torque calculating means, and controlling means for adjusting a differential operation limiting amount for said front and rear wheels in accordance with the driving output torque and the assigned load torque.

12. A four wheel driving vehicle of a front/rear wheel differential operation limiting type as claimed in claim 11, wherein a theoretical differential operation limiting amount calculated in accordance with the driving output torque and the assigned load torque presents an upwardly convex variation of a quadratic function with respect to the advancing direction acceleration, and in a region in which the theoretical differential operation limiting amount decreases as the advancing direction acceleration increases, an actual differential operation limiting amount is set so as to control such decrease of the theoretical differential operation limiting amount.

13. A four wheel driving vehicle of a front/rear wheel differential operation limiting type as claimed in claim 1, further comprising a differential operation adjusting mechanism for adjusting the differential operation condition between the front wheel side and the rear wheel side, engine output detecting means for detecting an outputting condition of an engine of said vehicle, and controlling means for controlling said differential operation adjusting mechanism in accordance with the engine outputting condition when said vehicle is running at a low speed.

14. A four wheel driving vehicle of a front/rear wheel differential operation limiting type as claimed in claim 13, wherein the output torque of said engine is transmitted to said front and rear wheels by way of a transmission and a torque converter which includes a pump connected to a crank axle of said engine, a turbine connected to an input shaft of said transmission and a selectively rotatable stator, and said controlling means includes engine output torque calculating means for calculating an engine output torque from a throttle opening and an engine speed, torque converter torque ratio calculating means for calculating a torque converter torque ratio representative of an increasing ratio between torques of input and output shafts of said torque converter from speeds of rotation of said input and output shafts of said torque converter, and means for detecting a reduction ratio of said transmission, said controlling means calculating a transmission output torque from the engine output torque, torque converter torque ratio and transmission gear ratio to output a controlling amount corresponding to the transmission output torque.

15. A four wheel driving vehicle of a front/rear wheel differential operation limiting type as claimed in claim 14, wherein said controlling means is constructed so as to correct the controlling amount such that the controlling amount may decrease as an ideal aimed value of the speed difference between said front and rear wheels upon turning of said vehicle increases.

16. A four wheel driving vehicle of a front/rear wheel differential operation limiting type as claimed in claim 1, further comprising controlling means for continuously adjusting an engaging force of a clutch to control the differential operation condition between said front and rear wheels, and means for detecting a differential operation speed difference between said front and rear wheels, said controlling means being constructed in such a manner as to engage said clutch completely for a predetermined period of time when a condition wherein the differential operation speed difference between said front and rear wheels is higher than a predetermined value continues for a period of time longer than a predetermined period of time.

17. A four wheel driving vehicle of a front/rear wheel differential operation limiting type as claimed in claim 16, wherein said controlling means is constructed so as to gradually decrease the clutch engaging force after lapse of the predetermined period of time.

18. A four wheel driving vehicle of a front/rear wheel differential operation limiting type as claimed in claim 1, further comprising a differential operation adjusting mechanism in which the differential operation condition between said front and rear wheels is controlled by continuously adjusting an engaging force of a wet multiple disk clutch and a hydraulic pressure acting upon said clutch is adjusted by a duty solenoid valve, and controlling means for controlling said differential operation adjusting mechanism in such a manner as to stop operation of said duty solenoid valve when a controlling amount by said wet multiple disk clutch is lower than a predetermined value and the speed of said vehicle is lower than a predetermined value.

19. A four wheel driving vehicle of a front/rear wheel differential operation limiting type as claimed in claim 1, further comprising a differential operation adjusting mechanism for limiting the differential operation condition between the front wheel side and the rear wheel side by way of a wet multiple disk clutch, and controlling means for controlling said differential operation adjusting mechanism, said controlling means including initial engaging pressure detecting means for detecting an initial engaging pressure of said wet multiple disk clutch which is a maximum pressure at which a differential operation limit to said wet multiple disk clutch does not occur, and pre-pressure applying means for applying the initial engaging pressure detected by said initial engaging pressure detecting means as a pre-pressure to said wet multiple disk clutch.

20. A four wheel driving vehicle of a front/rear wheel differential operation limiting type as claimed in claim 19, wherein said initial engaging pressure detecting means is constructed such that it applies to said wet multiple disk clutch an initial engaging pressure detecting hydraulic pressure which increases substantially at a fixed rate from a predetermined initial hydraulic pressure condition, and sets the initial engaging pressure detecting hydraulic pressure at a point of time when an increasing amount of the pressure in an oil chamber of said wet multiple disk clutch which reacts then with such initial engaging pressure detecting hydraulic pressure starts a sudden increase an an initial engaging pressure of said wet multiple disk clutch.

21. A four wheel driving vehicle of a front/rear wheel differential operation limiting type as claimed in claim 19, wherein said initial engaging pressure detecting means is constructed such that it detects, when an initial engaging pressure detecting hydraulic pressure which increases substantially at a fixed rate from a predetermined initial hydraulic pressure condition is applied to said wet multiple disk clutch, a pressure in an oil chamber of said wet multiple disk clutch which reacts with such initial engaging pressure detecting hydraulic pressure, calculates a differential value of second order and a differential value of first order of such detecting hydraulic pressure, and sets the initial engaging pressure of said wet multiple disk clutch to the initial engaging pressure detecting hydraulic pressure at a point of time when the differential value of second order presents a maximum value for an interval of time until the differential value of first order is reduced to zero.

22. A four wheel driving vehicle of a front/rear wheel differential operation limiting type as claimed in claim 20 or 21, further comprising a return spring for normally biasing said wet multiple disk clutch to a disengaging side, the initial hydraulic pressure being set higher than the biasing pressure of said return spring for said wet multiple disk clutch but lower than a designed initial engaging pressure of said wet multiple disk clutch.

23. A four wheel driving vehicle of a front/rear wheel differential operation limiting type as claimed in claim 19, wherein said initial engaging pressure detecting means is a means for detecting the initial engaging pressure by a learning control which is executed at a predetermined interval of time when a predetermined running requirement is met, the learning control proceeding such that the initial engaging pressure which increases from an initial engaging pressure in a preceding learning control to the maximum pressure is applied to said wet multiple disk clutch; presence or absence of an overshoot of a pressure in an oil chamber of said wet multiple disk clutch which reacts with such initial engaging pressure detecting hydraulic pressure is detected; and, when an overshoot is present, an initial engaging pressure in a present learning control is set to a value obtained by an addition of a predetermined amount to the initial engaging pressure in the preceding learning control, but when no overshoot is present, the initial engaging pressure in the present learning control either to the initial engaging pressure in the preceding learning control or to a value obtained by subtraction of the predetermined amount from the initial engaging pressure in the preceding learning control so that the initial engaging pressure of said wet multiple disk clutch may approach the maximum value at which no differential operation limit to said clutch occurs.

24. A four wheel driving vehicle of a front/rear wheel differential operation limiting type as claimed in claim 23, wherein the learning control proceeds such that the initial engaging pressure detecting hydraulic pressure which increases from a hydraulic pressure based on an initial engaging pressure instruction value in the preceding learning control to the maximum pressure is applied to said wet multiple disk clutch; presence or absence of an overshoot of the pressure in said oil chamber of said wet multiple disk clutch is detected; and, when an overshoot is present, an initial engaging pressure instruction value in the present learning control is set to a value obtained by addition of the predetermined amount to the initial engaging pressure instruction value in the preceding learning control and the initial engaging pressure in the present learning control is set to a hydraulic pressure based on the initial engaging pressure instruction value in the preceeding learning control, but when no overshoot is present, the initial engaging pressure instruction valve in the present learning control is set to a value obtained by substraction of a predetermined amount from the initial engaging pressure instruction value in the preceding learning control and the initial engaging pressure in the present learning control is set to a hydraulic pressure based on the initial engaging pressure instruction in the preceding learning control so that the initial engaging pressure of said wet multiple disk clutch may approach the maximum pressure at which a differential operation limit to said clutch does not occur.

25. A four wheel driving vehicle of a front/rear wheel differential operation limiting type as claimed in claim 23 or 24, wherein judgment of presence or absence of an overshot depends upon judgment whether or not a difference between the maximum value of the pressure in said oil chamber of said wet multiple disk clutch and a predetermined value is greater than a threshold value.

26. A four wheel driving vehicle of a front/rear wheel differential operation limiting type as claimed in claim 19, wherein said initial engaging pressure detecting means is a means for detecting the initial engaging pressure by a learning control which is executed at a predetermined interval of time when a predetermined running requirement is met, and the learning control proceeds such that a difference between integral values of those portions of a difference between the maximum pressure and a pressure in an oil chamber of said wet multiple disk clutch which reacts, when an initial engaging pressure detecting hydraulic pressure which increases from an initial engaging pressure in a preceeding learning control to the maximum pressure is applied to said wet multiple disk clutch, with such initial engaging pressure detecting hydraulic pressure and such difference between the maximum pressure and the pressure when the initial engaging pressure is increased to the maximum pressure at which a differential operation limit to said clutch does not occur, which are within a predetermined range from the initial engaging pressure, is compared with a threshold value, and if the difference between the integral values is equal to or higher than the threshold value, then the initial engaging pressure in a present learning control is set to a value obtained by addition of a predetermined amount of the initial engaging pressure in the preceding learning control, but if the difference between the integral values is lower than the threshold value, then the initial engaging pressure in the present learning control is set to a value equal to the initial engaging pressure in the preceding learning control or another value obtained by subtraction of the predetermined value from the initial engaging pressure in the preceding learning control so that the initial engaging pressure of said wet multiple disk clutch may approach the maximum pressure at which a differential operation limit to said wet multiple disk clutch does not occur.

27. A four wheel driving vehicle of a front/rear wheel differential operation limiting type as claimed in claim 26, wherein the learning control proceeds such that, if the difference between the integral values is equal to or higher than the threshold value, then the learned value in the present learning control is set to a value obtained by addition of the predetermined amount to the learned value in the preceding learning control and the value obtained by such addition is employed as an initial engaging pressure in the present learning control, but if the difference between the integral values is lower than the threshold value, then the learned value in the present learning control is set to a value obtained by subtraction of the predetermined amount from the learned value in the preceding learning control and the learned value in the preceding learning control is employed as an initial engaging pressure in the present learning control so that the initial engaging pressure of said wet multiple disk clutch may approach the maximum pressure at which a differential operation limit to said wet multiple disk clutch does not occur.

* * * * *